US012802678B2

(12) United States Patent
Goldstein et al.

(10) Patent No.: US 12,802,678 B2
(45) Date of Patent: Nov. 17, 2026

(54) METHOD AND DEVICE FOR ACUTE SOUND DETECTION AND REPRODUCTION

(71) Applicant: ST Portfolio Holdings, LLC, Delray Beach, FL (US)

(72) Inventors: Steven Wayne Goldstein, Delray Beach, FL (US); John Usher, Beer (GB); Marc Andre Boillot, Plantation, FL (US)

(73) Assignee: ST Portfolio Holdings, LLC, Delray Beach, FL (US)

(*) Notice: Subject to any disclaimer, the term of this patent is extended or adjusted under 35 U.S.C. 154(b) by 231 days.

(21) Appl. No.: 18/138,064

(22) Filed: Apr. 22, 2023

(65) Prior Publication Data

US 2024/0127785 A1 Apr. 18, 2024

Related U.S. Application Data

(63) Continuation of application No. 17/592,143, filed on Feb. 3, 2022, now Pat. No. 11,710,473, which is a (Continued)

(51) Int. Cl.
*G10K 11/178* (2006.01)
*G10K 11/00* (2006.01)
(Continued)

(52) U.S. Cl.
CPC ...... *G10K 11/17827* (2018.01); *G10K 11/002* (2013.01); *H04R 1/1016* (2013.01); (Continued)

(58) Field of Classification Search
CPC ............ G10K 11/17827; G10K 11/002; H04R 1/1016; H04R 1/1083; H04R 3/002; (Continued)

(56) References Cited

U.S. PATENT DOCUMENTS

| | | |
|---|---|---|
| 2,803,308 A | 8/1957 | Mattia |
| 3,028,454 A | 4/1962 | Kohorn |

(Continued)

FOREIGN PATENT DOCUMENTS

| | | |
|---|---|---|
| AU | 2006200446 | 2/2006 |
| CA | 2215764 | 11/1996 |

(Continued)

OTHER PUBLICATIONS

*Samsung Electronics Co., Ltd., and Samsung Electronics, America, Inc.*, v. *Staton Techiya, LLC*, IPR2022-00282, Dec. 21, 2021.

(Continued)

*Primary Examiner* — Andrew Sniezek
(74) *Attorney, Agent, or Firm* — Akerman LLP; Peter A. Chiabotti

(57) ABSTRACT

Earpieces and methods for acute sound detection and reproduction are provided. A method can include measuring an external ambient sound level (xASL), monitoring a change in the xASL for detecting an acute sound, estimating a proximity of the acute sound, and upon detecting the acute sound and its proximity, reproducing the acute sound within an ear canal, where the ear canal is at least partially occluded by an earpiece. Other embodiments are disclosed.

9 Claims, 9 Drawing Sheets

Related U.S. Application Data continuation of application No. 17/321,892, filed on May 17, 2021, which is a continuation of application No. 16/987,396, filed on Aug. 7, 2020, now Pat. No. 11,244,666, which is a continuation of application No. 16/669,490, filed on Oct. 30, 2019, now Pat. No. 10,810,989, which is a continuation of application No. 16/193,568, filed on Nov. 16, 2018, now Pat. No. 10,535,334, which is a continuation of application No. 14/574,589, filed on Dec. 18, 2014, now Pat. No. 10,134,377, which is a continuation of application No. 12/017,878, filed on Jan. 22, 2008, now Pat. No. 8,917,894.

(60) Provisional application No. 60/885,917, filed on Jan. 22, 2007.

(51) Int. Cl.
*H04R 1/10* (2026.01)
*H04R 3/00* (2006.01)
*H04R 29/00* (2006.01)

(52) U.S. Cl.
CPC ........... *H04R 1/1083* (2013.01); *H04R 3/002* (2013.01); *H04R 3/005* (2013.01); *H04R 29/001* (2013.01); *H04R 2225/41* (2013.01); *H04R 2460/05* (2013.01); *H04R 2499/11* (2013.01)

(58) Field of Classification Search
CPC .. H04R 3/005; H04R 29/001; H04R 2225/41; H04R 2460/05; H04R 2499/11
See application file for complete search history.

(56) References Cited

U.S. PATENT DOCUMENTS 3,729,598 A 4/1973 Tegt
3,876,843 A 4/1975 Moen
4,041,256 A 8/1977 Ohta
4,054,749 A 10/1977 Suzuki et al.
4,088,849 A 5/1978 Usami et al.
4,455,677 A 6/1984 Fox
4,533,795 A 8/1985 Baumhauer
4,555,677 A 11/1985 Beesley
4,596,902 A 6/1986 Gilman
4,827,458 A 5/1989 D'Alayer de Costemore D'Arc
4,891,841 A 1/1990 Bohn
4,941,187 A 7/1990 Slater
4,947,432 A 8/1990 Topholm
4,947,440 A 8/1990 Bateman et al.
5,002,151 A 3/1991 Oliveira et al.
5,027,410 A 6/1991 Williamson et al.
5,033,090 A 7/1991 Weinrich
5,182,774 A 1/1993 Bourk
5,202,927 A 4/1993 Topholm
5,204,906 A 4/1993 Nohara
5,208,867 A 5/1993 Stites, III
5,251,263 A 10/1993 Andrea
5,259,033 A 11/1993 Goodings
5,267,321 A 11/1993 Langberg
5,276,740 A 1/1994 Inanaga et al.
5,298,692 A 3/1994 Ikeda
5,317,273 A 5/1994 Hanson
5,327,506 A 7/1994 Stites
5,345,430 A 9/1994 Moe
5,390,254 A 2/1995 Adelman
5,430,826 A 7/1995 Webster
5,473,684 A 12/1995 Bartlett
5,479,522 A 12/1995 Lindemann
5,524,056 A 6/1996 Killion et al.
5,526,819 A 6/1996 Martin
5,528,739 A 6/1996 Lucas et al.
5,539,831 A 7/1996 Harley
5,541,359 A 7/1996 Lee
5,550,923 A 8/1996 Hotvet
5,557,659 A 9/1996 Hyde-Thomson
5,577,511 A 11/1996 Killion
5,606,621 A 2/1997 Reiter et al.
5,632,002 A 5/1997 Hashimoto et al.
5,636,351 A 6/1997 Lee
5,647,011 A 7/1997 Garvis
5,649,055 A 7/1997 Gupta
5,692,059 A 11/1997 Kruger
5,740,262 A 4/1998 Yoshida et al.
5,748,754 A 5/1998 Maag et al.
5,764,778 A 6/1998 Zurek
5,774,567 A 6/1998 Heyl
5,787,187 A 7/1998 Bouchard
5,799,273 A 8/1998 Mitchell et al.
5,826,064 A 10/1998 Loring et al.
5,862,065 A 1/1999 Muthusamy
5,887,070 A 3/1999 Iseberg
5,903,868 A 5/1999 Yuen et al.
5,909,667 A 6/1999 Leontiades et al.
5,920,835 A 7/1999 Huzenlaub et al.
5,923,624 A 7/1999 Groeger
5,930,751 A 7/1999 Cohrs et al.
5,933,506 A 8/1999 Aoki
5,933,510 A 8/1999 Bryant
5,937,070 A 8/1999 Todter
5,946,050 A 8/1999 Wolff
5,953,392 A 9/1999 Rhie et al.
5,956,681 A 9/1999 Yamakita
6,005,525 A 12/1999 Kivela
6,021,205 A 2/2000 Yamada
6,021,207 A 2/2000 Puthuff et al.
6,021,325 A 2/2000 Hall
6,023,517 A 2/2000 Ishige
6,028,514 A 2/2000 Lemelson
6,048,320 A 4/2000 Brainard, II
6,056,698 A 5/2000 Iseberg
6,069,963 A 5/2000 Martin
6,072,645 A 6/2000 Sprague
6,094,492 A 7/2000 Boesen
6,094,494 A 7/2000 Haroldson
6,101,256 A 8/2000 Steelman
6,118,877 A 9/2000 Lindemann
6,118,878 A 9/2000 Jones
6,141,426 A 10/2000 Stobba
6,151,571 A 11/2000 Pertrushin
6,160,758 A 12/2000 Spiesberger
6,163,338 A 12/2000 Johnson et al.
6,163,508 A 12/2000 Kim et al.
6,173,259 B1 1/2001 Bijl
6,175,633 B1 1/2001 Morrill
6,198,971 B1 3/2001 Leysieffer
6,226,389 B1 5/2001 Lemelson et al.
6,263,147 B1 7/2001 Tognazzini
6,269,161 B1 7/2001 McLaughlin
6,298,323 B1 10/2001 Kaemmerer
6,308,158 B1 10/2001 Kuhnen et al.
6,311,092 B1 10/2001 Yamada
6,338,038 B1 1/2002 Hanson
6,359,993 B2 3/2002 Brimhall
6,400,652 B1 6/2002 Goldberg et al.
6,405,165 B1 6/2002 Blum et al.
6,408,272 B1 6/2002 White
6,415,034 B1 7/2002 Hietanen
6,424,721 B1 7/2002 Hohn
6,445,799 B1 9/2002 Taenzer
6,456,199 B1 * 9/2002 Michael .................. G01H 3/14
340/573.1
6,456,975 B1 9/2002 Chang
6,463,413 B1 10/2002 Applebaum
6,475,163 B1 11/2002 Smits
6,483,899 B2 11/2002 Agraharam et al.
6,490,557 B1 12/2002 Jeppesen
6,513,621 B1 2/2003 Deslauriers et al.
6,526,148 B1 2/2003 Jourjine
6,526,381 B1 2/2003 Wilson
6,554,761 B1 4/2003 Puria

(56) References Cited

U.S. PATENT DOCUMENTS

| | | | |
|---|---|---|---|
| 6,567,524 | B1 | 5/2003 | Svean et al. |
| 6,593,848 | B1 | 7/2003 | Atkins |
| 6,597,787 | B1 | 7/2003 | Lindgren |
| 6,606,598 | B1 | 8/2003 | Holthouse |
| 6,639,987 | B2 | 10/2003 | McIntosh |
| 6,647,123 | B2 | 11/2003 | Kandel |
| 6,647,368 | B2 | 11/2003 | Nemirovski |
| 6,648,368 | B2 | 11/2003 | Nemirovski |
| RE38,351 | E | 12/2003 | Iseberg |
| 6,658,122 | B1 | 12/2003 | Westermann |
| 6,661,886 | B1 | 12/2003 | Huart |
| 6,661,901 | B1 | 12/2003 | Svean et al. |
| 6,671,379 | B2 | 12/2003 | Nemirovski |
| 6,671,643 | B2 | 12/2003 | Kachler |
| 6,674,862 | B1 | 1/2004 | Magilen |
| 6,687,339 | B2 | 2/2004 | Martin |
| 6,687,377 | B2 | 2/2004 | Voix |
| 6,687,671 | B2 | 2/2004 | Gudorf et al. |
| 6,717,991 | B1 | 4/2004 | Gustafsson |
| 6,725,194 | B1 | 4/2004 | Bartosik et al. |
| 6,728,385 | B2 | 4/2004 | Kvaloy et al. |
| 6,738,482 | B1 | 5/2004 | Jaber |
| 6,738,485 | B1 | 5/2004 | Boesen |
| 6,748,238 | B1 | 6/2004 | Lau |
| 6,754,359 | B1 | 6/2004 | Svean et al. |
| 6,760,754 | B1 | 7/2004 | Isaacs et al. |
| 6,775,206 | B2 | 8/2004 | Karhu |
| 6,782,106 | B1 | 8/2004 | Kong et al. |
| 6,785,394 | B1 | 8/2004 | Olsen |
| 6,789,060 | B1 | 9/2004 | Wolfe et al. |
| 6,804,638 | B2 | 10/2004 | Fiedler |
| 6,804,643 | B1 | 10/2004 | Kiss |
| 6,826,286 | B1 | 11/2004 | Arndt et al. |
| 6,837,857 | B2 | 1/2005 | Stirnemenn |
| 6,879,692 | B2 | 4/2005 | Nielsen |
| 6,910,013 | B2 | 6/2005 | Allegro |
| 6,912,289 | B2 | 6/2005 | Vonlanthen |
| 6,941,161 | B1 | 9/2005 | Bobisuthi |
| 6,987,992 | B2 | 1/2006 | Hundal |
| 7,003,099 | B1 | 2/2006 | Zhang |
| 7,003,123 | B2 | 2/2006 | Kanevsky |
| 7,020,297 | B2 | 3/2006 | Fang |
| 7,037,274 | B2 | 5/2006 | Thornton |
| 7,039,195 | B1 | 5/2006 | Svean |
| 7,039,585 | B2 | 5/2006 | Wilmot |
| 7,043,037 | B2 | 5/2006 | Lichtblau |
| 7,050,592 | B1 | 5/2006 | Iseberg |
| 7,050,966 | B2 | 5/2006 | Schneider |
| 7,050,971 | B1 | 5/2006 | Kaufholz |
| 7,072,482 | B2 | 7/2006 | Van Doorn et al. |
| 7,082,393 | B2 | 7/2006 | Lahr |
| 7,092,532 | B2 | 8/2006 | Luo |
| 7,103,188 | B1 | 9/2006 | Jones |
| 7,107,109 | B1 | 9/2006 | Nathan et al. |
| 7,110,554 | B2 | 9/2006 | Brennan |
| 7,130,437 | B2 | 10/2006 | Stonikas et al. |
| 7,158,643 | B2 | 1/2007 | Lavoie et al. |
| 7,158,933 | B2 | 1/2007 | Balan |
| 7,162,041 | B2 | 1/2007 | Haapapuro |
| 7,174,022 | B1 | 2/2007 | Zhan |
| 7,177,433 | B2 | 2/2007 | Sibbald |
| 7,181,020 | B1 | 2/2007 | Riley |
| 7,181,030 | B2 | 2/2007 | Rasmussen |
| 7,209,569 | B2 | 4/2007 | Boesen |
| 7,215,766 | B2 | 5/2007 | Wurtz |
| 7,223,245 | B2 | 5/2007 | Zoth |
| 7,246,058 | B2 | 7/2007 | Burnett |
| 7,277,722 | B2 | 10/2007 | Rosenzweig |
| 7,280,849 | B1 | 10/2007 | Bailey |
| 7,312,699 | B2 | 12/2007 | Chornenky |
| 7,346,504 | B2 | 3/2008 | Liu |
| 7,359,504 | B1 | 4/2008 | Reuss |
| 7,383,178 | B2 | 6/2008 | Visser |
| 7,395,090 | B2 | 7/2008 | Alden |
| 7,421,084 | B2 | 9/2008 | Jubien et al. |
| 7,430,299 | B2 | 9/2008 | Armstrong et al. |
| 7,430,300 | B2 | 9/2008 | Vosburgh |
| 7,433,463 | B2 | 10/2008 | Alves |
| 7,433,714 | B2 | 10/2008 | Howard et al. |
| 7,444,353 | B1 | 10/2008 | Chen |
| 7,450,730 | B2 | 11/2008 | Bertg et al. |
| 7,464,029 | B2 | 12/2008 | Visser |
| 7,477,754 | B2 | 1/2009 | Rasmussen |
| 7,477,756 | B2 | 1/2009 | Wickstrom et al. |
| 7,477,922 | B2 | 1/2009 | Lewis |
| 7,502,484 | B2 | 3/2009 | Ngia |
| 7,512,245 | B2 | 3/2009 | Rasmussen |
| 7,519,193 | B2 | 4/2009 | Fretz |
| 7,529,379 | B2 | 5/2009 | Zurek |
| 7,532,734 | B2 | 5/2009 | Pham |
| 7,536,006 | B2 | 5/2009 | Patel |
| 7,562,020 | B2 | 7/2009 | Le et al. |
| 7,574,917 | B2 | 8/2009 | Von Dach |
| 7,590,254 | B2 | 9/2009 | Olsen |
| 7,617,099 | B2 | 11/2009 | Yang |
| 7,623,823 | B2 | 11/2009 | Zito |
| 7,634,094 | B2 | 12/2009 | Reber |
| 7,659,827 | B2 | 2/2010 | Gunderson |
| 7,680,465 | B2 | 3/2010 | Issa |
| 7,702,482 | B2 | 4/2010 | Graepel et al. |
| 7,710,654 | B2 | 5/2010 | Ashkenazi |
| 7,715,568 | B2 | 5/2010 | Nakano |
| 7,715,577 | B2 | 5/2010 | Allen |
| 7,729,912 | B1 | 6/2010 | Bacchiani |
| 7,756,281 | B2 | 7/2010 | Goldstein et al. |
| 7,756,283 | B2 | 7/2010 | Bramslow |
| 7,756,285 | B2 | 7/2010 | Sjursen et al. |
| 7,773,743 | B2 | 8/2010 | Stokes |
| 7,773,759 | B2 | 8/2010 | Alves |
| 7,773,763 | B2 | 8/2010 | Pedersen |
| 7,774,202 | B2 | 8/2010 | Spengler |
| 7,778,434 | B2 | 8/2010 | Juneau et al. |
| 7,801,318 | B2 | 9/2010 | Bartel |
| 7,801,726 | B2 | 9/2010 | Ariu |
| 7,804,974 | B2 | 9/2010 | Paludan-Muller |
| 7,813,520 | B2 | 10/2010 | Dach |
| 7,817,808 | B2 | 10/2010 | Konchitsky |
| 7,844,070 | B2 | 11/2010 | Abolfathi |
| 7,844,248 | B2 | 11/2010 | Sotack |
| 7,853,031 | B2 | 12/2010 | Hamacher |
| 7,861,008 | B2 | 12/2010 | Batson et al. |
| 7,861,723 | B2 | 1/2011 | Dedrick |
| 7,869,606 | B2 | 1/2011 | Fichtl |
| 7,903,825 | B1 | 3/2011 | Melanson |
| 7,903,826 | B2 | 3/2011 | Boersma |
| 7,903,833 | B2 | 3/2011 | Goldberg |
| 7,920,557 | B2 | 4/2011 | Moote |
| 7,925,007 | B2 | 4/2011 | Stokes |
| 7,929,713 | B2 | 4/2011 | Victorian |
| 7,933,423 | B2 | 4/2011 | Baekgaard Jensen |
| 7,936,885 | B2 | 5/2011 | Frank |
| 7,953,241 | B2 | 5/2011 | Jorgensen |
| 7,983,433 | B2 | 7/2011 | Nemirovski |
| 7,983,907 | B2 | 7/2011 | Visser |
| 7,986,791 | B2 | 7/2011 | Bostick |
| 7,986,802 | B2 | 7/2011 | Ziller |
| 7,995,773 | B2 | 8/2011 | Mao |
| 8,014,553 | B2 | 9/2011 | Radivojevic et al. |
| 8,018,337 | B2 | 9/2011 | Jones |
| 8,019,091 | B2 | 9/2011 | Burnett |
| 8,027,481 | B2 | 9/2011 | Beard |
| 8,045,840 | B2 | 10/2011 | Murata et al. |
| 8,047,207 | B2 | 11/2011 | Perez et al. |
| 8,050,143 | B2 | 11/2011 | Nicholas |
| 8,068,627 | B2 | 11/2011 | Zhan |
| 8,077,872 | B2 | 12/2011 | Dyer |
| 8,081,780 | B2 | 12/2011 | Goldstein |
| 8,085,943 | B2 | 12/2011 | Bizjak |
| 8,086,093 | B2 | 12/2011 | Stuckman |
| 8,111,839 | B2 | 2/2012 | Goldstein |
| 8,111,840 | B2 | 2/2012 | Haulick |
| 8,111,849 | B2 | 2/2012 | Tateno |
| 8,116,472 | B2 | 2/2012 | Mizuno |
| 8,116,489 | B2 | 2/2012 | Mejia |

(56) References Cited

U.S. PATENT DOCUMENTS

| | | | | |
|---|---|---|---|---|
| 8,121,301 | B2 | 2/2012 | Suzuki | |
| 8,140,325 | B2 | 3/2012 | Kanevsky | |
| 8,144,881 | B2 | 3/2012 | Crockett | |
| 8,144,891 | B2 | 3/2012 | Her | |
| 8,150,044 | B2 | 4/2012 | Goldstein | |
| 8,150,084 | B2 | 4/2012 | Jessen | |
| 8,160,261 | B2 | 4/2012 | Schulein | |
| 8,160,273 | B2 | 4/2012 | Visser | |
| 8,162,846 | B2 | 4/2012 | Epley | |
| 8,180,078 | B2 | 5/2012 | Zellner | |
| 8,184,823 | B2 | 5/2012 | Itabashi | |
| 8,186,478 | B1 | 5/2012 | Grason | |
| 8,189,803 | B2 | 5/2012 | Bergeron | |
| 8,194,864 | B2 | 6/2012 | Goldstein et al. | |
| 8,194,865 | B2 | 6/2012 | Goldstein | |
| 8,199,919 | B2 | 6/2012 | Goldstein et al. | |
| 8,199,942 | B2 | 6/2012 | Mao | |
| 8,204,435 | B2 | 6/2012 | Seshadri | |
| 8,208,609 | B2 | 6/2012 | Harris | |
| 8,208,642 | B2 | 6/2012 | Edwards | |
| 8,208,644 | B2 | 6/2012 | Goldstein et al. | |
| 8,208,652 | B2 | 6/2012 | Keady | |
| 8,209,181 | B2 | 6/2012 | Heckerman et al. | |
| 8,213,629 | B2 | 7/2012 | Goldstein | |
| 8,218,784 | B2 | 7/2012 | Schulein | |
| 8,221,861 | B2 | 7/2012 | Keady | |
| 8,229,127 | B2 | 7/2012 | Jorgensen et al. | |
| 8,229,128 | B2 | 7/2012 | Keady | |
| 8,229,148 | B2 | 7/2012 | Rasmssen | |
| 8,229,513 | B2 | 7/2012 | Ibe | |
| 8,251,925 | B2 | 8/2012 | Staab et al. | |
| 8,254,586 | B2 | 8/2012 | Voix | |
| 8,254,591 | B2 | 8/2012 | Goldstein | |
| 8,270,629 | B2 | 9/2012 | Bothra | |
| 8,270,634 | B2 | 9/2012 | Harney | |
| 8,306,235 | B2 | 11/2012 | Mahowald | |
| 8,312,960 | B2 | 11/2012 | Keady | |
| 8,315,400 | B2 | 11/2012 | Goldstein et al. | |
| 8,322,222 | B2 | 12/2012 | Goldberg | |
| 8,340,309 | B2 | 12/2012 | Burnett | |
| 8,351,634 | B2 | 1/2013 | Khenkin | |
| 8,369,901 | B2 | 2/2013 | Haulick | |
| 8,374,361 | B2 | 2/2013 | Moon | |
| 8,385,560 | B2 | 2/2013 | Solbeck | |
| 8,391,534 | B2 | 3/2013 | Ambrose et al. | |
| 8,401,198 | B2 | 3/2013 | Oh et al. | |
| 8,401,200 | B2 | 3/2013 | Tiscareno | |
| 8,411,880 | B2 | 4/2013 | Wang | |
| 8,437,492 | B2 | 5/2013 | Goldstein et al. | |
| 8,447,370 | B2 | 5/2013 | Ueda | |
| 8,462,969 | B2 | 6/2013 | Claussen | |
| 8,462,974 | B2 | 6/2013 | Jeong | |
| 8,472,616 | B1 | 6/2013 | Jiang | |
| 8,477,955 | B2 | 7/2013 | Engle | |
| 8,488,799 | B2 | 7/2013 | Goldstein et al. | |
| 8,493,204 | B2 | 7/2013 | Wong et al. | |
| 8,514,100 | B2 | 8/2013 | Yamashita | |
| 8,515,089 | B2 | 8/2013 | Nicholson | |
| 8,522,916 | B2 | 9/2013 | Keady | |
| 8,548,181 | B2 | 10/2013 | Kraemer | |
| 8,550,206 | B2 | 10/2013 | Keady et al. | |
| 8,554,350 | B2 | 10/2013 | Keady et al. | |
| 8,577,052 | B2 | 11/2013 | Silber et al. | |
| 8,577,062 | B2 | 11/2013 | Goldstein | |
| 8,594,341 | B2 | 11/2013 | Rothschild | |
| 8,600,067 | B2 | 12/2013 | Usher et al. | |
| 8,611,548 | B2 | 12/2013 | Bizjak | |
| 8,611,560 | B2 | 12/2013 | Goldstein | |
| 8,625,818 | B2 | 1/2014 | Stultz | |
| 8,625,819 | B2 | 1/2014 | Goldstein | |
| 8,631,801 | B2 | 1/2014 | Keady | |
| 8,638,239 | B2 | 1/2014 | Cases et al. | |
| 8,649,540 | B2 | 2/2014 | Killion et al. | |
| 8,652,040 | B2 | 2/2014 | LeBoeuf | |
| 8,657,064 | B2 | 2/2014 | Staab et al. | |
| 8,678,011 | B2 | 3/2014 | Goldstein et al. | |
| 8,693,704 | B2 | 4/2014 | Kim | |
| 8,718,288 | B2 | 5/2014 | Woods | |
| 8,718,305 | B2 | 5/2014 | Usher | |
| 8,718,313 | B2 | 5/2014 | Keady | |
| 8,744,091 | B2 | 6/2014 | Chen et al. | |
| 8,750,295 | B2 | 6/2014 | Liron | |
| 8,774,433 | B2 | 7/2014 | Goldstein | |
| 8,774,435 | B2 | 7/2014 | Ambrose et al. | |
| 8,792,648 | B2 | 7/2014 | Kim | |
| 8,792,669 | B2 | 7/2014 | Harsch | |
| 8,798,278 | B2 | 8/2014 | Isabelle | |
| 8,798,279 | B2 | 8/2014 | Ranta | |
| 8,798,289 | B1 | 8/2014 | Every | |
| 8,804,974 | B1 | 8/2014 | Melanson | |
| 8,848,939 | B2 | 9/2014 | Keady et al. | |
| 8,851,372 | B2 | 10/2014 | Zhou | |
| 8,855,343 | B2 | 10/2014 | Usher | |
| 8,903,113 | B2 | 12/2014 | Gebert | |
| 8,917,880 | B2 | 12/2014 | Goldstein et al. | |
| 8,917,892 | B2 | 12/2014 | Poe | |
| 8,917,894 | B2 | 12/2014 | Goldstein | |
| 8,942,370 | B2 | 1/2015 | Li | |
| 8,942,405 | B2 | 1/2015 | Jones et al. | |
| 8,948,428 | B2 | 2/2015 | Kates | |
| 8,983,081 | B2 | 3/2015 | Bayley | |
| 8,992,710 | B2 | 3/2015 | Keady | |
| 9,002,023 | B2 | 4/2015 | Gauger | |
| 9,013,351 | B2 | 4/2015 | Park | |
| 9,037,458 | B2 | 5/2015 | Park et al. | |
| 9,041,545 | B2 | 5/2015 | Zelepugas | |
| 9,053,697 | B2 | 6/2015 | Park | |
| 9,076,427 | B2 | 7/2015 | Alderson | |
| 9,112,701 | B2 | 8/2015 | Sano | |
| 9,113,240 | B2 | 8/2015 | Ramakrishman | |
| 9,113,267 | B2 | 8/2015 | Usher et al. | |
| 9,123,323 | B2 | 9/2015 | Keady | |
| 9,123,343 | B2 | 9/2015 | Kurki-Suonio | |
| 9,124,982 | B2 | 9/2015 | Goldstein et al. | |
| 9,135,797 | B2 | 9/2015 | Couper et al. | |
| 9,135,809 | B2 | 9/2015 | Chang | |
| 9,137,597 | B2 | 9/2015 | Usher | |
| 9,138,353 | B2 | 9/2015 | Keady | |
| 9,142,207 | B2 | 9/2015 | Hendrix | |
| 9,165,567 | B2 | 10/2015 | Visser | |
| 9,185,481 | B2 | 11/2015 | Goldstein et al. | |
| 9,191,732 | B2 | 11/2015 | Wurtz | |
| 9,191,740 | B2 | 11/2015 | McIntosh | |
| 9,196,247 | B2 | 11/2015 | Harada | |
| 9,216,237 | B2 | 12/2015 | Keady | |
| 9,270,244 | B2 | 2/2016 | Usher et al. | |
| 9,288,592 | B2 | 3/2016 | Basseas | |
| 9,338,568 | B2 | 5/2016 | van Hal | |
| 9,357,288 | B2 | 5/2016 | Goldstein | |
| 9,369,814 | B2 | 6/2016 | Victorian | |
| 9,445,183 | B2 | 9/2016 | Dahl | |
| 9,462,100 | B2 | 10/2016 | Usher et al. | |
| 9,491,542 | B2 | 11/2016 | Usher | |
| 9,497,423 | B2 | 11/2016 | Moberly | |
| 9,509,269 | B1 * | 11/2016 | Rosenberg | H03G 3/32 |
| 9,539,147 | B2 | 1/2017 | Keady et al. | |
| 9,554,733 | B2 | 1/2017 | Henriksen et al. | |
| 9,609,424 | B2 | 3/2017 | Goldstein | |
| 9,628,896 | B2 | 4/2017 | Ichimura | |
| 9,648,436 | B2 | 5/2017 | Kraft et al. | |
| 9,653,869 | B1 | 5/2017 | Hersman et al. | |
| 9,684,778 | B2 | 6/2017 | Tharappel | |
| 9,685,921 | B2 | 6/2017 | Smith | |
| 9,757,069 | B2 | 9/2017 | Keady et al. | |
| 9,763,003 | B2 | 9/2017 | Usher | |
| 9,779,716 | B2 | 10/2017 | Gadonniex | |
| 9,781,530 | B2 | 10/2017 | Usher et al. | |
| 9,843,854 | B2 | 12/2017 | Keady | |
| 9,894,452 | B1 | 2/2018 | Termeulen | |
| 9,943,185 | B2 | 4/2018 | Chen | |
| 10,012,529 | B2 | 7/2018 | Goldstein et al. | |
| 10,045,107 | B2 | 8/2018 | Kirsch et al. | |
| 10,142,332 | B2 | 11/2018 | Ravindran | |
| 10,190,904 | B2 | 1/2019 | Goldstein et al. | |

(56) References Cited

U.S. PATENT DOCUMENTS

| | | | |
|---|---|---|---|
| 10,284,939 | B2 | 5/2019 | Radin |
| 10,297,246 | B2 | 5/2019 | Asada |
| 10,361,673 | B1 | 7/2019 | Matsukawa |
| 10,365,883 | B2 | 7/2019 | Goldstein et al. |
| 10,413,197 | B2 | 9/2019 | LeBoeuf |
| 10,506,320 | B1 | 12/2019 | Lott |
| 10,709,339 | B1 | 7/2020 | Lusted |
| 10,760,948 | B2 | 9/2020 | Goldstein |
| 10,848,827 | B2 | 11/2020 | Sengupta et al. |
| 10,917,711 | B2 | 2/2021 | Higgins |
| 10,966,015 | B2 | 3/2021 | Usher |
| 10,970,375 | B2 | 4/2021 | Shila |
| 10,979,836 | B2 | 4/2021 | Usher et al. |
| 11,006,198 | B2 | 5/2021 | Lott |
| 11,012,770 | B2 | 5/2021 | Hatfield et al. |
| 11,039,259 | B2 | 6/2021 | Goldstein et al. |
| 11,051,704 | B1 | 7/2021 | Tran |
| 11,057,701 | B2 | 7/2021 | Goldstein et al. |
| 11,115,750 | B2 | 9/2021 | Monsarrant-Chanon |
| 11,122,357 | B2 | 9/2021 | Burnett |
| 11,172,298 | B2 | 11/2021 | Carrigan |
| 11,217,237 | B2 | 1/2022 | Usher et al. |
| 11,244,666 | B2 | 2/2022 | Goldstein et al. |
| 11,277,682 | B2 | 3/2022 | Usher |
| 11,277,700 | B2 | 3/2022 | Goldstein |
| 11,294,619 | B2 | 4/2022 | Usher et al. |
| 11,383,158 | B2 | 7/2022 | Bonanno |
| 11,393,486 | B1 | 7/2022 | Woodruff et al. |
| 11,610,587 | B2 | 3/2023 | Goldstein et al. |
| 11,659,315 | B2 | 5/2023 | Perez et al. |
| 11,665,493 | B2 | 5/2023 | Usher et al. |
| 11,710,473 | B2 | 7/2023 | Goldstein et al. |
| 11,750,965 | B2 | 9/2023 | Usher et al. |
| 2001/0041559 | A1 | 11/2001 | Salabaschew |
| 2001/0046304 | A1 | 11/2001 | Rast |
| 2002/0003889 | A1 | 1/2002 | Fischer |
| 2002/0009203 | A1 | 1/2002 | Erten |
| 2002/0018798 | A1 | 2/2002 | Sewing et al. |
| 2002/0026311 | A1 | 2/2002 | Okitsu |
| 2002/0057817 | A1 | 5/2002 | Darbut |
| 2002/0069056 | A1 | 6/2002 | Nofsinger |
| 2002/0076057 | A1 | 6/2002 | Voix |
| 2002/0076059 | A1 | 6/2002 | Joynes |
| 2002/0085690 | A1 | 7/2002 | Davidson et al. |
| 2002/0098878 | A1 | 7/2002 | Mooney |
| 2002/0106091 | A1 | 8/2002 | Furst et al. |
| 2002/0111798 | A1 | 8/2002 | Huang |
| 2002/0116541 | A1 | 8/2002 | Parker et al. |
| 2002/0118798 | A1 | 8/2002 | Langhart et al. |
| 2002/0123893 | A1 | 9/2002 | Woodward |
| 2002/0133513 | A1 | 9/2002 | Townsend et al. |
| 2002/0135485 | A1 | 9/2002 | Arakawa |
| 2002/0141599 | A1 | 10/2002 | Trajkovic |
| 2002/0141602 | A1 | 10/2002 | Nemirovski |
| 2002/0143534 | A1 | 10/2002 | Hol |
| 2002/0165719 | A1 | 11/2002 | Wang |
| 2002/0169596 | A1 | 11/2002 | Brill et al. |
| 2002/0169615 | A1 | 11/2002 | Kruger et al. |
| 2002/0191799 | A1 | 12/2002 | Nordqvist |
| 2002/0191952 | A1 | 12/2002 | Fiore |
| 2002/0193130 | A1 | 12/2002 | Yang |
| 2003/0008633 | A1 | 1/2003 | Bartosik |
| 2003/0026438 | A1 | 2/2003 | Ray |
| 2003/0032447 | A1 | 2/2003 | Bulthuis |
| 2003/0033152 | A1 | 2/2003 | Cameron |
| 2003/0035551 | A1 | 2/2003 | Light |
| 2003/0048882 | A1 | 3/2003 | Smith |
| 2003/0050777 | A1 | 3/2003 | Walker |
| 2003/0055627 | A1 | 3/2003 | Balan |
| 2003/0061032 | A1 | 3/2003 | Gonopolskiy |
| 2003/0065512 | A1 | 4/2003 | Walker |
| 2003/0065620 | A1 | 4/2003 | Gailey et al. |
| 2003/0069002 | A1 | 4/2003 | Hunter |
| 2003/0083879 | A1 | 5/2003 | Cyr et al. |
| 2003/0083883 | A1 | 5/2003 | Cyr et al. |
| 2003/0110040 | A1 | 6/2003 | Holland et al. |
| 2003/0130016 | A1 | 7/2003 | Matsuura |
| 2003/0138118 | A1 | 7/2003 | Stahl |
| 2003/0151678 | A1 | 8/2003 | Lee et al. |
| 2003/0152359 | A1 | 8/2003 | Kim |
| 2003/0156725 | A1 | 8/2003 | Boone |
| 2003/0161097 | A1 | 8/2003 | Le et al. |
| 2003/0165246 | A1 | 9/2003 | Kvaloy et al. |
| 2003/0165319 | A1 | 9/2003 | Barber |
| 2003/0198357 | A1 | 10/2003 | Schneider |
| 2003/0198359 | A1 | 10/2003 | Killion |
| 2003/0200096 | A1 | 10/2003 | Asai |
| 2003/0228019 | A1 | 12/2003 | Eichler |
| 2003/0228023 | A1 | 12/2003 | Burnett |
| 2004/0008850 | A1 | 1/2004 | Gustavsson |
| 2004/0019482 | A1 | 1/2004 | Holub |
| 2004/0042103 | A1 | 3/2004 | Mayer |
| 2004/0047474 | A1 | 3/2004 | Vries |
| 2004/0047486 | A1 | 3/2004 | Van Doom |
| 2004/0049385 | A1 | 3/2004 | Lovance et al. |
| 2004/0086138 | A1 | 5/2004 | Kuth |
| 2004/0088162 | A1 | 5/2004 | He et al. |
| 2004/0109579 | A1 | 6/2004 | Izuchi |
| 2004/0109668 | A1 | 6/2004 | Stuckman |
| 2004/0125965 | A1 | 7/2004 | Alberth, Jr. et al. |
| 2004/0128136 | A1 | 7/2004 | Irani |
| 2004/0133421 | A1 | 7/2004 | Burnett |
| 2004/0150717 | A1 | 8/2004 | Page |
| 2004/0160573 | A1 | 8/2004 | Jannard |
| 2004/0165742 | A1 | 8/2004 | Shennib |
| 2004/0179694 | A1 | 9/2004 | Alley |
| 2004/0185804 | A1 | 9/2004 | Kanamori |
| 2004/0190737 | A1 | 9/2004 | Kuhnel et al. |
| 2004/0196992 | A1 | 10/2004 | Ryan |
| 2004/0202333 | A1 | 10/2004 | Csermak |
| 2004/0202339 | A1 | 10/2004 | O'Brien |
| 2004/0202340 | A1 | 10/2004 | Armstrong |
| 2004/0203351 | A1 | 10/2004 | Shearer et al. |
| 2004/0252852 | A1 | 12/2004 | Taenzer |
| 2004/0258263 | A1 | 12/2004 | Saxton et al. |
| 2004/0264938 | A1 | 12/2004 | Felder |
| 2005/0008167 | A1 | 1/2005 | Gleissner |
| 2005/0028212 | A1 | 2/2005 | Laronne |
| 2005/0033384 | A1 | 2/2005 | Sacha |
| 2005/0033571 | A1 | 2/2005 | Huang |
| 2005/0047611 | A1 | 3/2005 | Mao |
| 2005/0049854 | A1 | 3/2005 | Reding |
| 2005/0058300 | A1 | 3/2005 | Suzuki |
| 2005/0058313 | A1 | 3/2005 | Victorian |
| 2005/0060142 | A1 | 3/2005 | Visser |
| 2005/0068171 | A1 | 3/2005 | Kelliher |
| 2005/0070337 | A1 | 3/2005 | Byford |
| 2005/0071158 | A1 | 3/2005 | Byford |
| 2005/0071626 | A1 | 3/2005 | Bear |
| 2005/0077102 | A1 | 4/2005 | Banter et al. |
| 2005/0078838 | A1 | 4/2005 | Simon |
| 2005/0078842 | A1 | 4/2005 | Vonlanthen |
| 2005/0090295 | A1 | 4/2005 | Ali |
| 2005/0096764 | A1 | 5/2005 | Weiser |
| 2005/0096899 | A1 | 5/2005 | Padhi et al. |
| 2005/0102142 | A1 | 5/2005 | Soufflet |
| 2005/0114124 | A1 | 5/2005 | Liu |
| 2005/0123146 | A1 | 6/2005 | Voix et al. |
| 2005/0134710 | A1 | 6/2005 | Nomura |
| 2005/0157891 | A1 | 7/2005 | Johansen |
| 2005/0163289 | A1 | 7/2005 | Caspi et al. |
| 2005/0175194 | A1 | 8/2005 | Anderson |
| 2005/0182620 | A1 | 8/2005 | Kabi |
| 2005/0202857 | A1 | 9/2005 | Seshadri et al. |
| 2005/0207597 | A1 | 9/2005 | Kageyama |
| 2005/0207605 | A1 | 9/2005 | Dehe |
| 2005/0215907 | A1 | 9/2005 | Toda |
| 2005/0216531 | A1 | 9/2005 | Blandford |
| 2005/0222820 | A1 | 10/2005 | Chung |
| 2005/0227674 | A1 | 10/2005 | Kopra |
| 2005/0254640 | A1 | 11/2005 | Ohki |
| 2005/0254676 | A1 | 11/2005 | Rass |
| 2005/0258942 | A1 | 11/2005 | Manasseh |
| 2005/0260978 | A1 | 11/2005 | Rader |

(56) References Cited

U.S. PATENT DOCUMENTS

2005/0264425 A1 12/2005 Sato
2005/0281422 A1 12/2005 Armstrong
2005/0281423 A1 12/2005 Armstrong
2005/0283369 A1 12/2005 Clausner et al.
2005/0288057 A1 12/2005 Lai et al.
2006/0013410 A1 1/2006 Wurtz
2006/0018496 A1 1/2006 Niederdrank et al.
2006/0053007 A1 3/2006 Niemisto
2006/0064037 A1 3/2006 Shalon et al.
2006/0067551 A1 3/2006 Cartwright et al.
2006/0074895 A1 4/2006 Belknap
2006/0083387 A1 4/2006 Emoto
2006/0083388 A1 4/2006 Rothschild
2006/0083390 A1 4/2006 Kaderavek
2006/0083395 A1 4/2006 Allen et al.
2006/0088176 A1 4/2006 Werner
2006/0092043 A1 5/2006 Lagassey
2006/0095199 A1 5/2006 Lagassey
2006/0114749 A1* 6/2006 Baxter ..................... G01S 5/22 367/128
2006/0116175 A1 6/2006 Chu
2006/0116877 A1 6/2006 Pickering
2006/0120545 A1 6/2006 Rasmussen
2006/0126821 A1 6/2006 Sahashi
2006/0126865 A1 6/2006 Blamey
2006/0140425 A1 6/2006 Berg
2006/0147063 A1 7/2006 Chen
2006/0153394 A1 7/2006 Beasley
2006/0154642 A1 7/2006 Scannell, Jr.
2006/0167687 A1 7/2006 Kates
2006/0173563 A1 8/2006 Borovitski
2006/0182287 A1 8/2006 Schulein
2006/0182295 A1 8/2006 Dijkstra et al.
2006/0184983 A1 8/2006 Casey
2006/0188075 A1 8/2006 Peterson
2006/0188105 A1 8/2006 Baskerville
2006/0195322 A1 8/2006 Broussard et al.
2006/0204014 A1 9/2006 Isenberg et al.
2006/0222185 A1 10/2006 Dyer et al.
2006/0223547 A1 10/2006 Chin et al.
2006/0233413 A1 10/2006 Nam
2006/0241948 A1 10/2006 Abrash
2006/0244549 A1 11/2006 Takahata
2006/0253282 A1 11/2006 Schmidt et al.
2006/0258325 A1 11/2006 Tsutaichi
2006/0262935 A1 11/2006 Goose
2006/0262938 A1 11/2006 Gauger
2006/0262944 A1 11/2006 Reber
2006/0264176 A1 11/2006 Hong
2006/0274166 A1 12/2006 Lee
2006/0285709 A1 12/2006 Barthel
2006/0287014 A1 12/2006 Matsuura
2007/0003090 A1 1/2007 Anderson
2007/0009122 A1 1/2007 Hamacher
2007/0009127 A1 1/2007 Harald
2007/0014423 A1 1/2007 Darbut
2007/0019817 A1 1/2007 Siltmann
2007/0021148 A1 1/2007 Mahini
2007/0021958 A1 1/2007 Visser et al.
2007/0027676 A1 2/2007 Chambers et al.
2007/0036377 A1 2/2007 Stirnemann
2007/0041589 A1 2/2007 Patel et al.
2007/0043563 A1 2/2007 Comerford et al.
2007/0076896 A1 4/2007 Hosaka
2007/0086600 A1 4/2007 Boesen
2007/0092087 A1 4/2007 Bothra
2007/0100637 A1 5/2007 McCune
2007/0126503 A1 6/2007 Hsieh et al.
2007/0127660 A1 6/2007 Roberts et al.
2007/0143820 A1 6/2007 Pawlowski
2007/0147635 A1 6/2007 Dijkstra
2007/0160243 A1 7/2007 Dijkstra
2007/0172087 A1 7/2007 Olsen
2007/0177743 A1 8/2007 Mertens
2007/0185601 A1 8/2007 Lee
2007/0189544 A1 8/2007 Rosenberg
2007/0194893 A1 8/2007 Deyoe
2007/0201705 A1 8/2007 Dorogusker et al.
2007/0206825 A1 9/2007 Thomasson
2007/0223717 A1 9/2007 Boersma
2007/0225035 A1 9/2007 Gauger
2007/0230734 A1 10/2007 Beard
2007/0233487 A1 10/2007 Cohen
2007/0239294 A1 10/2007 Brueckner
2007/0253569 A1 11/2007 Bose
2007/0255435 A1 11/2007 Cohen
2007/0260460 A1 11/2007 Hyatt
2007/0274531 A1 11/2007 Camp
2007/0281744 A1 12/2007 Andreasson
2007/0291953 A1 12/2007 Ngia et al.
2008/0037801 A1 2/2008 Alves et al.
2008/0063228 A1 3/2008 Mejia
2008/0069369 A1 3/2008 Dyer
2008/0079571 A1 4/2008 Samadani
2008/0089530 A1 4/2008 Bostick et al.
2008/0091421 A1 4/2008 Gustavsson
2008/0101638 A1 5/2008 Ziller
2008/0107282 A1 5/2008 Asada
2008/0107297 A1 5/2008 Fischer et al.
2008/0123866 A1 5/2008 Rule
2008/0129520 A1 6/2008 Lee
2008/0130908 A1 6/2008 Cohen
2008/0137873 A1 6/2008 Goldstein
2008/0145032 A1 6/2008 Lindroos
2008/0152167 A1 6/2008 Taenzer
2008/0152169 A1 6/2008 Asada
2008/0159547 A1 7/2008 Schuler
2008/0162133 A1 7/2008 Couper
2008/0165988 A1 7/2008 Terlizzi et al.
2008/0175411 A1 7/2008 Greve
2008/0181419 A1 7/2008 Goldstein
2008/0201138 A1 8/2008 Visser
2008/0221880 A1 9/2008 Cerra et al.
2008/0240458 A1 10/2008 Goldstein
2008/0257047 A1 10/2008 Pelecanos
2008/0260180 A1 10/2008 Goldstein
2008/0269926 A1 10/2008 Xiang
2009/0010456 A1 1/2009 Goldstein et al.
2009/0016501 A1 1/2009 May
2009/0016541 A1 1/2009 Goldstein
2009/0024234 A1 1/2009 Archibald
2009/0034748 A1 2/2009 Sibbald
2009/0046867 A1 2/2009 Clemow
2009/0067661 A1 3/2009 Keady
2009/0071487 A1 3/2009 Keady
2009/0076821 A1 3/2009 Brenner
2009/0085873 A1 4/2009 Betts
2009/0087003 A1 4/2009 Zurek
2009/0122996 A1 5/2009 Klein
2009/0175474 A1 7/2009 Salvetti
2009/0180631 A1 7/2009 Michael
2009/0192688 A1 7/2009 Padmanabhan
2009/0227888 A1 9/2009 Salmi
2009/0238386 A1 9/2009 Usher
2009/0274314 A1 11/2009 Arndt
2009/0286515 A1 11/2009 Othmer
2010/0061564 A1 3/2010 Clemow et al.
2010/0119077 A1 5/2010 Platz
2010/0136950 A1 6/2010 Backlund et al.
2010/0150367 A1 6/2010 Mizuno
2010/0166203 A1 7/2010 Peissig
2010/0223223 A1 9/2010 Sandler
2010/0241256 A1 9/2010 Goldstein et al.
2010/0296668 A1 11/2010 Lee et al.
2010/0316033 A1 12/2010 Atwal
2010/0328224 A1 12/2010 Kerr et al.
2011/0026724 A1 2/2011 Doclo
2011/0055256 A1 3/2011 Phillips
2011/0069845 A1 3/2011 Cohen
2011/0079227 A1 4/2011 Turncot et al.
2011/0096939 A1 4/2011 Ichimura
2011/0116643 A1 5/2011 Tiscareno
2011/0125063 A1 5/2011 Shalon
2011/0135120 A1 6/2011 Larsen

(56) References Cited

U.S. PATENT DOCUMENTS

| | | | |
|---|---|---|---|
| 2011/0187640 | A1 | 8/2011 | Jacobsen et al. |
| 2011/0264447 | A1 | 10/2011 | Visser et al. |
| 2011/0288860 | A1 | 11/2011 | Schevciw |
| 2011/0293103 | A1 | 12/2011 | Park et al. |
| 2011/0299695 | A1 | 12/2011 | Nicholson |
| 2012/0076317 | A1 | 3/2012 | Fratti |
| 2012/0170412 | A1 | 7/2012 | Calhoun |
| 2013/0098706 | A1 | 4/2013 | Keady |
| 2013/0136285 | A1 | 5/2013 | Naumann |
| 2013/0149192 | A1 | 6/2013 | Keady |
| 2013/0219345 | A1 | 8/2013 | Saukko |
| 2013/0251172 | A1 | 9/2013 | Mosseri |
| 2014/0003644 | A1 | 1/2014 | Keady et al. |
| 2014/0010378 | A1 | 1/2014 | Voix |
| 2014/0023203 | A1 | 1/2014 | Rotschild |
| 2014/0026665 | A1 | 1/2014 | Keady |
| 2014/0089672 | A1 | 3/2014 | Luna |
| 2014/0122092 | A1 | 5/2014 | Goldstein |
| 2014/0126748 | A1 | 5/2014 | Usher et al. |
| 2014/0148101 | A1 | 5/2014 | Seshadri |
| 2014/0163976 | A1 | 6/2014 | Park |
| 2014/0166122 | A1 | 6/2014 | Goldstein et al. |
| 2014/0185828 | A1 | 7/2014 | Helbling |
| 2014/0205123 | A1 | 7/2014 | Lafort et al. |
| 2014/0270200 | A1 | 9/2014 | Usher et al. |
| 2014/0373854 | A1 | 12/2014 | Keady |
| 2015/0150728 | A1 | 6/2015 | Duvall |
| 2015/0170645 | A1 | 6/2015 | Di et al. |
| 2015/0195641 | A1 | 7/2015 | Di et al. |
| 2015/0215701 | A1 | 7/2015 | Usher |
| 2015/0358730 | A1 | 12/2015 | Kirsch |
| 2016/0012714 | A1 | 1/2016 | Patenaude |
| 2016/0015568 | A1 | 1/2016 | Keady |
| 2016/0019024 | A1 | 1/2016 | Suzuki et al. |
| 2016/0050483 | A1 | 2/2016 | Kulavik et al. |
| 2016/0058378 | A1 | 3/2016 | Wisby et al. |
| 2016/0104452 | A1 | 4/2016 | Guan et al. |
| 2016/0127818 | A1 | 5/2016 | Ambrose |
| 2016/0192077 | A1 | 6/2016 | Keady |
| 2016/0249128 | A1 | 8/2016 | Goldstein |
| 2016/0277854 | A1 | 9/2016 | Puria |
| 2016/0295311 | A1 | 10/2016 | Keady et al. |
| 2017/0124847 | A1 | 5/2017 | Schulz et al. |
| 2017/0134865 | A1 | 5/2017 | Goldstein et al. |
| 2017/0142511 | A1 | 5/2017 | Dennis |
| 2017/0223451 | A1 | 8/2017 | Kirsch |
| 2018/0054668 | A1 | 2/2018 | Keady |
| 2018/0115818 | A1 | 4/2018 | Asada et al. |
| 2018/0132048 | A1 | 5/2018 | Usher et al. |
| 2018/0160211 | A1 | 6/2018 | Kirsch et al. |
| 2018/0220239 | A1 | 8/2018 | Keady et al. |
| 2018/0233125 | A1 | 8/2018 | Mitchell |
| 2019/0038224 | A1 | 2/2019 | Zhang |
| 2019/0082272 | A9 | 3/2019 | Goldstein et al. |
| 2019/0387305 | A1 | 12/2019 | Keady |
| 2020/0379717 | A1 | 12/2020 | Mazur et al. |
| 2020/0380945 | A1 | 12/2020 | Woodruff et al. |
| 2021/0014597 | A1 | 1/2021 | Andersen |
| 2021/0152924 | A1 | 5/2021 | Keady |
| 2022/0061767 | A1 | 3/2022 | Goldstein et al. |

FOREIGN PATENT DOCUMENTS

| | | | | | |
|---|---|---|---|---|---|
| CN | 101401399 | B | | 4/2009 | |
| CN | 103581803 | | | 2/2014 | |
| DE | 4312155 | | | 10/1994 | |
| DE | 102012221233 | | | 3/2014 | |
| DE | 102013203334 | | | 5/2014 | |
| EP | 0495653 | A1 | | 7/1992 | |
| EP | 0643881 | | | 12/1998 | |
| EP | 0935236 | | | 8/1999 | |
| EP | 1415505 | | | 12/2002 | |
| EP | 1033063 | B1 | | 5/2003 | |
| EP | 1320281 | | | 6/2003 | |
| EP | 0692169 | | | 7/2003 | |
| EP | 1483591 | | | 11/2003 | |
| EP | 1385324 | | | 1/2004 | |
| EP | 1385324 | A1 | | 1/2004 | |
| EP | 1401240 | | | 3/2004 | |
| EP | 1570244 | | | 6/2004 | |
| EP | 1489596 | | | 12/2004 | |
| EP | 1519625 | A2 | | 3/2005 | |
| EP | 1594344 | | | 9/2005 | |
| EP | 1638079 | | | 3/2006 | |
| EP | 1640972 | | | 3/2006 | |
| EP | 1640972 | A1 | | 3/2006 | |
| EP | 1674061 | | | 6/2006 | |
| EP | 1681903 | | | 7/2006 | |
| EP | 1800950 | | | 6/2007 | |
| EP | 1841283 | | | 10/2007 | |
| EP | 1322268 | B1 | | 1/2009 | |
| EP | 1313417 | B1 | | 2/2009 | |
| EP | 1313418 | B1 | | 3/2009 | |
| EP | 2749043 | | | 7/2014 | |
| EP | 2991381 | | | 4/2019 | |
| EP | 3068142 | | | 9/2019 | |
| FR | 2560520 | | | 9/1985 | |
| GB | 1518299 | | | 7/1978 | |
| GB | 2082820 | | | 8/1980 | |
| GB | 2311186 | A | * | 9/1997 | ........... H04R 25/453 |
| GB | 2441835 | | | 8/2008 | |
| JP | 02-097362 | A | | 4/1990 | |
| JP | 5145623 | | | 6/1993 | |
| JP | H05199590 | | | 8/1993 | |
| JP | H05336599 | | | 12/1993 | |
| JP | H0877468 | | | 3/1996 | |
| JP | H10162283 | | | 6/1998 | |
| JP | H10294989 | | | 11/1998 | |
| JP | 297362 | | | 9/1999 | |
| JP | 12878298 | | | 11/1999 | |
| JP | H11331990 | | | 11/1999 | |
| JP | 3085237 | | | 7/2000 | |
| JP | 2001045585 | | | 2/2001 | |
| JP | 2001054184 | | | 2/2001 | |
| JP | 2002-204500 | A | | 7/2002 | |
| JP | 3353701 | | | 12/2002 | |
| JP | 3353701 | B2 | | 12/2002 | |
| JP | 2003304599 | | | 10/2003 | |
| JP | 3556987 | | | 5/2004 | |
| JP | 2005064744 | | | 3/2005 | |
| JP | 2005130205 | | | 5/2005 | |
| JP | 2005168888 | | | 6/2005 | |
| JP | 2005227511 | | | 8/2005 | |
| JP | 2005260944 | | | 9/2005 | |
| JP | 2005295175 | | | 10/2005 | |
| JP | 2006107044 | | | 4/2006 | |
| JP | 2004289762 | | | 2/2007 | |
| JP | 2009003040 | | | 1/2009 | |
| JP | 5299030 | B2 | | 9/2013 | |
| JP | 2017147677 | | | 8/2017 | |
| KR | 20020086433 | | | 11/2002 | |
| KR | 100366231 | | | 12/2002 | |
| KR | 20030013732 | | | 2/2003 | |
| KR | 20030058432 | | | 7/2003 | |
| KR | 20030068021 | | | 8/2003 | |
| KR | 20030069471 | | | 8/2003 | |
| KR | 101154948 | | | 7/2006 | |
| KR | 100607492 | | | 8/2006 | |
| KR | 100783099 | | | 12/2007 | |
| KR | 101194923 | | | 10/2012 | |
| TW | 200615862 | | | 5/2006 | |
| WO | WO1986000133 | | | 1/1986 | |
| WO | 93/26084 | A1 | | 12/1993 | |
| WO | WO9326085 | | | 12/1993 | |
| WO | WO1993026085 | | | 12/1993 | |
| WO | WO1997025790 | | | 7/1997 | |
| WO | WO1998054878 | | | 12/1998 | |
| WO | WO1999043185 | | | 8/1999 | |
| WO | WO2001001731 | | | 1/2001 | |
| WO | WO2001057852 | | | 8/2001 | |
| WO | 01/89083 | A1 | | 11/2001 | |
| WO | WO2002013522 | | | 2/2002 | |
| WO | 02/17835 | A1 | | 3/2002 | |
| WO | WO2002017836 | | | 3/2002 | |

(56) References Cited

FOREIGN PATENT DOCUMENTS

| | | | |
|---|---|---|---|
| WO | WO2002093891 | | 11/2002 |
| WO | WO2002101720 | | 12/2002 |
| WO | WO2003023766 | | 3/2003 |
| WO | WO2003073790 | | 9/2003 |
| WO | WO2004016037 | | 2/2004 |
| WO | WO2006026812 | | 3/2004 |
| WO | WO2007028250 | | 3/2004 |
| WO | WO2004114722 | | 12/2004 |
| WO | WO2005029468 | | 3/2005 |
| WO | WO2005073875 | | 8/2005 |
| WO | WO2005107320 | | 11/2005 |
| WO | WO2006034029 | | 3/2006 |
| WO | 2006/036262 | A2 | 4/2006 |
| WO | 2006037156 | A1 | 4/2006 |
| WO | WO2006037156 | | 4/2006 |
| WO | WO2006054205 | | 5/2006 |
| WO | WO2006054698 | | 5/2006 |
| WO | WO2006074082 | | 7/2006 |
| WO | 2006/097099 | A1 | 9/2006 |
| WO | WO2006114101 | | 11/2006 |
| WO | WO2007007916 | | 1/2007 |
| WO | WO2007017809 | | 2/2007 |
| WO | WO2007017810 | | 2/2007 |
| WO | 2007/073818 | A1 | 7/2007 |
| WO | WO2007073818 | | 7/2007 |
| WO | WO2007082579 | | 7/2007 |
| WO | WO2007092660 | | 8/2007 |
| WO | WO2007147077 | | 12/2007 |
| WO | WO2008017326 | | 2/2008 |
| WO | WO2008050583 | | 5/2008 |
| WO | 2008/067454 | A2 | 6/2008 |
| WO | WO2008096125 | | 8/2008 |
| WO | 2009/023633 | A1 | 2/2009 |
| WO | WO2009023633 | | 2/2009 |
| WO | WO2009023784 | | 2/2009 |
| WO | WO2009097009 | | 8/2009 |
| WO | WO2011110901 | | 9/2011 |
| WO | WO2011161487 | | 12/2011 |
| WO | WO2012097150 | | 7/2012 |

OTHER PUBLICATIONS

*Samsung Electronics Co., Ltd., and Samsung Electronics, America, Inc.*, v. *Staton Techiya, LLC*, IPR2022-00242, Dec. 23, 2021.

*Samsung Electronics Co., Ltd., and Samsung Electronics, America, Inc.*, v. *Staton Techiya, LLC*, IPR2022-00243, Dec. 23, 2021.

*Samsung Electronics Co., Ltd., and Samsung Electronics, America, Inc.*, v. *Staton Techiya, LLC*, IPR2022-00234, Dec. 21, 2021.

*Samsung Electronics Co., Ltd., and Samsung Electronics, America, Inc.*, v. *Staton Techiya, LLC*, IPR2022-00253, Jan. 18, 2022.

*Samsung Electronics Co., Ltd., and Samsung Electronics, America, Inc.*, v. *Staton Techiya, LLC*, IPR2022-00324, Jan. 13, 2022.

*Samsung Electronics Co., Ltd., and Samsung Electronics, America, Inc.*, v. *Staton Techiya, LLC*, IPR2022-00281, Jan. 18, 2022.

*Samsung Electronics Co., Ltd., and Samsung Electronics, America, Inc.*, v. *Staton Techiya, LLC*, IPR2022-00302, Jan. 13, 2022.

*Samsung Electronics Co., Ltd., and Samsung Electronics, America, Inc.*, v. *Staton Techiya, LLC*, IPR2022-00369, Feb. 18, 2022.

*Samsung Electronics Co., Ltd., and Samsung Electronics, America, Inc.*, v. *Staton Techiya, LLC*, IPR2022-00388, Feb. 18, 2022.

*Samsung Electronics Co., Ltd., and Samsung Electronics, America, Inc.*, v. *Staton Techiya, LLC*, IPR2022-00410, Feb. 18, 2022.

*Samsung Electronics Co., Ltd., and Samsung Electronics, America, Inc.*, v. *Staton Techiya, LLC*, IPR2022-01078, Jun. 9, 2022.

*Samsung Electronics Co., Ltd., and Samsung Electronics, America, Inc.*, v. *Staton Techiya, LLC*, IPR2022-01099, Jun. 9, 2022.

*Samsung Electronics Co., Ltd., and Samsung Electronics, America, Inc.*, v. *Staton Techiya, LLC*, IPR2022-01106, Jun. 9, 2022.

*Samsung Electronics Co., Ltd., and Samsung Electronics, America, Inc.*, v. *Staton Techiya, LLC*, IPR2022-01098, Jun. 9, 2022.

*Samsung Electronics Co., Ltd., and Samsung Electronics, America, Inc.*, v. *Staton Techiya, LLC*, IPR2022-00559, Feb. 9, 2024.

U.S. Appl. No. 90/015,146, Samsung Electronics Co., Ltd. and Samsung Electronics, America, Inc., Request for Ex Parte Reexamination of U.S. Pat. No. 10,979,836.

U.S. Appl. No. 90/019,169, Samsung Electronics Co., Ltd. and Samsung Electronics, America, Inc., Request for Ex Parte Reexamination of U.S. Pat. No. 11,244,666.

Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 1A-1C for U.S. Pat. No. 8,111,839 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 2A-2C for U.S. Pat. No. 8,254,591 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 3A-3C for U.S. Pat. No. 8,315,400 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 4A-4C for U.S. Pat. No. 9,124,982 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 5A-5C for U.S. Pat. No. 9,270,244 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 6A-6C for U.S. Pat. No. 9,491,542 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 7A-7C for U.S. Pat. No. 9,609,424 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 8A-8C for U.S. Pat. No. 10,405,082 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 9A-9Cfor U.S. Pat. No. 8,111,839 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 10A-10C for U.S. Pat. No. 10,979,836 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 11A-11C for U.S. Pat. No. 11,039,259 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 12A-12C for U.S. Pat. No. 11,057,701 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

Appendix 13A-13C for U.S. Pat. No. 11,217,237 to Samsung's Invalidity Contentions and P.R. 3-3 and 3-4 Disclosures for U.S. Pat. Nos. 8,111,839, 8,254,591, 8,315,400, 9,124,982, 9,270,244,

(56) References Cited

OTHER PUBLICATIONS 9,491,542, 9,609,424, 10,405,082, 10,966,015 (Case No. 2:22-CV-00053-JRG-RSP), served May 18, 2022.
Appendix 14A-14C for U.S. Pat. No. 11,244,666 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A1 (NACRE QuietPro) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A2 (Silynx QuietOps) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A3 (Motorola H5) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A4 (Jawbone Aliph) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A5 (Snooper) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A6 (NCH Swift) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A11 (NaturalRecorder) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A20 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A21 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A22 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A23 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A24 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A25 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A26 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A27 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A28 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A29 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A30 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A31 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A32 (Olympus WS-320M) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. A33 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A34 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. A35 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. B19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. C14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. C15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D20 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D21 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D22 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D23 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D24 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D25 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D26 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D27 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D28 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D29 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D30 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D31 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. D32 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. E2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E9 (corrected) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. E18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F4 (corrected) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F5 (corrected) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F9 (corrected) to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. F15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. F18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G20 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G21 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G22 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G23 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G24 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G25 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G26 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G27 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G28 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G29 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G30 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G31 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. G32 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G33 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G34 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. G35 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. H20 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served 18, 2022.
Ex. I1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served 18, 2022.
Ex. I2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.

(56) References Cited

OTHER PUBLICATIONS

Ex. I16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. I18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J1 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J2 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J3 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J4 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J5 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J6 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J7 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J8 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J9 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J10 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J11 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J12 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J13 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J14 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J15 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J16 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J17 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J18 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J19 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J20 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J21 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J22 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J23 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J24 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J25 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J26 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J27 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J28 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J29 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Ex. J30 to Samsung's Invalidity Contentions and P.R. 3-3 and 3-4 Disclosures for U.S. Pat. Nos. 8,111,839, 8,254,591, 8,315,400, 9,124,982, 9,270,244, 9,491,542, 9,609,424, 10,405,082, 10,966,015 (Case No. 2:22-CV-00053-JRG-RSP), served May 18, 2022.
Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K1 (Calhoun) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit K2 (Cerra) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K3 (Chen '353) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K4 (Comerford) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K5 (Couper) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K6 (Emoto) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K7 (Zaykovskiy) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K8 (Hunter) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K9 (Jones) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K10 (Kelliher) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K11 (Kopra) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K12 (Lagassey '043) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K13 (Lemelson) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K14 (Pickering) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K15 (Schuler) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K16 (Soufflet) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K17 (White) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K18 (BlueAnt V1) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K19 (LG Chocolate) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K20 (Midomi) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K21 (Promptu) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K22 (Samsung SCH-a950) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K23 (W850) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K24 (Ears) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K25 (Motorola Pebl) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K26 (Silynx QuietOps) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K27 (Nacre QuietPro) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K28 (Shazam) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K29 (Vlingo) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit K30 (Yoon) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L1 (Alves 801) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L2 (Burnett 421) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L3 (Hietanen) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L4 (Huang 798) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L5 (Jaber) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L6 (LG HBM-730) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit L7 (Nokia BH-600) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L8 (Nokia BH-900) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L9 (Pedersen) to Samsung's Invalidity Contentions and P.R. 3-3 And 3-4 Disclosures for U.S. Patent Nos. 11,039,259, 11,057,701, 11,217,237, and 11,244,666 (Case No. 2:22-CV-00053-JRG-RSP), served Jul. 6, 2022.
Exhibit L10 (QuietOps) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L11 (QuietPro) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L12 (Visser '958) to Samsung's Invalidity Contentions and P.R. 3-3 and 3- 4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L13 (Zhang 099) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L14 (Byford) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L15 (Mejia '156) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit L16 (Yang '130) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M1 (Armstrong) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M2 (Boersma) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M3 (Dijsktra 972) to Samsung's Invalidity Contentions and P.R. 3-3 and 3-Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M4 (Hamacher 031) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M5 (Hietanen) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M6 (Hotvet) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M7 (Kondo 701) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M8 (Kvaløy) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M9 (Light) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M10 (Melanson) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M11 (Nemirovski 368) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M12 (Platz 077) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M13 (Rasmussen 245) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M14 (Svean 359) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M15 (Victorian 625) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M16 (Zurek 379) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M17 (Jawbone) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M18 (QuietOps) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M19 (Nacre QuietPro) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M20 (SenSay) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M21 (Andrea) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M22 (Darbut) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit M23 (Ramakrishnan) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N1 (Platz 077) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N2 (Kvaløy) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit N3 (Inanaga) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N4 (Rosenberg) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N5 (Visser 958) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N6 (Terlizzi) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N7 (Light) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N8 (Boersma) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N9 (McCune) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N10 (Bose) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N11 (Emoto) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N12 (Dijkstra 243) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N13 (Cohen 908) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N14 (Rast) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N15 (Bothra 629) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N16 (Victorian 625) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N17 (Engle) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N18 (Svean 359) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N19 (Hotvet) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N20 (Killion 056) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N21 (Bothra 087) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N22 (Melanson) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N23 (Andrea) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N24 (Hohman) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N25 (Bergeron) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N26 (Frank) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N27 (Darbut 423) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N28 (QuietPro) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N29 (QuietOps) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N30 (Jawbone) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N31 (EarSet 2) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N32 (Etymotic ER-6) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N33 (Zen) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N34 (Motorola H605) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N35 (Peltor Lite-Com II) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N36 (Discovery 655) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N37 (MX200 Series) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.

(56) References Cited

OTHER PUBLICATIONS

Exhibit N38 (Sony S700) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N39 (H5 Miniblue) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N40 (3D Active Ambient IEM) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N41 (Armstrong 422) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N42 (Hohn) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N43 (Mejia 228) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N44 (Nemirovski 368) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N45 (Thomasson) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N46 (Zurek 003) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N47 (Kurcan) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N48 (Rafaely) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N49 (Vaidyanathan) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N50 (Westerlund) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
Exhibit N51 (Zhang) to Samsung's Invalidity Contentions and P.R. 3-3 and 3-4 Disclosures for U.S. Pat. Nos. 11,039,259, 11,057,701, 11,217,237, and 11,244,666 (Case No. 2:22-CV-00053-JRG-RSP), served Jul. 6, 2022.
3M/Aearo Technologies' E-A-RFitTM Validation System ("E-A-RFit"), Sep. 10, 2015 WayBack Machine capture of 3M's website depicts a brochure describing the E-A-RFit and "Individual Fit Testing Using F-Mire." https://web.archive.org/web/20150910084252/http:/multimedia.3m.com/mws/media/10622 67O/earfit-dual-ear-brochure- us.pdf?fn-EARfit%20Dual-Ear%20Brochure%20US.pdf (SAM-TECH_00052333 - SAM-TECH_00052336; SAM-TECH_00052339 - SAM-TECH_00052339).
3M/Aearo Technologies' E-A-RFitTM Validation System ("E-A-RFit"), 2010 brochure from 3M's website describes the E-A-RFit and identifies model 393-1000 as an available mode. https://multimedia.3m.com/mws/media/62914 9O/3m-e-a-rfit-validation-system- brochure.pdf (SAM-TECH_00052186).
3M/Aearo Technologies' E-A-RFitTM Validation System ("E-A-RFit"), Abstract titled "New from ISEA member 3M Company (www.3m.com] is the E-A-Rfit Validation System a quantitative hearing protector fittest", published in Jul. 2012. New from ISEA member 3M Company (www.3m.com] is the E-A-Rfit Validation System a quantitative hearing protector fittest, EHS today, vol. 5, Issue 7, ISSN 1945-9599, Gale Group Trade & Industry Database (Jul. 2012), available at https://dialog.proquest.com/professional/docview/1095272736?accountid=154502 (SAM-TECH_00052203).
3M/Aearo Technologies' E-A-RFitTM Validation System ("E-A-RFit"), Apr. 24, 2007 article published by E.H. Berger from Aearo Technologies discusses E-A-RFit and notes that "[t]he E-A-RFitTM Validation System is a quick and accurate method of estimating real-ear attenuation for a given fitting of a pair of earplugs" and "has been designed and built to be an integral part of a comprehensive workplace hearing conservation program." See E.H. Berger, Recommended Applications for the E-A-RFitTM Validation System in a Workplace Hearing Conservation Program, Aearo Company (2007) (SAM-TECH_00056087-SAM-TECH_0005609).
3M/Aearo Technologies' E-A-RFitTM Validation System ("E-A-RFit"), At least by Feb. 9, 2007, A 2010 brochure for the E-A-RFit describes the validation system and lists Model 393-1000 as an available product. https://multimedia.3m.com/mws/media/67382 8O/earfit-brochure.pdf (SAM-TECH_00052179-SAM-TECH_00052184).
Methods of Developing and Validating a Field-MIRE Approach for Measuring Hearing Protector Attenuation, Berger, Elliott & Voix, Jérémie & Kieper, R., Feb. 9, 2007, in connection with 3M/Aearo Technologies' E-A-RFitTM Validation System ("E-A-RFit"); This article was originally prepared for the 32nd Annual Conference of the National Hearing Conservation Association, held on Feb. 15-17, 2007, in Savannah, Georgia, and published in Spectrum, vol. 24, Suppl. 1.
3M/Aearo Technologies' E-A-RFitTM Validation System ("E-A-RFit"), Mar. 16, 2016 WayBack Machine capture of 3M's website lists the E-A-RFit for purchase. https://web.archive.org/web/20160316180537/http://www.3m.com/3M/en_US/company- us/all-3m-products/~/All-3M-Products/Personal-Protective- Equipment/Hearing- Protection/Safety/Worker-Health-Safety/E- A-R-Fit-Validation-Tools/?N=5002385+8709322+8711017+8711405+8720539+8720546+8720770+3294857497&rt=r3 (SAM-TECH_00052201).
3M/Aearo Technologies' E-A-RFitTM Validation System ("E-A-RFit"), Mar. 20, 2016 WayBack Machine capture of 3M's website describes the Validation System and protection that the system offers. https://web.archive.org/web/20160320080156/http:/www.3m.com/3M/en_US/company-us/all-3m-products/~/All-3M-Products/Personal-Protective- Equipment/Hearing- Protection/Safety/Worker-Health- Safety/?N=5002385+8709322+8711017+8711405+8720539+8720546+3294857497&rt=r3 (SAM-TECH_00052278; SAM-TECH_00052292).
3M/Aearo Technologies' E-A-RFitTM Validation System ("E-A-RFit"), Sep. 4, 2015 WayBack Machine capture of 3M's website contains an image of the E-A-RFit and states "[t]he 3M™ E-A-Rfit™ Dual Ear Validation System makes it easy to measure every employee's unique level of protection and takes the guesswork out of managing compliance in your hearing conservation program." https://web.archive.org/web/20150904132810/http:/solutions.3m.com/wps/portal/3M/en_US/3M-PPE-Safety-Solutions/Personal-Protective-Equipment/safety-management/safety-training/hearing- protection-fit-testing/?WT.mc_id=www.3m.com/EARfitDe mo/ (SAM-TECH_00052276; SAM-TECH_; SAM-TECH_00052274).
A binaural processor for missing data speech recognition in the presence of noise and small-room reverberation, Kalle Palomäki, Guy Brown & Deliang Wang, Speech Communication, 43, 361-378.
A compact multi-sensor headset for hands-free communication, Liu, Zicheng & Seltzer, Michael & Acero, A. & Tashev, Ivan & Zhang, Zhengyou & Sinclair, Michael, IEEE Workshop on Applications of Signal Processing to Audio and Acoustics, 138-141. 10.1109/ASPAA.2005.1540188.
A Dual-Mode Human-Machine Interface for Robotic Control Based on Acoustic Sensitivity of the Aural Cavity—Ravi Vaidyanathan, et al., Feb. 2006.

(56) References Cited

OTHER PUBLICATIONS

A Local Active Noise Control System for Locomotive Drivers, internoise 2000, the 29th International Congress and Exhibition on Noise Control Enginerring, Nielsen, Saebo, Ottesen, Reinen, Sorsdal, Aug. 2000.
A MFCC-based CELP speech coder for server-based speech recognition in network environments, Yoon, Jae Sam, Gil Ho Lee, and Hong Kook Kim, IEICE Transactions on Fundamentals of Electronics, Communications and Computer Sciences 90.3, 626-632, Mar. 2007.
A Modified Coherence Based Method for Dual Microphone Speech Enhancement, M. Rahmani, et al., Signal Processing and Communications, 2007.
A New Two-Sensor Active Noise Cancellation Algorithm, K.C. Zangi, 1993 IEEE International Conference on Acoustics, Speech, and Signal Processing, Minneapolis, MN, USA, 1993, pp. 351-354 vol. 2, doi: 10.
A Pattern Recognition Approach to Voiced-Unvoiced-Silence Classification with Applications to Speech Recognition, B. Atal and L. Rabiner, IEEE Transactions on Acoustics, Speech, and Signal Processing, vol. 24, No. 3, pp. 201-212, Jun. 1976.
Active Noise Attenuation Using LQG/LTR Control, Garcia, Josè & Bortoloto, Edson & Ribeiro, Jean & Garcia, Eletrônica de Potência. 9. 23-27, Eletrônica de Potência. 9. 23-27. 10.18618/REP.2005.2. 023027, Nov. 2004.
Active Noise Cancellation for Headphones Used in High Noise Environments Using Conventional Analog Circuitry, Mark C. Flohr, May 1, 1987.
Active Noise Control System for Headphone Applications Sen M. Kuo, et al. 2006.
Active Noise Control: Low-Frequency Techniques for Suppressing Acoustic Noise Leap Forward with Signal Processing, S.J. Elliott and P.A. Nelson, Oct. 1993.
Active Noise Reduction Headphone Measurement: Comparison of Physical and Psychophysical Protocols and Effects of Microphone Placement, PERALA, Apr. 10, 2006.
Active noise Reduction in an ear terminal, Ottesen, The Journal of the Acoustical Society of America, vol. 105, Issue 2, Feb. 1999.
Adaptive Feedback Active Noise Control Headset: Implementation, Evaluation, and its Extensions, Woon S. Gan, et al. 2005.
Adaptive Filtering in the Frequency Domain, M. Dentino, J. Mccool & B. Widrow, Proceedings of the IEEE, vol. 66, No. 12, pp. 1658-1659, Dec. 1978.
Adaptive Noise Cancellation in a Multimicrophone System for Distortion Product Otoacoustic Emission Acquisition, Rafael E. Delgado, et al., 2000.
Adaptive Noise Cancelling in Headsets, Per Rubak, Henrik D. Green & Lars G. Johansen, Proceedings of IEEE Nordic Signal Processing Symposium, NORSIG'96, Sep. 24-27, 1996, Espoo, Finland.
Adaptive noise cancelling: Principles and applications, B. Widrow, et al., Proceedings of the IEEE, vol. 63, No. 12, pp. 1692-1716, Dec. 1975.
Air- and Bone-Conductive Integrated Microphones for Robust Speech Detection and Enhancement, Yanli Zheng, et al., 2003 IEEE Workshop on Automatic Speech Recognition and Understanding.
An Integrated Audio and Active Noise Control Headsets, W. S. Gan & S. M. Kuo, IEEE Transactions on Consumer Electronics, vol. 48, No. 2, pp. 242-247, May 2002.
Apple's AirPods Pro ("AirPods Pro"), Article on Apple's website published Apr. 15, 2020 mentions the AirPods Pro has an Ear Tip Fit test available. https://support.apple.com/en-us/HT210633 (SAM-TECH_00072120-SAM-TECH_00072123).
Apple's AirPods Pro ("AirPods Pro"), article published by Dan Seifert on Mar. 29, 2019 reviews the AirPods Pro and states Apple is selling the second-gen AirPods in two ways: with the new wireless charging case for $199 or with the standard case for the same $159 as before. https://www.theverge.com/2019/3/29/182860 12/apple-airpods-2-new-2nd-gen-review- price-specs-features; (SAM-TECH_00057262-SAM-TECH_00057275).
Apple's AirPods Pro ("AirPods Pro"), Dec. 21, 2019 WayBack Machine capture of Apple's website displays an image of the AirPods Pro and states "[u]se the Ear Tip Fit Test to create the optimal listening experience—you'll get the right tip size for your ears, and the best seal for noise cancellation." https://web.archive.org/web/20191221170719/ https://www.apple.com/airpods-pro/(SAM-TECH_00054447; SAM-TECH_00054134).
Apple's AirPods Pro ("AirPods Pro"),Nov. 2, 2019 article by Karisa Bell published on mashable.com discusses whether Apple's AirPods Pro are compatible with Androids. https://mashable.com/article/do-airpods-pro- work-with-android. (SAM-TECH_00052378-SAM-TECH_00052390).
Nov. 3, 2019 article published by Imran Hussain discusses how to use the ear tip fit test with the AirPods Pro and an iOS device such as the iPhone 11 for the best fit. https://www.esquire.com/lifestyle/a29612084/apple-airpods-pro-active-noise- cancellation-review/ (SAM-TECH_00052413-SAM-TECH_00052424).
Oct. 20, 2019 article by Tim Hardwick discussing how to perform an ear tip fit test using Apple's AirPods Pro with Apple's iPhone 11. https://www.macrumors.com/how- to/perform-ear-tip-fit-test-airpods-pro/; (SAM-TECH_00052357-SAM-TECH_00052370).
Apple's AirPods Pro ("AirPods Pro"),Oct. 29, 2019 artcile by Sarah Rense also discusses testing out the AirPods Pro with active-noise cancellation. https://www.esquire.com/lifestyle/a29612084/apple-airpods-pro-active-noise-cancellation-review/ (SAM-TECH_00058067-SAM-TECH_00058080).
Apple's AirPods Pro ("AirPods Pro"), The specs of the AirPods Pro can be found here https://web.archive.org/web/20191224065355/ https://www.apple.com/airpods-pro/specs/ (SAM-TECH_00052343-SAM-TECH_00052352; SAM-TECH_00053159).
Apple's iPhone 11 (iPhone 11), Oct. 11, 2019 article published by Jake Peterson discusses the eartip fit test using AirPods Pro and an iPhone running iOS 13.2. https://ios.gadgethacks.com/how-to/make- your-airpods-pro-fit-better-by-testing-rubber-tips-0210500/ (SAM-TECH_00056564-SAM-TECH_00056569).
Apple's iPhone 11 (iPhone 11), Press release from Apple's website dated Sep. 10, 2019 states "Apple introduces dual camera iPhone 11" and that "Customers in the US, Puerto Rico, the US Virgin Islands and more than 30 other countries and regions will be able to pre-order iPhone 11 beginning at 5 a.m. PDT on Friday, Sep. 13 with availability beginning Friday, Sep. 20." https://www.apple.com/newsroom/2019/09/a pple-introduces-dual-camera-iphone-11/ (SAM-TECH_00056571-SAM-TECH_00056588).
Apple's iPhone 11 (iPhone 11), Sep. 15, 2019 WayBack Machine capture of Apple's website has an image of the iPhone 11 and lists it for sale on the website. https://web.archive.org/web/20190915061032 /https://www.apple.com/shop/buy-iphone/iphone-11; (SAM-TECH_00055106-SAM-TECH_00055123).
Apple's iPhone 11 (iPhone 11), WayBack Machine capture from Sep. 16, 2019 of Apple's website, displays the iPhone and states "Available 9.20." https://web.archive.org/web/20190916102733/ https://www.apple.com/iphone-11/specs/. (SAM-TECH_00056907).
Audiometric Ear Canal Probe with Active Ambient Noise Control, B. Rafaely & M. Furst, IEEE Transactions on Speech and Audio Processing, vol. 4, No. 3, pp. 224-230, May 1996.
Bang and Olufsen EarSet 2 Bluetooth Headset, At least by 2006, https://www.beoworld.org/prod_details.asp?pid=733 (SAM-TECH_00094798).
Bang and Olufsen EarSet 2 Bluetooth Headset, At least by 2006, https://www.dexigner.com/news/9935 (SAM-TECH_00094865).
Brian Hobbs et al., Wideband Hearing, Intelligibility, and Sound Protection, Jan. 10, 2008 Final Report AFRL-RH-WP-TR-2009-0031 at 2 (SAM-TECH_00053002-116).
Build These Noise-Cancelling Headphones, Jules Ryckebusch, 1997.
Combined feedback-feedforward active noise-reducing headset—The effect of the acoustics on broadband performance, Boaz Rafaely & Matthew Jones, J. Acoust. Soc. Am. Sep. 1, 2002; 112 (3): 981-989.
Dec. 25, 2005 WayBack Machine Capture of Maico's website has an image of the Maico MI26 and discusses the products features. https://web.archive.org/web/20051225200404/http:/www.maico-

(56) References Cited

OTHER PUBLICATIONS diagnostics.com/eprise/main/Maico/Products/ Files/MI26/SpecSheet. MI24-26.NEW.pdf (SAM-TECH_00051161-SAM-TECH_00051162).
Direct filtering for air- and bone-conductive microphones, Zicheng Liu, Zhengyou Zhang, A. Acero, J. Droppo and Xuedong Huang , IEEE 6th Workshop on Multimedia Signal Processing, 2004., Siena, Italy, 2004, pp. 363-366.
DSP Software Development Techniques for Embedded and Real-Time Systems, Robert Oshana, 2006.
E-3 In-Flight Acoustic Exposure Studies and Mitigation via Active Noise Reduction Headset, Frank Mobley, John Allen Hall, & Donald Yeager, Dec. 2002.
Efficient Tracking of the Cross-Correlation Coefficient, AARTS, IEEE Transactions on Speech and Audio Processing, vol. 10, No. 6, Sep. 2002.
Etymotic ER-6 Earphones, At least by Feb. 7, 2005, https://www.cnet.com/reviews/etymoti c-er-6-review/ (SAM-TECH_00095121).
Etymotic ER-6 Earphones, At least by Feb. 7, 2005, https://www.etymotic.com/ephp/er6i- ts.aspx (SAM-TECH_00095178).
Etymotic's ER-33 Occlusion Effect Meter ("ER-33"), Apr. 9, 2001 WayBack Machine capture of Etymotic's website contains an image of the ER-33 and states that "[t]he ER-33 Occlusion Effect Meter quickly quantifies the occlusion effect and earmold leakage" and was on sale for $350.00. https://web.archive.org/web/20010404224259/ https://www.etymotic.com/ (SAM-TECH_00054976).
Etymotic's ER-33 Occlusion Effect Meter ("ER-33"), Aug. 2003 article by H. Gustav Mueller in the Hearing Journal, Mueller describes the ER-33 as a product manufactured by Etymotic that "costs no more than a few bottles of good wine." See H. Gustav Mueller, There's less talking in barrels, but the occlusion effect is still with us, 56 Hearing J. 10, 14 (2003) (SAM-TECH_00054761-SAM-TECH_00054764).
Etymotic's ER-33 Occlusion Effect Meter ("ER-33"), Dec. 5, 2004 article submitted by Wayne J. Staab to the Hearing Review, discusses the ER-33 and notes "[t]he occlusion effect was measured with the ER-33 Occlusion Effect meter (Figure 5) using a probe tube extending 2 mm beyond the receiver tip. The ER-33 is a hand-held device that measures both the magnitude of the occlusion effect and the leakage around an earmold." https://hearingreview.com/practice- building/practice-management/measuring- the-occlusion-effect-in-a-deep-fitting- hearing-device (SAM-TECH_00060339-SAM-TECH_00060350).
Etymotic's ER-33 Occlusion Effect Meter ("ER-33"), Mar. 3, 2005 capture of Etymotic's website contains a description of the ER-33 which includes a sale price for $350.00. https://web.archive.org/web/20050303170952/http://www.etymotic.com/pro/er33.asp (SAM-TECH_00054986).
Etymotic's ER-33 Occlusion Effect Meter ("ER-33"), Mar. 4, 2005 WayBack Machine capture of Etymotic's website contains a user manual for the ER-33 which was on sale at that time. https://web.archive.org/web/20050304030715/http://www.etymotic.com/pdf/er33-oem- usermanual.pdf (SAM-TECH_00055001; SAM-TECH_00060165).
Excerpts from Discrete-Time Signal Processing, Third Edition, Alan V. Oppenheim & Ronald W. Schafer, Aug. 18, 2009.
Experimentation to Address Appropriate Test Techniques for Measuring the Attenuation Provided by Double ANR Hearing Protectors, Susan E. Mercy, Christopher Tubb and Soo H. James, New Directions for Improving Audio Effectiveness (pp. 18-1-18-14). Meeting Proceedings RTO-MP-HFM-123, Paper 18. Neuilly-sur-Seine, France: RTO.
Fit-Testing of Hearing Protection, Witt, The Hearing Review.
Gennum Zen Digital Wireless Headset ("Zen"), At least by 2004, CNET Article—Gennum Zen Bluetooth Headset Review (SAM-TECH_00098419).
Gennum Zen Digital Wireless Headset ("Zen"), At least by 2004, Gennum Zen User Manual (SAM-TECH_00098432).
Gennum Zen Digital Wireless Headset ("Zen"), At least by 2004, Globe and Mail Article—Gennum Z-E-N Headset for Bluetooth (SAM-TECH_00098485).
Huseyin Dogan, Trym Holter, & Ingrid Svagard, Trial of a special end user terminal that aids field operators during emergency rescue operations, Proceedings of the 3rd International ISCRAM China Workshop, Harbin, China, at Aug. 4, 2008 discusses the PARAT as well (SAM-TECH_00051920-SAM-TECH_00051931).
In-Ear Microphone Speech Data Recognition using HMMs, R. S. Kurcan, M. P. Fargues and R. Vaidyanathan, 2006 IEEE 12th Digital Signal Processing Workshop & 4th IEEE Signal Processing Education Workshop, Teton National Park, WY, USA, 2006.
In-Ear Microphone Speech Data Segmentation and Recognition using Neural Networks, G. Bulbuller, Monique Fargues & Ravi Vaidyanathan, IEEE 12th Digital Signal Processing Workshop and 4th IEEE Signal Processing Education Workshop, 2006.
In-Ear Microphone Techniques for Severe Noise Situations, N. Westerlund, M. Dahl, I. Claesson, Nov. 2005.
Interaction Techniques Using Prosodic Features of Speech and Audio Localization, Alex Olwal & Steven Feiner, Jan. 5, 2011.
Isolated Word Recognition from In-Ear Microphone Data Using Hidden Markov Models (HMM), Remzi Serdar Kurcan, Mar. 2006.
Jawbone Aliph, At least by Sep. 9, 2004, https://www.capecodtimes.com/story/news/20 06/12/24/new-earphones-let-you-go/50845129007 (SAM-TECH_00062054).
Jawbone Aliph, At least by Sep. 9, 2004, https://www.cnet.com/reviews/aliph-jawbone-bluetooth-headset-review/ (SAM-TECH_00060121).
Jawbone Aliph, At least by Sep. 9, 2004, https://www.wired.com/2004/09/military- headset-reaches-masses (SAM-TECH_00062036).
Jawbone Aliph, At least by Sep. 9, 2004, Jawbone User Manual (SAM-TECH_00061992).
Learning-Based Three Dimensional Sound Localization Using a Compact Non-Coplanar Array of Microphones, Kamen Y. Guentchev and John J. Weng, AAAI Technical Report SS-98-02, 1998.
Maico MI26 Tymp/audiometer combo ("Maico MI26"), Aug. 12, 2004 WayBack Machine Capture of Maico's website has an image of the Maico MI26 and lists the Maico MI26 as a product available for purchase. https://web.archive.org/web/20040422090329/http://www.maico-diagnostics.com:80/eprise/main/Maico/US_en/ProductCategories/LST01_Tympanometers (SAM-TECH_00060329-SAM-TECH_00060331).
Mar. 17, 2006 Wayback Machine capture of Maico's website has a user manual available for the Maico MI26 https://web.archive.org/web/20060317092410/http:/www.maico- diagnostics.com/eprise/main/Maico/Products/ Files/MI26/1162-0322REVD.pdf (SAM-Tech_00051168-SAM-TECH_00051215).
Mar. 17, 2006 WayBack Machine Capture of Maico's website discusses frequently asked questions about the Maico MI26 andis' features. https://web.archive.org/web/20060317092109/ http://www.maico-diagnostics.com/eprise/main/Maico/Products/Files/MI24/FAQ.MI24-26.pdf (SAM-Tech_00051250-SAM-TECH_00051251).
Methods of measuring the attenuation of hearing protection devices, E H Berger, The Journal of the Acoustical Society of America vol. 79,6 (1986).
Microphone Array for Headset with Spatial Noise Suppressor, Ivan Tashev, Michael Seltzer & Alex Acero, 2005.
Microphone Array Processing for Robust Speech Recognition, Michael L. Seltzer, Jul. 2003.
Motorola H5 Miniblue Bluetooth Headset, Jan. 14, 2005, https://newatlas.com/ces-2006-bluetooth- innovations-abound-inner-ear-headset-bluetooth-keyboard-and-wireless-ipod- companion/4977/ (SAM-TECH_00060368) (Motorola H5 Miniblue Bluetooth Headset).
Motorola H5 Miniblue Bluetooth Headset, Jan. 14, 2005, https://www.cnet.com/tech/mobile/motorola- h5-miniblue-bluetooth-headset/ (SAM-TECH_00060424) (Motorola H5 Miniblue Bluetooth Headset).
Motorola H5 Miniblue Bluetooth Headset, Jan. 14, 2005, https://www.engadget.com/2006-01-04- motorolas-h5-miniblue-bluetooth-headset.html (SAM-TECH_00060628).

(56) References Cited

OTHER PUBLICATIONS

Motorola H5 Miniblue Headset ("Miniblue"), Jan. 2006, Motorola H9 Bluetooth Headset User Manual (SAM-TECH_00060509-14).
Motorola H605, At least by 2006, CNET Article—Motorola H605 Bluetooth Headset Review (SAM-TECH_00098639).
Motorola H605, At least by 2006, Motorola H605 User Manual (SAM-TECH_00098719).
Motorola H605, At least by 2006, PhoneArena Article—Motorola H605 Review (SAM-TECH_00098743).
Motorola Miniblue Press Release (https://web.archive.org/web/20060212115000/http://www.motorola.com/motoinfo/product/de tails/0,,133,00.html) (SAM-TECH_00056060).
Motorola's Astro XTS 5000 Digital Portable Radio ("Motorola XTS 5000"), At least by Jun. 2002, Motorola's Detailed Service Manuel has a release date in 2003. See Detailed Service Manuel for Astro XTS 5000 VHF/UHF Range 1/Range 2/700-800 MHz, Digital Portable Radios (2003) (SAM-TECH_00051382-SAM-TECH_00051711).
Motorola's Astro XTS 5000 Digital Portable Radio ("Motorola XTS 5000"), Jun. 14, 2002 WayBack Machine capture of Motorola Inc.'s website contains an image of the Motorola and states that "[t]he top of the line XTS 5000 portable radio is ready and equipped to meet the needs of demanding environments" and that it is "Motorola's newest maximum performance two-way radio." https://web.archive.org/web/20020614082842/http://www.motorola.com:80/cgiss/portables/ xts5000.shtml (SAM-TECH_00051718).
Motorola's XTS 2500 Digital Portable Radio ("Motorola XTS 2500"), Motorola XTS 2500's Basic Service Manual dated 2002-2003, see XTS 2500 XTS 1500 MT 1500 700-800 MHz Digital Portable Radios, Basic Service Manual at 70 (SAM_00051287-SAM-TECH_00051374).
Motorola's XTS 2500 Digital Portable Radio ("Motorola XTS 2500"), Nov. 9, 2001, WayBack Machine capture of Motorola's website contains an image of the XTS 2500 and states that "[t]he XTS 2500 portable radio is Motorola's high-performance, small-sized, digital two-way radio." https://web.archive.org/web/20020804062125/http://www.motorola.com:80/cgiss/portables/ xts2500.shtml (SAM-TECH_00051258).
Multi-Microphone Correlation-Based Processing for Robust Automatic Speech Recognition, Thomas M. Sullivan, Department of Electrical and Computer Engineering Carnegie Mellon University.
Multi-Microphone Signal Acquisition for Speech Recognition Systems, Kevin Fink, EE 586—Speech Recognition Systems, Dec. 16, 1993.
Multi-sensory microphones for robust speech detection, enhancement and recognition, Zhengyou Zhang, Zicheng Liu, M. Sinclair, A. Acero, L. Deng, J. Droppo, Xuedong Huang, Yanli Zheng, 2004 IEEE International Conference on Acoustics, Speech, and Signal Processing 3 (2004).
Nacre QuietPro, In a Mar. 7, 2013 presentation by Blake Martin of Honeywell Safety Products to the Alberta Industrial Fire Protection Association, Mr. Martin identifies "2005" as the "First commercial success for Quietpro." (SAM-TECH_00054652).
Nacre QuietPro, In Aug. 2006, Nacre won U.S. Government Contract No. W912DQ-06-D-0037 to supply the Nacre QuietPro to the U.S. military. U.S. Government Contract No. W912DQ-06-D-0037 (SAM-TECH_00055735).
Nacre QuietPro, In proceedings before the U.S. Trademark Trial and Appeal Board, Nacre stated that it "has used in commerce with the United States, long since prior to Apr. 28, 2006, the registered trademark QuietPro on one or more of headphones, earphones . . . " *Nacre AS* v. *Silynx Communications, Inc.*, Sep. 4, 2007 Notice of Opposition. (SAM-TECH_00054696).
Nacre QuietPro, Mar. 9, 2005, Honeywell Quietpro QP100ex Mar. 2013 presentation (SAM-TECH_00063985).
Nacre QuietPro, Mar. 9, 2005, IEEE Explore Article (SAMTECH_00063687).
Nacre QuietPro, Mar. 9, 2005, Nacre QuietPro User Manual v2.0 (SAMTECH_00055181).
Nacre QuietPro, Mar. 9, 2005, New Scientist Article (SAMTECH_00064068).
Nacre QuietPro, Mar. 9, 2005, SoldierMod Article (SAM-TECH_00065729).
Nacre QuietPro, Mar. 9, 2005, Article posted at: https://www.tu.no/artikler/quietproverner-og-forsterker-horselen/261960 (SAM-TECH_00097600).
Nacre QuietPro, Mar. 9, 2005, WayBack Machine capture of Nacre's website contains an image of the Nacre QuietPro and states that "Nacre has secured MNOK 27,5 from a consortium led by Ferd Venture" and that "[m]ost of the money will be spent to boost efforts within sales and marketing of QuietPro in the global military market."
Nacre's PARAT earplug ("Parat"), 1999 article published by one of the PARAT's designers Georg E. Ottensen, discusses the Parat system and states, "[a]n active ear terminal is beeing designed at SEVTEF Telecom and informatics. The acronym of the consept is PARAT—Personal Active Radio/Audio Terminal." Georg E. Ottesen, Active noise reduction in an ear terminal, The Journal of the Acoustical Society of America 105, 1300 (1999); https://doi.org/10.1121/1.424828, SINTEF Telecom and Informatics, N-7465 (SAM-TECH_00051952-SAM-TECH_00051955).
Nacre's PARAT earplug ("Parat"), Jan. 2004 publication by Fredrik Vraalsen et al., describes how "[p]articular attention has been given to voice interaction in noisy industrial scenarios, utilising the PARAT earplug." Fredrik Vraalsen, Trym Holter, Ingrid Storruste Svagard, and 0yvind Kvennas, A Multimodal Context Aware Mobile Maintenance Terminal for Noisy Environments, SINTEF ICT, N-7465 Trondheim, Norway, 79, 79 (Jan. 2004) (SAM-TECH_00051938-SAM-TECH_00051951).
Noise attenuation and proper insertion of earplugs into ear canals, Markku Toivonen, Rauno Pääkkönen, Seppo Savolainen, Kyösti Lehtomäki, The Annals of occupational hygiene, vol. 46,6 (2002): 527-530.
Oct. 29, 2019 on BusinessToday.in states the AirPods Pro require Apple devices running iOS 13.2 or later, iPadOS 13.2 or later, watchOS 6.1 or later, tvOS 13.2 or later, or macOS Catalina 10.15.1 or later. https://www.businesstoday.in/technology/lau nch/story/apple-airpods-pro-with-noise- cancellation-launched-check-out-price-in- india features-235269-2019-10-29 (SAM-TECH_00061346-SAM-TECH_00061349).
Oct. 31, 2019 article published by Charlie Sorrel discusses the Ear tip fit test for the AirPods Pro in the iPhone settings. https://www.cultofmac.com/662548/airpods-pro-ear-tip-fit-test/; (SAM-TECH_00056870-SAM-TECH_00056881).
Olympus WS-320M, At least by Nov. 25, 2005 (Olympus WS-320M) https://web.archive.org/web/20051125000137mp_, http://www.olympusamerica.com/cpg_se ction/cpg_vr_digitalmusic.asp (SAM-TECH_00051760).
Olympus WS-320M, At least by Nov. 25, 2005 (Olympus WS-320M) https://web.archive.org/web/20060314095402/, http://www.olympusamerica.com/cpg_sectio n/product.asp?product=1195&fl=2 (SAM-TECH_00051767; SAM-TECH_00051753).
Olympus WS-320M, At least by Nov. 25, 2005 Olympus WS-320M Instruction Manual (SAM-TECH_00051833).
Optimal Feedback Control Formulation of the Active Noise Cancellation Problem: Pointwise and Distributed, Kambiz C. Zangi, RLE Technical Report No. 583, Research Laboratory of Electronics Massachusetts Institute of Technology, May 1994.
Peltor Lite-Com II, At least by 1999, Peltor Lite-Com II Manual (SAM-TECH_00099254).
Peltor Lite-Com II, At least by 1999, Peltor Lite-Com II Brochure (SAM-TECH_00099203).
Performance of dual microphone in-the-ear hearing aids, Michael Valente, Gerald Schuchmant, Lisa G. Potts & Lucille B. Beck, Journal of the American Academy of Audiology, 2000.
Plantronics Discovery 655, At least by 2006, CNET Article—Plantronics Discovery 655 Bluetooth Headset Review (SAM-TECH_00099287).
Plantronics Discovery 655, At least by 2006, Plantronics Discovery 655 Brochure (SAM-TECH_00099296).
Plantronics Discovery 655, At least by 2006, Plantronics Discovery 655 User Guide (SAM-TECH_00099344).

(56) References Cited

OTHER PUBLICATIONS

Plantronics Discovery 655, At least by 2006, Silicon Poip Culture Article—Plantronics Discovery 655 (SAM-TECH_00099387).
Plantronics MX200, At least by 2006, Plantronics MX200 Brochure (SAM-TECH_00099419).
Plantronics MX200, At least by 2006, Plantronics MX200 User Guide (SAM-TECH_00099435).
Plantronics MX200, At least by 2006, Plantronics MX250 User Guide (SAM-TECH_00099461).
PocketLint Article—Zen Gennum Bluetooth Headset (SAM-TECH_00098490).
Preferred methods for measuring hearing protector attenuation, Elliott Berger, International Congress on Noise Control Engineering 2005, INTERNOISE 2005.
Products of Interest, Project Muse, Computer Music Journal, vol. 30, No. 3, Fall 2006.
Reducing the Negative Effects of Ear-Canal Occlusion, Samuel S. Job, Department of Electrical and Computer Engineering Brigham Young University, 2002.
Research in Motion's BlackBerry 7520 ("BlackBerry"), At least by 2004, Blackberry 7520 Wireles Handheld Model No. RAL11IN, Version 4.1 User Guide, last modified Mar. 6, 2006 (SAM-TECH_00054461-SAM-TECH_00054618).
Research in Motion's BlackBerry 7520 ("BlackBerry"), Jun. 28, 2006 WayBack Machine capture of the BlackBerry lists it for sale and describes the Blackberry as a "strong addition to the product line-up." https://web.archive.org/web/20060628035351/http://www.blackberry-7520.com (SAM-TECH_00054619; SAM-TECH_00054624; SAM-TECH_00054622).
Research in Motion's BlackBerry 7520 ("BlackBerry"), At least by 2004, BlackBerry Wireless Handheld Getting Started Guide (SAM-TECH_00228841).
Research in Motion's BlackBerry 7520 ("BlackBerry"), Nextel Services Guide for the Blackberry is dated the year 2004; (SAM-TECH_00226708).
SeboTek Hearing Systems' PAC (Post Auricular Canal) Instrument ("Sebotek"), Mar. 19, 2003 WayBack Machine capture of SeboTek's website contains a description of the PAC, which notes that "[t]he PAC is an exciting new hearing system by SeboTek that is significantly different from traditional hearing aids. If offers deep canal fitting, superior acoustics, incredible discreetness, and unmatched comfort." https://web.archive.org/web/20030319140205/http://www.sebotek.com:80/___(SAM-TECH_00052377).
SeboTek Hearing Systems' PAC (Post Auricular Canal) Instrument ("Sebotek"), May 26, 2007 WayBack Machine capture of SeboTek's website contains a description of the PAC, and notes that "Prior to 2003, depending on the level of hearing loss, consumers could choose between four primary styles, none of which offered superior sound quality, comfort or cosmetic appeal. All that changed in 2003, when SeboTek introduced the PAC Voice-Q™ hearing instrument, the first-ever speaker-in-the-canal device." https://web.archive.org/web/20070526135524/http://www.sebotek.com:80/OurProducts/our Products.html (SAM-TECH_00052392).
SeboTek Hearing Systems' PAC (Post Auricular Canal) Instrument ("Sebotek"), Oct. 6, 2003 post by Bruce Gefvert, Director of Sales and Marketing at SeboTek Hearing Systems, on audiologyonline.com discusses the PAC, and states "PAC refers to Post Auricular Canal, an entirely new style of hearing aid that is intended to provide hearing professionals with one more option for treating hearing loss in the mild to severe ranges." https://www.audiologyonline.com/ask-the-experts/sebotek-pac-post-auricular-canal- 601 (SAM_00052353-SAM-TECH_00052356).
SeboTek Hearing Systems' PAC (Post Auricular Canal) Instrument ("Sebotek"), Publication by King Chung in 2004 mentions that "SeboTek VoiceQ and Vivatone have recently launched newly designed behind-the- ear or postauricular canal (PAC, as SeboTek preferred) hearing aids that have receivers situated in the ear canal." See King Chung, Challenges and recent developments in hearing aids. Part II. Feedback and occlusion effect reduction strategies, laser shell manufacturing processes, and other signal processing technologies, 8 Trends Amplif. 125, 150 (2004), available at https://www.ncbi.nlm.nih.gov/pmc/articles/PMC4111464/pdf/10.1177_108471380400800 402.pdf (SAM-TECH_00062067-SAM-TECH_00062106).
Sensaphonics 3D Active Ambient In-Ear Monitor System, At least by 2006, Products of Interest Article (SAM-TECH_00096723).
Sensaphonics 3D Active Ambient In-Ear Monitor System, At least by 2006, Sensaphonics 3D Active Ambient In-Ear Monitor System User Guide (SAM-TECH_00100046).
Sensaphonics 3D Active Ambient In-Ear Monitor System, At least by 2006, Sensaphonics 3D Active Ambient IEM System Article (SAM-TECH_00100065).
Silynx QuietOps, Oct. 4, 2007 Applicant's Answer to Opposer's Notice of Opposition (SAM-TECH_00052371).
Silynx QuietOps, https://defense- update.com/20080513_c4ops.html (SAM-TECH_00057150).
Silynx QuietOps, QuietOps Pocket Guide (Rev. 2.00) (Silynx QuietOps).
Small-footprint keyword spotting using deep neural networks, G. Chen, C. Parada and G. Heigold, 2014 IEEE International Conference on Acoustics, Speech and Signal Processing (ICASSP), Florence, Italy, 2014, pp. 4087-4091.
Sonar-operator active noise reduction insert-earphone: Prototype preliminary test and evaluation, Joseph S. Russotti, Naval Submarine Medical Research Laboratory, Report No. 1225.
Sonomax's Sonomax: SonoCustom and SonoPass ("Sonomax"), Apr. 8, 2006 WayBack Machine capture of Sonomax's website contains an image of the Sonomax and states that "[t]ens of Thousands of people around the world give the SonoCustom a big thumbs up for comfort." https://web.archive.org/web/20060408170243/http://sonomax.com.au/index.cfm/aboutus/so nomax_solution/ (SAM-TECH_00052472; SAM-TECH_00052998).
Sonomax's Sonomax: SonoCustom and SonoPass ("Sonomax"), Jun. 15, 2006 WayBack Machine capture of Sonomax's website contains frequently asked questions about the Sonomax and states that SonoPass, our proprietary Windows-based software, drives the fitting process and provides immediate proof of functionality. https://web.archive.org/web/20060615054356/http://www.sonomax.com.au:80/index.cfm/fa q/ (SAM-TECH_00052643).
Sonomax's Sonomax: SonoCustom and SonoPass ("Sonomax"), Apr. 8, 2006 WayBack Machine capture of Sonomax's website contains an image of the SonoCustom and describes it as a "cost effective, comfortable and resusable earpiece." https://web.archive.org/web/20060408165744/http://sonomax.com.au:80/index.cfm/fittingp rocess/ (SAM-TECH_00052436).
Sonomax's Sonomax: SonoCustom and SonoPass ("Sonomax"), Apr. 8, 2006 WayBack Machine capture of Sonomax's website contains an image of the Sonomax and states that "[t]he Sonomax is a hearing protection system that combines a uniquely designed earpiece, the SonoCustom, with an optimised hardware and software application, called SonoPass." https://web.archive.org/web/20060408170221/http://sonomax.com.au:80/index.cfm/testingp rocess/ (SAM-TECH_00052425).
Sonomax's Sonomax: SonoCustom and SonoPass ("Sonomax"), Jun. 15, 2006 WayBack Machine capture of Sonomax's website contains an image of the Sonomax and states that "application provides employers the unique ability to quantify and track hearing protection performance and produce detailed reports." https://web.archive.org/web/20060615054658/http://www.sonomax.com.au/index.cfm/testi ngprocess/ (SAM-TECH_00052589).
Sony S700 Walkman, At least by Oct. 13, 2006, EAFIT Article—The Sony Walkman (SAM-TECH_00099514).
Sony S700 Walkman, At least by Oct. 13, 2006, IDG Article—Sony's New Walkman Players Pack Noise Canceling (SAM-TECH_00099533).
Sony S700 Walkman, At least by Oct. 13, 2006, Sony Walkman User Manual (SAM-TECH_00099557).
Sony S700 Walkman, At least by Oct. 13, 2006, Stuff Article—Sony NW-S700 Review (SAM-TECH_00099579).
Sound Source Localization and Separation, Biniyam Tesfaye Taddese, Mathematics, Statistics, and Computer Science Honors Projects (2006).

(56) References Cited

OTHER PUBLICATIONS

Speaker Turn Segmentation Based on Between-Channel Differences, Daniel P.W. Ellis & Jerry C. Liu, LabROSA, Dept. of Electrical Engineering, Columbia University.
Spectral analysis of speech by linear prediction, J. Makhoul, IEEE Transactions on Audio and Electroacoustics, vol. 21, No. 3, pp. 140-148, Jun. 1973.
Speech Input Hardware Investigation for Future Dismounted Soldier Computer Systems, Jeffrey C. Bos & David W. Tack, DRDC Toronto CR 2005-064, May 1, 2005.
Speech Modeling with Magnitude-Normalized Complex Spectra and Its Application to Multisensory Speech Enhancement, A. Subramanya, Z. Zhang, Z. Liu and A. Acero, 2006 IEEE International Conference on Multimedia and Expo, Toronto, ON, Canada, 2006, pp. 1157-1160.
Speech Recognition in Severely Disturbed Environments Combining Ear-Mic and Active Noise Control, N. Westerlund, M. Dahl, I. Claesson, Published 2002, Engineering, Computer Science.
Survey of the Speech Recognition Techniques for Mobile Devices, Dmitry Zaykovskiy, Department of Information Technology, SPECOM'2006, St. Petersburg, Jun. 2006.
Techniques and applications for wearable augmented reality audio, Härmä, Aki & Turku, Julia & Tikander, Miikka & Karjalainen, M & Lokki, Tapio & Nironen, H & Vesa, Sampo (2003).
The Effect of Hearing Aid Microphone Location on the Intelligibility of Hearing Aid—Transduced Speech, John Robert Franks, Dec. 1975.
Using Audio-Based Signal Processing to Passively Monitor Road Traffic, Orla Duffner, Centre for Digital Video Processing and School of Electronic Engineering Dublin City University, Jul. 2006.
Verifying the attenuation of earplugs in situ: Method validation using artificial head and numerical simulations, Annelies Bockstael, Bram De Greve, Timothy Van Renterghem, Dick Botteldooren, Wendy D'Haenens, Hannah Keppler, Leen Maes, Birgit Philips, Freya Swinnen, Bart Vinck, The Journal of the Acoustical Society of America; 124 (2): 973-981, Aug. 1, 2008.
Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.
Mauro Dentino, John M. McCool, and Bernard Widrow, Adaptive Filtering in the Frequency Domain, Proceedings of the IEEE, vol. 66, No. 12, Dec. 1978.
'400 Patent Family Tree, Exhibit-1009, Filed on Dec. 10, 2021—Cited in IPR2022-00282, challenging U.S. Pat. No. 8,315,400.
Nov. 3, 2022 [16] Notice of Deposition of David Kleinschmidt, Exhibit-16, Filed on Nov. 3, 2022—Cited in IPR2022-00282, challenging U.S. Pat. No. 8,315,400.
Aarts, Exhibit-1015, Filed on Jan. 14, 2022—Cited in IPR2022-00410, challenging U.S. Pat. No. 10,979,836.
Adaptive Filtering (Dentino), Exhibit-1012, Filed on Dec. 10, 2021—Cited in IPR2022-00282, challenging U.S. Pat. No. 8,315,400.
Adaptive Filtering Algorithims (Diniz), Exhibit-1013, Filed on Dec. 10, 2021—Cited in IPR2022-00282, challenging U.S. Pat. No. 8,315,400.
Adaptive Noise Cancelling (Widrow), Exhibit-1011, Filed on Dec. 10, 2021—Cited in IPR2022-00282, challenging U.S. Pat. No. 8,315,400.
AirPods (1st generation)—Technical Specifications, Exhibit-2009, Filed on Sep. 13, 2022—Cited in IPR2022-00243, challenging U.S. Pat. No. 8,111,839.
Amended Complaint, *Techiya* v. *Samsung*, E.D. Tex., Exhibit-1014, Filed on Jan. 14, 2022—Cited in IPR2022-00410, challenging U.S. Pat. No. 10,979,836.
Amended Complaint, *Techiya* v. *Samsung*, E.D. Tex., Exhibit-1014, Filed on Dec. 21, 2021—Cited in IPR2022-00302, challenging U.S. Pat. No. 9,609,424.
Amended Complaint, *Techiya* v. *Samsung*, E.D. Tex., Exhibit-1017, Filed on Jan. 4, 2022—Cited in IPR2022-00388, challenging U.S. Pat. No. 10,966,015.
Amended Complaint, *Techiya* v. *Samsung*, E.D. Tex., Exhibit-1017, Filed on Dec. 30, 2021—Cited in IPR2022-00369, challenging U.S. Pat. No. 10,405,082.
Amended Docket Control Order, DN 156 from E.D. Tex. 21-cv-00413, Exhibit-1029, Filed on Nov. 15, 2022—Cited in IPR2022-01098, challenging U.S. Pat. No. 11,217,237.
Amended Docket Control Order, DN 156 from E.D. Tex., Exhibit-1023, Filed on Nov. 10, 2022—Cited in IPR2022-01099, challenging U.S. Pat. No. 11,244,666.
Amended Docket Control Order, DN 156 from E.D. Tex., Exhibit-1026, Filed on Nov. 10, 2022—Cited in IPR2022-01078, challenging U.S. Pat. No. 11,057,701.
Amended Docket Control Order, DN 156 from E.D. Tex., Exhibit-1032, Filed on Nov. 10, 2022—Cited in IPR2022-01106, challenging U.S. Pat. No. 11,039,259.
Amended Notice of Deposition of Les E. Atlas, Ph.D., Exhibit-15, Filed on Mar. 14, 2023—Cited in IPR2022-01106, challenging U.S. Pat. No. 11,039,259.
Amendment in U.S. Appl. No. 11/616,973, dated Apr. 13, 2015, Exhibit-2009, Filed on Oct. 11, 2022—Cited in IPR2022-01106, challenging U.S. Pat. No. 11,039,259.
Anderson Declaration Iso Msj of No Infringement of '259 Patent, Exhibit-2019, Filed on Aug. 14, 2023—Cited in IPR2022-01106, challenging U.S. Pat. No. 11,039,259.
Anderson Non-Infringement Report (excerpt, redacted), Exhibit-2020, Filed on Aug. 14, 2023—Cited in IPR2022-01106, challenging U.S. Pat. No. 11,039,259.
Anderson Rebuttal Report (Redacted, Excerpt), Exhibit-2017, Filed on Apr. 10, 2023—Cited in IPR2022-01106, challenging U.S. Pat. No. 11,039,259.
Android Central, The History of True Wireless Earbuds, Exhibit-2009, Filed on Oct. 17, 2022—Cited in IPR2022-00324, challenging U.S. Pat. No. 8,254,591.
Android Central, The History of True Wireless Earbuds, Exhibit-2011, Filed on Sep. 13, 2022—Cited in IPR2022-00243, challenging U.S. Pat. No. 8,111,839.
C.V. of Richard Stern, Ph.D., Exhibit-1003, Filed on Jan. 4, 2022—Cited in IPR2022-00388, challenging U.S. Pat. No. 10,966,015.
C.V. of Richard Stern, Ph.D., Exhibit-1003, Filed on Dec. 10, 2021—Cited in IPR2022-00282, challenging U.S. Pat. No. 8,315,400.
CDC, What Noises Cause Hearing Loss?, Exhibit-2009, Filed on Sep. 13, 2022—Cited in IPR2022-00242, challenging U.S. Pat. No. 8,111,839.
Christopher J. Struck CV, Exhibit-2002, Filed on Apr. 13, 2022—Cited in IPR2022-00302, challenging U.S. Pat. No. 9,609,424.
Claim Construction Order, Exhibit-2008, Filed on Feb. 22, 2023—Cited in IPR2022-00253, challenging U.S. Pat. No. 9,491,542.
Claim Construction Order, Exhibit-2008, Filed on Apr. 18, 2023—Cited in IPR2022-00281, challenging U.S. Pat. No. 9,270,244.
Claim Construction Order, Exhibit-2013, Filed on Apr. 10, 2023—Cited in IPR2022-01106, challenging U.S. Pat. No. 11,039,259.
Complaint, DN 1 from E.D. Tex. 21-cv-00413, Exhibit-1022, Filed on Nov. 10, 2022—Cited in IPR2022-01099, challenging U.S. Pat. No. 11,244,666.
Complaint, DN 1 from E.D. Tex. 21-cv-00413, Exhibit-1025, Filed on Nov. 10, 2022—Cited in IPR2022-01078, challenging U.S. Pat. No. 11,057,701.
Complaint, DN 1 from E.D. Tex. 21-cv-00413, Exhibit-1028, Filed on Nov. 15, 2022—Cited in IPR2022-01098, challenging U.S. Pat. No. 11,217,237.
Complaint, DN 1 from E.D. Tex. 21-cv-00413, Exhibit-1031, Filed on Nov. 10, 2022—Cited in IPR2022-01106, challenging U.S. Pat. No. 11,039,259.
Complaint, E.D. Tex. 22-53, Exhibit-1020, Filed on Jun. 14, 2022—Cited in IPR2022-00369, challenging U.S. Pat. No. 10,405,082.
Complaint, E.D. Tex. 22-53, Exhibit-1020, Filed on Jun. 14, 2022—Cited in IPR2022-00388, challenging U.S. Pat. No. 10,966,015.

(56) References Cited

OTHER PUBLICATIONS

Complaint, E.D. Tex. 22-53, Exhibit-1021, Filed on Jun. 14, 2022—Cited in IPR2022-00410, challenging U.S. Pat. No. 10,979,836.
Complaint, E.D. Tex., 22-cv-53, Exhibit-1024, Filed on May 10, 2022—Cited in IPR2022-00302, challenging U.S. Pat. No. 9,609,424.
Complaint, E.D. Tex., 22-cv-53, Exhibit-1032, Filed on May 11, 2022—Cited in IPR2022-00324, challenging U.S. Pat. No. 8,254,591.
Complaint, *Techiya* v. *Samsung*, E.D. Tex., Exhibit-1008, Filed on Jan. 14, 2022—Cited in IPR2022-00410, challenging U.S. Pat. No. 10,979,836.
Complaint, *Techiya* v. *Samsung*, E.D. Tex., Exhibit-1008, Filed on Dec. 21, 2021—Cited in IPR2022-00302, challenging U.S. Pat. No. 9,609,424.
Consolidation Order, E.D. Tex. 21-413 & 22-53, Exhibit-1021, Filed on Jun. 14, 2022—Cited in IPR2022-00369, challenging U.S. Pat. No. 10,405,082.
Consolidation Order, E.D. Tex. 21-413 & 22-53, Exhibit-1021, Filed on Jun. 14, 2022—Cited in IPR2022-00388, challenging U.S. Pat. No. 10,966,015.
Consolidation Order, E.D. Tex. 21-413 & 22-53, Exhibit-1022, Filed on Jun. 14, 2022—Cited in IPR2022-00410, challenging U.S. Pat. No. 10,979,836.
Consolidation Order, E.D. Tex., Exhibit-1025, Filed on May 10, 2022—Cited in IPR2022-00302, challenging U.S. Pat. No. 9,609,424.
Consolidation Order, E.D. Tex., Exhibit-1033, Filed on May 11, 2022—Cited in IPR2022-00324, challenging U.S. Pat. No. 8,254,591.
Corrected Declaration of Richard Stern, Ph.D., Exhibit-1002, Filed on Jan. 4, 2022—Cited in IPR2022-00388, challenging 46 U.S. Pat. No. 10,966,015.
Corrected Declaration of Richard Stern, Ph.D., Exhibit-1002, Filed on Dec. 10, 2021—Cited in IPR2022-00282, challenging U.S. Pat. No. 8,315,400.
Corrected Petition for Inter Partes Review of U.S. Pat. No. 8,111,839, Exhibit-11, Filed on Feb. 3, 2022—Cited in IPR2022-00243, challenging U.S. Pat. No. 8,111,839.
Corrected Petition for Inter Partes Review of U.S. Pat. No. 8,111,839, Exhibit-12, Filed on Feb. 3, 2022—Cited in IPR2022-00242, challenging U.S. Pat. No. 8,111,839.
Corrected Petition for IPR of U.S. Pat. No. 8,315,400, Exhibit-4, Filed on Dec. 10, 2021—Cited in IPR2022-00282, challenging U.S. Pat. No. 8,315,400.
Curriculum Vitae of Christopher J. Struck, Exhibit-2002, Filed on Oct. 7, 2022—Cited in IPR2022-01078, challenging U.S. Pat. No. 11,057,701.
Curriculum Vitae of Christopher J. Struck, Exhibit-2002, Filed on Oct. 7, 2022—Cited in IPR2022-01098, challenging U.S. Pat. No. 11,217,237.
Curriculum Vitae of David Kleinschmidt, Exhibit-2002, Filed on Oct. 11, 2022—Cited in IPR2022-01106, challenging U.S. Pat. No. 11,039,259.
Curriculum Vitae of David Kleinschmidt, Exhibit-2002, Filed on Oct. 7, 2022—Cited in IPR2022-01099, challenging U.S. Pat. No. 11,244,666.
CV for Marshall Buck, Ph.D., Exhibit-2002, Filed on May 18, 2022—Cited in IPR2022-00369, challenging U.S. Pat. No. 10,405,082.
CV of Chris Kyriakakis, Ph.D., Exhibit-1003, Filed on Dec. 21, 2021—Cited in IPR2022-00302, challenging U.S. Pat. No. 9,609,424.
CV of Christopher J. Struck, Exhibit-2002, Filed on May 18, 2022—Cited in IPR2022-00410, challenging U.S. Pat. No. 10,979,836.
CV of Daniel P. Anagnos, Exhibit-2002, Filed on Mar. 23, 2022—Cited in IPR2022-00242, challenging U.S. Pat. No. 8,111,839.
CV of Daniel P. Anagnos, Exhibit-2002, Filed on Mar. 23, 2022—Cited in IPR2022-00243, challenging U.S. Pat. No. 8,111,839.
CV of Daniel P. Anagnos; Exhibit-2002, Filed on Mar. 21, 2022—Cited in IPR2022-00234, challenging U.S. Pat. No. 9,124,982.
CV of Dr. Chris Kyriakakis, Exhibit-1003, Filed on Jan. 14, 2022—Cited in IPR2022-00410, challenging U.S. Pat. No. 10,979,836.
CV of Les E. Atlas, Ph.D., Exhibit-1003, Filed on Dec. 20, 2021—Cited in IPR2022-00324, challenging U.S. Pat. No. 8,254,591.
CV of Les E. Atlas, Ph.D., Exhibit-1004, Filed on Dec. 13, 2021—Cited in IPR2022-00242, challenging U.S. Pat. No. 8,111,839.
CV of Les E. Atlas, Ph.D., Exhibit-1004, Filed on Dec. 13, 2021—Cited in IPR2022-00243, challenging U.S. Pat. No. 8,111,839.
CV of Marshall Buck, Ph.D., Exhibit-2002, Filed on May 18, 2022—Cited in IPR2022-00388, challenging U.S. Pat. No. 10,966,015.
CV of Nathaniel Polish, Ph.D., Exhibit-1003, Filed on Dec. 17, 2021—Cited in IPR2022-00253, challenging U.S. Pat. No. 9,491,542.
CV of Nathaniel Polish, Ph.D., Exhibit-1003, Filed on Dec. 21, 2021—Cited in IPR2022-00281, challenging U.S. Pat. No. 9,270,244.
CV of of Les E. Atlas, Ph.D.; Exhibit-1003, Filed on Dec. 13, 2021—Cited in IPR2022-00234, challenging U.S. Pat. No. 9,124,982.
CV of Richard Stern, Ph.D., Exhibit-1003, Filed on Dec. 30, 2021—Cited in IPR2022-00369, challenging U.S. Pat. No. 10,405,082.
Daniel P. Anagnos CV, Exhibit-2002, Filed on Apr. 13, 2022—Cited in IPR2022-00324, challenging U.S. Pat. No. 8,254,591.
David Kleinschmidt CV, Exhibit-2002, Filed on Mar. 21, 2022—Cited in IPR2022-00282, challenging U.S. Pat. No. 8,315,400.
David Kleinschmidt CV, Exhibit-2002, Filed on Apr. 18, 2022—Cited in IPR2022-00253, challenging U.S. Pat. No. 9,491,542.
David Kleinschmidt CV, Exhibit-2002, Filed on Apr. 18, 2022—Cited in IPR2022-00281, challenging U.S. Pat. No. 9,270,244.
Decision Denying Institution of Inter Partes Review 35 U.S.C. § 314, Exhibit-10, Filed on Jan. 3, 2023—Cited in IPR2022-01099, challenging U.S. Pat. No. 11,244,666.
Decision Denying Institution of Inter Partes Review 35 U.S.C. § 314, Exhibit-11, Filed on Jan. 3, 2023—Cited in IPR2022-01098, challenging U.S. Pat. No. 11,217,237.
Decision Granting Institution of Inter Partes Review 35 U.S.C. sec 314, Exhibit-10, Filed on Dec. 29, 2022—Cited in IPR2022-01078, challenging U.S. Pat. No. 11,057,701.
Declaration of Chris Kyriakakis, Ph.D., Exhibit-1002, Filed on Dec. 21, 2021—Cited in IPR2022-00302, challenging U.S. Pat. No. 9,609,424.
Declaration of Christopher J. Struck in Support of Patent Owner's Preliminary Response, Exhibit-2001, Filed on Oct. 7, 2022—Cited in IPR2022-01078, challenging U.S. Pat. No. 11,057,701.
Declaration of Christopher J. Struck in Support of Patent Owner's Preliminary Response, Exhibit-2001, Filed on Oct. 7, 2022—Cited in IPR2022-01098, challenging U.S. Pat. No. 11,217,237.
Declaration of Christopher J. Struck in Support of Patent Owner's Preliminary Response, Exhibit-2001, Filed on Apr. 13, 2022—Cited in IPR2022-00302, challenging U.S. Pat. No. 9,609,424.
Declaration of Christopher J. Struck in Support of Patent Owner's Preliminary Response, Exhibit-2001, Filed on May 18, 2022—Cited in IPR2022-00410, challenging U.S. Pat. No. 10,979,836.
Declaration of Christopher J. Struck in Support of Patent Owner's Response, Exhibit-2006, Filed on Oct. 17, 2022—Cited in IPR2022-00302, challenging U.S. Pat. No. 9,609,424.
Declaration of Christopher Struck in Support of POR, Exhibit-2013, Filed on Mar. 23, 2023—Cited in IPR2022-01078, challenging U.S. Pat. No. 11,057,701.
Declaration of Daniel P. Anagnos in Support of Patent Owner Response; Exhibit-2006, Filed on Sep. 9, 2022—Cited in IPR2022-00234, challenging U.S. Pat. No. 9,124,982.
Declaration of Daniel P. Anagnos in Support of Patent Owner's Preliminary Response, Exhibit-2001, Filed on Apr. 13, 2022—Cited in IPR2022-00324, challenging U.S. Pat. No. 8,254,591.
Declaration of Daniel P. Anagnos in Support of Patent Owner's Response, Exhibit-2006, Filed on Oct. 17, 2022—Cited in IPR2022-00324, challenging U.S. Pat. No. 8,254,591.
Declaration of Daniel P. Anagnos in Support of Patent Owner's Response, Exhibit-2006, Filed on Sep. 13, 2022—Cited in IPR2022-00242, challenging U.S. Pat. No. 8,111,839.
Declaration of Daniel P. Anagnos in Support of Patent Owner's Response, Exhibit-2006, Filed on Sep. 13, 2022—Cited in IPR2022-00243, challenging U.S. Pat. No. 8,111,839.
Declaration of Daniel P. Anagnos, Exhibit-2001, Filed on Mar. 23, 2022—Cited in IPR2022-00242, challenging U.S. Pat. No. 8,111,839.
Declaration of Daniel P. Anagnos, Exhibit-2001, Filed on Mar. 23, 2022—Cited in IPR2022-00243, challenging U.S. Pat. No. 8,111,839.
Declaration of Daniel P. Anagnos; Exhibit-2001, Filed on Mar. 21, 2022—Cited in IPR2022-00234, challenging U.S. Pat. No. 9,124,982.

(56) References Cited

OTHER PUBLICATIONS

Declaration of David Kleinschmidt in Support of Patent Owner's Preliminary Response, Exhibit-2001, Filed on Oct. 11, 2022—Cited in IPR2022-01106, challenging U.S. Pat. No. 11,039,259.
Declaration of David Kleinschmidt in Support of Patent Owner's Preliminary Response, Exhibit-2001, Filed on Oct. 7, 2022—Cited in IPR2022-01099, challenging U.S. Pat. No. 11,244,666.
Declaration of David Kleinschmidt in Support of Patent Owner's Preliminary Response, Exhibit-2001, Filed on Mar. 21, 2022—Cited in IPR2022-00282, challenging U.S. Pat. No. 8,315,400.
Declaration of David Kleinschmidt in Support of Patent Owner's Preliminary Response, Exhibit-2001, Filed on Apr. 18, 2022—Cited in IPR2022-00253, challenging U.S. Pat. No. 9,491,542.
Declaration of David Kleinschmidt in Support of Patent Owner's Preliminary Response, Exhibit-2001, Filed on Apr. 18, 2022—Cited in IPR2022-00281, challenging U.S. Pat. No. 9,270,244.
Declaration of David Kleinschmidt in Support of Patent Owner's Response, Exhibit-2006, Filed on Oct. 19, 2022—Cited in IPR2022-00253, challenging U.S. Pat. No. 9,491,542.
Declaration of David Kleinschmidt in Support of Patent Owner's Response, Exhibit-2006, Filed on Oct. 19, 2022—Cited in IPR2022-00281, challenging U.S. Pat. No. 9,270,244.
Declaration of David Kleinschmidt in Support of Patent Owner's Response, Exhibit-2009, Filed on Sep. 9, 2022—Cited in IPR2022-00282, challenging U.S. Pat. No. 8,315,400.
Declaration of Dr. Chris Kyriakakis, Exhibit-1002, Filed on Jan. 14, 2022—Cited in IPR2022-00410, challenging U.S. Pat. No. 10,979,836.
Declaration of Dr. David Anderson Regarding Claim Construction dated Oct. 21, 2022, Exhibit-2011, Filed on Nov. 8, 2022—Cited in IPR2022-00388, challenging U.S. Pat. No. 10,966,015.
Declaration of Dr. Eric Tarr, Exhibit-2001, Filed on Dec. 6, 2024—Cited in IPR2024-00559, challenging U.S. Pat. No. 11,610,587.
Declaration of Les E. Atlas, Ph.D., Exhibit-1002, Filed on Dec. 13, 2021—Cited in IPR2022-00242, challenging U.S. Pat. No. 8,111,839.
Declaration of Les E. Atlas, Ph.D., Exhibit-1002, Filed on Dec. 20, 2021—Cited in IPR2022-00324, challenging U.S. Pat. No. 8,254,591.
Declaration of Les E. Atlas, Ph.D., Exhibit-1003, Filed on Dec. 13, 2021—Cited in IPR2022-00243, challenging U.S. Pat. No. 8,111,839.
Declaration of Les E. Atlas, Ph.D.; Exhibit-1002, Filed on Dec. 13, 2021—Cited in IPR2022-00234, challenging U.S. Pat. No. 9,124,982.
Declaration of Marshall Buck in Support of Patent Owner's Preliminary Response, Exhibit-2001, Filed on May 18, 2022—Cited in IPR2022-00369, challenging U.S. Pat. No. 10,405,082.
Declaration of Marshall Buck in Support of Patent Owner's Preliminary Response, Exhibit-2001, Filed on May 18, 2022—Cited in IPR2022-00388, challenging U.S. Pat. No. 10,966,015.
Declaration of Marshall D. Buck, Ph.D. in Support of Patent Owner Response, Exhibit-2008, Filed on Nov. 8, 2022—Cited in IPR2022-00369, challenging U.S. Pat. No. 10,405,082.
Declaration of Marshall D. Buck, Ph.D. in Support of Patent Owner's Response, Exhibit-2008, Filed on Nov. 8, 2022—Cited in IPR2022-00388, challenging U.S. Pat. No. 10,966,015.
Declaration of Nathaniel Polish, Ph.D., Exhibit-1002, Filed on Dec. 17, 2021—Cited in IPR2022-00253, challenging U.S. Pat. No. 9,491,542.
Declaration of Nathaniel Polish, Ph.D., Exhibit-1002, Filed on Dec. 21, 2021—Cited in IPR2022-00281, challenging U.S. Pat. No. 9,270,244.
Declaration of Richard Stern, Ph.D., Exhibit-1002, Filed on Dec. 10, 2021—Cited in IPR2022-00282, challenging U.S. Pat. No. 8,315,400.
Declaration of Richard Stern, Ph.D., Exhibit-1002, Filed on Dec. 30, 2021—Cited in IPR2022-00369, challenging U.S. Pat. No. 10,405,082.
Declaration of Roy Falik in Support of Motion for the Pro Hac Vice Admission, Exhibit-2001, Filed on Jul. 5, 2024—Cited in IPR2024-01003, challenging U.S. Pat. No. 9,191,083.
Declaration of Roy Falik in Support of Motion for the Pro Hac Vice Admission, Exhibit-2001, Filed on Jul. 5, 2024—Cited in IPR2024-01004, challenging U.S. Pat. No. 9,614,943.
Declaration of Roy Falik in Support of Motion for the Pro Hac Vice AdmissionExhibit2001,Jul. 5, 2024—Cited in IPR2024-01033, challenging U.S. Pat. No. 8,434,966.
Declaration of Roy Falik, Exhibit-2001, Filed on Jul. 18, 2024—Cited in IPR2024-01031, challenging U.S. Pat. No. 7,049,850.
Declaration of Roy Falik, Exhibit-2001, Filed on Jul. 18, 2024—Cited in IPR2024-01034, challenging U.S. Pat. No. 9,279,263.
Declaration of Scott Delman with attached exhibit, Exhibit-1024, Filed on Dec. 21, 2021—Cited in IPR2022-00281, challenging U.S. Pat. No. 9,270,244.
Deposition Transcript of David Kleinschmidt, dated Jun. 9, 2023, Exhibit-1034, Filed on Jun. 30, 2023—Cited in IPR2022-01106, challenging U.S. Pat. No. 11,039,259.
Determining All Challenged Claims Unpatentable 35 U.S.C. § 318(a), Exhibit-31, Filed on Aug. 11, 2023—Cited in IPR2022-00388, challenging U.S. Pat. No. 10,966,015.
Determining All Challenged Claims Unpatentable 35 U.S.C. § 318(a), Exhibit-32, Filed on Aug. 11, 2023—Cited in IPR2022-00369, challenging U.S. Pat. No. 10,405,082.
Determining All Challenged Claims Unpatentable 35 U.S.C. § 318(a), Exhibit-26, Filed on Nov. 13, 2023—Cited in IPR2022-01078, challenging U.S. Pat. No. 11,057,701.
Determining Some Challenged Claims Unpatentable 35 U.S.C. § 318(a), Exhibit-37, Filed on Jul. 7, 2023—Cited in IPR2022-00302, challenging U.S. Pat. No. 9,609,424.
Docket Control Order, E.D. Tex., Exhibit-1014, Filed on Apr. 20, 2022—Cited in IPR2022-00282, challenging U.S. Pat. No. 8,315,400.
Docket Control Order, E.D. Tex., Exhibit-1043, Filed on Apr. 20, 2022—Cited in IPR2022-00242, challenging U.S. Pat. No. 8,111,839.
Docket Control Order, E.D. Tex., Exhibit-1043, Filed on Apr. 20, 2022—Cited in IPR2022-00243, challenging U.S. Pat. No. 8,111,839.
Docket Control Order, E.D. Tex.; Exhibit-1033, Filed on Apr. 20, 2022—Cited in IPR2022-00234, challenging U.S. Pat. No. 9,124,982.
Edwards, The Future of Hearing Aid Technology, Exhibit-2008, Filed on Sep. 13, 2022—Cited in IPR2022-00243, challenging U.S. Pat. No. 8,111,839.
Ex 1032—Protective Order (*Staton Techiya, LLC* v. *Samsung Electronics Co., Ltd*, 21-CV-00413-JRG-RSP), Exhibit-1032, Filed on Apr. 13, 2023—Cited in IPR2022-00302, challenging U.S. Pat. No. 9,609,424.
Ex 1045—Nov. 18, 2022, Deposition Transcript of Daniel P Anagnos, Exhibit-1045, Filed on Dec. 6, 2022—Cited in IPR2022-00242, challenging U.S. Pat. No. 8,111,839.
Ex 1045—Nov. 18, 2022, Deposition Transcript of Daniel P Anagnos, Exhibit-1045, Filed on Dec. 6, 2022—Cited in IPR2022-00243, challenging U.S. Pat. No. 8,111,839.
Ex 1046—Patent Owner's Response in IPR2022-00243, Paper 21, Exhibit-1046, Filed on Dec. 6, 2022—Cited in IPR2022-00242, challenging U.S. Pat. No. 8,111,839.
Ex 1047—Patent Owner Response for IPR2022-00234, Paper 17, Exhibit-1047, Filed on Dec. 6, 2022—Cited in IPR2022-00242, challenging U.S. Pat. No. 8,111,839.
Ex 1047—Patent Owner Response for IPR2022-00234, Paper 17, Exhibit-1047, Filed on Dec. 6, 2022—Cited in IPR2022-00243, challenging U.S. Pat. No. 8,111,839.
Ex 1048—Institution Decision for IPR2022-00234, Paper 12, Exhibit-1048, Filed on Dec. 6, 2022—Cited in IPR2022-00242, challenging U.S. Pat. No. 8,111,839.
Ex 1049—File History for 382 Patent, Exhibit-1049, Filed on Dec. 6, 2022—Cited in IPR2022-00242, challenging U.S. Pat. No. 8,111,839.
Ex 1053—Excerpts from the Authoritative Dictionary of IEEE Standards Terms, Exhibit-1053, Filed on Dec. 6, 2022—Cited in IPR2022-00242, challenging U.S. Pat. No. 8,111,839.
Ex 1054—Supplemental Declaration of Les E Atlas PhD (Atlas-Supp), Exhibit-1054, Filed on Dec. 6, 2022—Cited in IPR2022-00243, challenging U.S. Pat. No. 8,111,839.
Ex. 1002—Declaration of Dr. Les Atlas, Ph.D., Exhibit-1002, Filed on Jun. 9, 2022—Cited in IPR2022-01106, challenging U.S. Pat. No. 11,039,259.
Ex. 1002—Declaration of Nathaniel Polish, Ph.D., Exhibit-1002, Filed on Jun. 9, 2022—Cited in IPR2022-01098, challenging U.S. Pat. No. 11,217,237.

(56) References Cited

OTHER PUBLICATIONS

Ex. 1002—Declaration of Nathaniel Polish, Ph.D., Exhibit-1002, Filed on Jun. 9, 2022—Cited in IPR2022-01099, challenging U.S. Pat. No. 11,244,666.
Ex. 1002—Kyriakakis DeclarationExhibit1002,Jun. 18, 2024—Cited in IPR2024-01033, challenging U.S. Pat. No. 8,434,966.
Ex. 1002 Declaration of Chris Kyriakakis, Exhibit-1002, Filed on Jul. 1, 2024—Cited in IPR2024-01034, challenging U.S. Pat. No. 9,279,263.
Ex. 1002 Declaration of Dr. Richard M. Stern, Exhibit-1002, Filed on Jun. 9, 2022—Cited in IPR2022-01078, challenging U.S. Pat. No. 11,057,701.
Ex. 1003—CV of Dr. Les Atlas, Ph.D., Exhibit-1003, Filed on Jun. 9, 2022—Cited in IPR2022-01106, challenging U.S. Pat. No. 11,039,259.
Ex. 1003—CV of Nathaniel Polish, Ph.D., Exhibit-1003, Filed on Jun. 9, 2022—Cited in IPR2022-01098, challenging U.S. Pat. No. 11,217,237.
Ex. 1003—CV of Nathaniel Polish, Ph.D., Exhibit-1003, Filed on Jun. 9, 2022—Cited in IPR2022-01099, challenging U.S. Pat. No. 11,244,666.
Ex. 1003—Kyriakakis CVExhibit1003,Jun. 18, 2024—Cited in IPR2024-01033, challenging U.S. Pat. No. 8,434,966.
Ex. 1003 Chris Kyriakakis CV, Exhibit-1003, Filed on Jul. 1, 2024—Cited in IPR2024-01034, challenging U.S. Pat. No. 9,279,263.
Ex. 1003 CV of Dr. Richard M. Stern, Exhibit-1003, Filed on Jun. 9, 2022—Cited in IPR2022-01078, challenging U.S. Pat. No. 11,057,701.
Ex. 1004—U.S. Appl. No. 16/571,973 File History for 259, Exhibit-1004, Filed on Jun. 9, 2022—Cited in IPR2022-01106, challenging U.S. Pat. No. 11,039,259.
Ex. 1004—File History for U.S. Pat. No. 11,750,965Exhibit1004,Jun. 18, 2024—Cited in IPR2024-01033, challenging U.S. Pat. No. 8,434,966.
Ex. 1004—File History of U.S. Pat. No. 11,217,237, Exhibit-1004, Filed on Jun. 9, 2022—Cited in IPR2022-01098, challenging U.S. Pat. No. 11,217,237.
Ex. 1004—File History of U.S. Pat. No. 11,244,666, Exhibit-1004, Filed on Jun. 9, 2022—Cited in IPR2022-01099, challenging U.S. Pat. No. 11,244,666.
Ex. 1004 File History for U.S. Pat. No. 11,665,493, Exhibit-1004, Filed on Jul. 1, 2024—Cited in IPR2024-01034, challenging U.S. Pat. No. 9,279,263.
Ex. 1004 File History of U.S. Pat. No. 11,057,701, Exhibit-1004, Filed on Jun. 9, 2022—Cited in IPR2022-01078, challenging U.S. Pat. No. 11,057,701.
Ex. 1005—U.S. Appl. No. 13/917,079 File History part 1 of 2, Exhibit-1005, Filed on Jun. 9, 2022—Cited in IPR2022-01106, challenging U.S. Pat. No. 11,039,259.
Ex. 1005—U.S. Appl. No. 13/917,079 File History part 2 of 2, Exhibit-1005, Filed on Jun. 9, 2022—Cited in IPR2022-01106, challenging U.S. Pat. No. 11,039,259.
Ex. 1005 U.S. Appl. No. 61/098,250, Exhibit-1005, Filed on Jul. 1, 2024—Cited in IPR2024-01034, challenging U.S. Pat. No. 9,279,263.
Ex. 1006—U.S. Appl. No. 12/555,570 File History, Exhibit-1006, Filed on Jun. 9, 2022—Cited in IPR2022-01106, challenging U.S. Pat. No. 11,039,259.
Ex. 1006—U.S. Appl. No. 12/115,349 File History, Exhibit-1006, Filed on Jun. 9, 2022—Cited in IPR2022-01078, challenging U.S. Pat. No. 11,057,701.
Ex. 1006 Publication of U.S. Appl. No. 12/555,864, Exhibit-1006, Filed on Jul. 1, 2024—Cited in IPR2024-01034, challenging U.S. Pat. No. 9,279,263.
Ex. 1007—U.S. Appl. No. 61/096,128 File History, Exhibit-1007, Filed on Jun. 9, 2022—Cited in IPR2022-01106, challenging U.S. Pat. No. 11,039,259.
Ex. 1007 U.S. Appl. No. 60/916,271 File History, Exhibit-1007, Filed on Jun. 9, 2022—Cited in IPR2022-01078, challenging U.S. Pat. No. 11,057,701.
Ex. 1008—JP3353701B2 to Kondo with Translation, Exhibit-1008, Filed on Jun. 9, 2022—Cited in IPR2022-01098, challenging U.S. Pat. No. 11,217,237.
Ex. 1009 Translation of JPA 2002-204500 (Hayashi), Exhibit-1009, Filed on Jul. 1, 2024—Cited in IPR2024-01034, challenging U.S. Pat. No. 9,279,263.
Ex. 1010—Redline—965 versus parentExhibit1010,Jun. 18, 2024—Cited in IPR2024-01033, challenging U.S. Pat. No. 8,434,966.
Ex. 1012—U.S. Appl. No. 60/893,617Exhibit1012,Jun. 18, 2024—Cited in IPR2024-01033, challenging U.S. Pat. No. 8,434,966.
Ex. 1013—150139_14109987 NOA referred to in 965 NOAExhibit1013,Jun. 18, 2024—Cited in IPR2024-01033, challenging U.S. Pat. No. 8,434,966.
Ex. 1013 Deterministic Broad-Band Signal (Chu), Exhibit-1013, Filed on Jul. 1, 2024—Cited in IPR2024-01034, challenging U.S. Pat. No. 9,279,263.
Ex. 1013 IPR2022-00282 Patent Owner Preliminary Response, Exhibit-1013, Filed on Jun. 9, 2022—Cited in IPR2022-01078, challenging U.S. Pat. No. 11,057,701.
Ex. 1014—Mulgrew 2002, Exhibit-1014, Filed on Jun. 9, 2022—Cited in IPR2022-01099, challenging U.S. Pat. No. 11,244,666.
Ex. 1014—Redline—682 parent versus ultimate parent 812Exhibit1014,Jun. 18, 2024—Cited in IPR2024-01033, challenging U.S. Pat. No. 8,434,966.
Ex. 1014 701 Patent Family Tree, Exhibit-1014, Filed on Jun. 9, 2022—Cited in IPR2022-01078, challenging U.S. Pat. No. 11,057,701.
Ex. 1015—666 Family Tree, Exhibit-1015, Filed on Jun. 9, 2022—Cited in IPR2022-01099, challenging U.S. Pat. No. 11,244,666.
Ex. 1015—Letter re 965 IPR StipulationExhibit1015,Jun. 18, 2024—Cited in IPR2024-01033, challenging U.S. Pat. No. 8,434,966.
Ex. 1015 Complaint, E.D. Tex. 22-53, Exhibit-1015, Filed on Jun. 9, 2022—Cited in IPR2022-01078, challenging U.S. Pat. No. 11,057,701.
Ex. 1016—Complaint, E.D. Tex., 22-53, Exhibit-1016, Filed on Jun. 9, 2022—Cited in IPR2022-01099, challenging U.S. Pat. No. 11,244,666.
Ex. 1016 GSM 6.31, Exhibit-1016, Filed on Jun. 9, 2022—Cited in IPR2022-01078, challenging U.S. Pat. No. 11,057,701.
Ex. 1016 Reply Declaration of Richard Stern, PhD, Exhibit-1016, Filed on Dec. 2, 2022—Cited in IPR2022-00282, challenging U.S. Pat. No. 8,315,400.
Ex. 1017—Amended Complaint, E.D. Tex., 21-413, Exhibit-1017, Filed on Jun. 9, 2022—Cited in IPR2022-01099, challenging U.S. Pat. No. 11,244,666.
Ex. 1017—Rose 2003, Exhibit-1017, Filed on Jun. 9, 2022—Cited in IPR2022-01106, challenging U.S. Pat. No. 11,039,259.
Ex. 1017 David Kleinschmidt Depo Transcript, Exhibit-1017, Filed on Dec. 2, 2022—Cited in IPR2022-00282, challenging U.S. Pat. No. 8,315,400.
Ex. 1017 Final Rejection from Reexamination No. 90/015,146, Exhibit-1017, Filed on Jul. 1, 2024—Cited in IPR2024-01034, challenging U.S. Pat. No. 9,279,263.
Ex. 1017 GSM 6.12, Exhibit-1017, Filed on Jun. 9, 2022—Cited in IPR2022-01078, challenging U.S. Pat. No. 11,057,701.
Ex. 1018—Confidential Settlement Agreement with Exhibits A-IExhibit1018,Dec. 11, 2024—Cited in IPR2024-01033, challenging U.S. Pat. No. 8,434,966. [Document not publicly available at PTAB].
Ex. 1018—Consolidation Order, E.D. Tex., 21-413 & 22-53, Exhibit-1018, Filed on Jun. 9, 2022—Cited in IPR2022-01099, challenging U.S. Pat. No. 11,244,666.
Ex. 1018 Consolidation Order, E.D. Tex. 21-413 & 22-53, Exhibit-1018, Filed on Jun. 9, 2022—Cited in IPR2022-01078, challenging U.S. Pat. No. 11,057,701.
Ex. 1018 Excerpts from Wiley Electrical & Electronics Engineering Dictionary, Exhibit-1018, Filed on Dec. 2, 2022—Cited in IPR2022-00282, challenging U.S. Pat. No. 8,315,400.
Ex. 1019—Docket Control Order, E.D. Tex., 21-413, Exhibit-1019, Filed on Jun. 9, 2022—Cited in IPR2022-01099, challenging U.S. Pat. No. 11,244,666.
Ex. 1019—Duffner 2006, Exhibit-1019, Filed on Jun. 9, 2022—Cited in IPR2022-01098, challenging U.S. Pat. No. 11,217,237.

(56) References Cited

OTHER PUBLICATIONS

Ex. 1019 Docket Control Order, E.D. Tex. 21-413, Exhibit-1019, Filed on Jun. 9, 2022—Cited in IPR2022-01078, challenging U.S. Pat. No. 11,057,701.
Ex. 1019 Dual-Channel MLS-Based Test System (Schneider), Exhibit-1019, Filed on Jul. 1, 2024—Cited in IPR2024-01034, challenging U.S. Pat. No. 9,279,263.
Ex. 1020—Letter re IPR Stipulation, Exhibit-1020, Filed on Jun. 9, 2022—Cited in IPR2022-01099, challenging U.S. Pat. No. 11,244,666.
Ex. 1020 Letter re IPR Stipulation, Exhibit-1020, Filed on Jun. 9, 2022—Cited in IPR2022-01078, challenging U.S. Pat. No. 11,057,701.
Ex. 1021—Complaint. E.D. Tex., 22-00053, Exhibit-1021, Filed on Jun. 9, 2022—Cited in IPR2022-01098, challenging U.S. Pat. No. 11,217,237.
Ex. 1021—Hsu 2005, Exhibit-1021, Filed on Jun. 9, 2022—Cited in IPR2022-01106, challenging U.S. Pat. No. 11,039,259.
Ex. 1021—Stipulation Letter, Exhibit-1021, Filed on May 20, 2022—Cited in IPR2022-00253, challenging U.S. Pat. No. 9,491,542.
Ex. 1021 Amended Complaint, E.D. Tex. 21-413, Exhibit-1021, Filed on Jun. 9, 2022—Cited in IPR2022-01078, challenging U.S. Pat. No. 11,057,701.
Ex. 1021 Claim Construction Order, ED Tex, Exhibit-1021, Filed on Jul. 1, 2024—Cited in IPR2024-01034, challenging U.S. Pat. No. 9,279,263.
Ex. 1022—Amended Complaint, E.D.Tex., 21-00413, Exhibit-1022, Filed on Jun. 9, 2022—Cited in IPR2022-01098, challenging U.S. Pat. No. 11,217,237.
Ex. 1022—Complaint, E.D. Tex., Exhibit-1022, Filed on May 20, 2022—Cited in IPR2022-00253, challenging U.S. Pat. No. 9,491,542.
Ex. 1022 Letter to Techiya re 493 IPR Stipulation, Exhibit-1022, Filed on Jul. 1, 2024—Cited in IPR2024-01034, challenging U.S. Pat. No. 9,279,263.
Ex. 1023—Consolidation Order, E.D. Tex., Exhibit-1023, Filed on May 20, 2022—Cited in IPR2022-00253, challenging U.S. Pat. No. 9,491,542.
Ex. 1023—Consolidation Order, E.D.Tex., 21-00413 & 22-00053, Exhibit-1023, Filed on Jun. 9, 2022—Cited in IPR2022-01098, challenging U.S. Pat. No. 11,217,237.
Ex. 1023 Techiya Appeal Brief from Reexamination No. 90/015,146, Exhibit-1023, Filed on Jul. 1, 2024—Cited in IPR2024-01034, challenging U.S. Pat. No. 9,279,263.
Ex. 1024—259 Family Tree, Exhibit-1024, Filed on Jun. 9, 2022—Cited in IPR2022-01106, challenging U.S. Pat. No. 11,039,259.
Ex. 1024—Docket Control Order, E.D. Tex., 21-00413, Exhibit-1024, Filed on Jun. 9, 2022—Cited in IPR2022-01098, challenging U.S. Pat. No. 11,217,237.
Ex. 1024 Judicial Caseload Profile, Exhibit-1024, Filed on Jul. 1, 2024—Cited in IPR2024-01034, challenging U.S. Pat. No. 9,279,263.
Ex. 1025—Complaint, E.D. Tex. 22-53, Exhibit-1025, Filed on Jun. 9, 2022—Cited in IPR2022-01106, challenging U.S. Pat. No. 11,039,259.
Ex. 1025—Letter re IPR Stipulation, Exhibit-1025, Filed on Jun. 9, 2022—Cited in IPR2022-01098, challenging U.S. Pat. No. 11,217,237.
Ex. 1025—Stipulation Letter, Exhibit-1025, Filed on May 27, 2022—Cited in IPR2022-00281, challenging U.S. Pat. No. 9,270,244.
Ex. 1026—237 Family Tree, Exhibit-1026, Filed on Jun. 9, 2022—Cited in IPR2022-01098, challenging U.S. Pat. No. 11,217,237.
Ex. 1026—Amended Complaint, E.D. Tex. 21-413, Exhibit-1026, Filed on Jun. 9, 2022—Cited in IPR2022-01106, challenging U.S. Pat. No. 11,039,259.
Ex. 1026—Complaint, E.D. Tex., Exhibit-1026, Filed on May 27, 2022—Cited in IPR2022-00281, challenging U.S. Pat. No. 9,270,244.
Ex. 1026—Confidential Settlement Agreement, Exhibit-1026, Filed on Dec. 9, 2024—Cited in IPR2024-01034, challenging U.S. Pat. No. 9,279,263. [Document not publicly available at PTAB].
Ex. 1027—Confidential Settlement Agreement with Exhibits A-I, Exhibit-1027, Filed on Dec. 11, 2024—Cited in IPR2024-01034, challenging U.S. Pat. No. 9,279,263. [Document not publicly available at PTAB].
Ex. 1027—Consolidation Order, E.D. Tex., Exhibit-1027, Filed on May 27, 2022—Cited in IPR2022-00281, challenging U.S. Pat. No. 9,270,244.
Ex. 1027—Docket Control Order, E.D. Tex. 21-413, Exhibit-1027, Filed on Jun. 9, 2022—Cited in IPR2022-01106, challenging U.S. Pat. No. 11,039,259.
Ex. 1027—Transcript of Deposition of Christopher Struck, Exhibit-1027, Filed on Jan. 10, 2023—Cited in IPR2022-00302, challenging U.S. Pat. No. 9,609,424.
Ex. 1028—Consolidation Order, E.D. Tex. 21-413 & 22-53, Exhibit-1028, Filed on Jun. 9, 2022—Cited in IPR2022-01106, challenging U.S. Pat. No. 11,039,259.
Ex. 1028—Errata Sheet for Deposition of Christopher Struck, Exhibit-1028, Filed on Jan. 10, 2023—Cited in IPR2022-00302, challenging U.S. Pat. No. 9,609,424.
Ex. 1029—Letter re IPR Stipulation, Exhibit-1029, Filed on Jun. 9, 2022—Cited in IPR2022-01106, challenging U.S. Pat. No. 11,039,259.
Ex. 1029—Patent Owner's Opening Claim Construction Brief, E.D. Tex., Exhibit-1029, Filed on Jan. 10, 2023—Cited in IPR2022-00302, challenging U.S. Pat. No. 9,609,424.
Ex. 1029 Petitioners' Oral Hearing Demonstratives, Exhibit-1029, Filed on Sep. 26, 2023—Cited in IPR2022-01078, challenging U.S. Pat. No. 11,057,701.
Ex. 1030—Petitioners' Oral Hearing Demonstratives, Exhibit-1030, Filed on Apr. 11, 2023—Cited in IPR2022-00302, challenging U.S. Pat. No. 9,609,424.
Ex. 1033—Confidential Deposition of Christopher Struck, E.D. Tex., Exhibit-1033, Filed on May 15, 2023—Cited in IPR2022-00302, challenging U.S. Pat. No. 9,609,424. [Document not publicly available at PTAB].
Ex. 1034—Redacted Deposition of Christopher Struck, E.D. Tex., Exhibit-1034, Filed on May 15, 2023—Cited in IPR2022-00302, challenging U.S. Pat. No. 9,609,424.
Ex. 1037—Petitioners' Oral Hearing Demonstratives, Exhibit-1037, Filed on Oct. 11, 2023—Cited in IPR2022-01106, challenging U.S. Pat. No. 11,039,259.
Ex. 3001, Exhibit-3001, Filed on Nov. 8, 2024—Cited in IPR2024-01003, challenging U.S. Pat. No. 9,191,083.
Ex. 3001, Exhibit-3001, Filed on Nov. 8, 2024—Cited in IPR2024-01004, challenging U.S. Pat. No. 9,614,943.
Ex. 3001, Exhibit-3001, Filed on Nov. 8, 2024—Cited in IPR2024-01031, challenging U.S. Pat. No. 7,049,850.
Ex. 3001, Exhibit-3001, Filed on Nov. 8, 2024—Cited in IPR2024-01033, challenging U.S. Pat. No. 8,434,966.
Ex. 3001, Exhibit-3001, Filed on Nov. 8, 2024—Cited in IPR2024-01034, challenging U.S. Pat. No. 9,279,263.
Ex. 3001, Exhibit-3001, Filed on Apr. 6, 2023—Cited in IPR2022-00388, challenging U.S. Pat. No. 10,966,015.
Ex1002—Declaration of Christopher Schmandt, Exhibit-1002, Filed on Feb. 9, 2024—Cited in IPR2024-00559, challenging U.S. Pat. No. 11,610,587.
Ex1002—Declaration of Nathaniel Polish, Exhibit-1002, Filed on Jun. 25, 2024—Cited in IPR2024-01031, challenging U.S. Pat. No. 7,049,850.
Ex1002—Kyriakakis Declaration, Exhibit-1002, Filed on Jun. 12, 2024—Cited in IPR2024-01003, challenging U.S. Pat. No. 9,191,083.
Ex1002—Kyriakakis Declaration, Exhibit-1002, Filed on Jun. 12, 2024—Cited in IPR2024-01004, challenging U.S. Pat. No. 9,614,943.
Ex1003—Nathaniel Polish CV, Exhibit-1003, Filed on Jun. 25, 2024—Cited in IPR2024-01031, challenging U.S. Pat. No. 7,049,850.
Ex1003—Kyriakakis CV, Exhibit-1003, Filed on Jun. 12, 2024—Cited in IPR2024-01003, challenging U.S. Pat. No. 9,191,083.
Ex1003—Kyriakakis CV, Exhibit-1003, Filed on Jun. 12, 2024—Cited in IPR2024-01004, challenging U.S. Pat. No. 9,614,943.
Ex1003—Schmandt CV, Exhibit-1003, Filed on Feb. 9, 2024—Cited in IPR2024-00559, challenging U.S. Pat. No. 11,610,587.
Ex1004—File History for U.S. Pat. No. 11,659,315—Part 1 of 2, Exhibit-1004, Filed on Jun. 25, 2024—Cited in IPR2024-01031, challenging U.S. Pat. No. 7,049,850.
Ex1004—File History for U.S. Pat. No. 11,659,315—Part 2 of 2, Exhibit-1004, Filed on Jun. 25, 2024—Cited in IPR2024-01031, challenging U.S. Pat. No. 7,049,850.

(56) References Cited

OTHER PUBLICATIONS

Ex1004—File History for U.S. Pat. No. 11,710,473_Part 1 of 3, Exhibit-1004, Filed on Jun. 12, 2024—Cited in IPR2024-01003, challenging U.S. Pat. No. 9,191,083.
Ex1004—File History for U.S. Pat. No. 11,710,473_Part 1 of 3, Exhibit-1004, Filed on Jun. 12, 2024—Cited in IPR2024-01004, challenging U.S. Pat. No. 9,614,943.
Ex1004—File History for U.S. Pat. No. 11,710,473_Part 2 of 3, Exhibit-1004, Filed on Jun. 12, 2024—Cited in IPR2024-01003, challenging U.S. Pat. No. 9,191,083.
Ex1004—File History for U.S. Pat. No. 11,710,473_Part 2 of 3, Exhibit-1004, Filed on Jun. 12, 2024—Cited in IPR2024-01004, challenging U.S. Pat. No. 9,614,943.
Ex1004—File History for U.S. Pat. No. 11,710,473_Part 3 of 3, Exhibit-1004, Filed on Jun. 12, 2024—Cited in IPR2024-01003, challenging U.S. Pat. No. 9,191,083.
Ex1004—File History for U.S. Pat. No. 11,710,473_Part 3 of 3, Exhibit-1004, Filed on Jun. 12, 2024—Cited in IPR2024-01004, challenging U.S. Pat. No. 9,614,943.
Ex1004—U.S. Pat. No. 11,610,587 Part 1 of 2, Exhibit-1004, Filed on Feb. 9, 2024—Cited in IPR2024-00559, challenging U.S. Pat. No. 11,610,587.
Ex1004—U.S. Pat. No. 11,610,587 Part 2 of 2, Exhibit-1004, Filed on Feb. 9, 2024—Cited in IPR2024-00559, challenging U.S. Pat. No. 11,610,587.
Ex1005—U.S. Appl. No. 60/885,917, Exhibit-1005, Filed on Jun. 12, 2024—Cited in IPR2024-01003, challenging U.S. Pat. No. 9,191,083.
Ex1005—U.S. Appl. No. 60/885,917, Exhibit-1005, Filed on Jun. 12, 2024—Cited in IPR2024-01004, challenging U.S. Pat. No. 9,614,943.
Ex1005—U.S. Appl. No. 61/737,932 Provisional, Exhibit-1005, Filed on Jun. 25, 2024—Cited in IPR2024-01031, challenging U.S. Pat. No. 7,049,850.
Ex1005—U.S. Appl. No. 61/098,914 (Provisional Application), Exhibit-1005, Filed on Feb. 9, 2024—Cited in IPR2024-00559, challenging U.S. Pat. No. 11,610,587.
Ex1006—U.S. Appl. No. 16/266,829 (829 App), Exhibit-1006, Filed on Jun. 25, 2024—Cited in IPR2024-01031, challenging U.S. Pat. No. 7,049,850.
Ex1006—U.S. Appl. No. 17/321,892, Exhibit-1006, Filed on Jun. 12, 2024—Cited in IPR2024-01003, challenging U.S. Pat. No. 9,191,083.
Ex1006—U.S. Appl. No. 17/321,892, Exhibit-1006, Filed on Jun. 12, 2024—Cited in IPR2024-01004, challenging U.S. Pat. No. 9,614,943.
Ex1006—U.S. Appl. No. 17/203,731, Exhibit-1006, Filed on Feb. 9, 2024—Cited in IPR2024-00559, challenging U.S. Pat. No. 11,610,587.
Ex1007—315 Patent Family Tree, Exhibit-1007, Filed on Jun. 25, 2024—Cited in IPR2024-01031, challenging U.S. Pat. No. 7,049,850.
Ex1008—Docket Control Order, Exhibit-1008, Filed on Jun. 25, 2024—Cited in IPR2024-01031, challenging U.S. Pat. No. 7,049,850.
Ex1008—File History for U.S. Pat. No. 11,244,666, Exhibit-1008, Filed on Jun. 12, 2024—Cited in IPR2024-01003, challenging U.S. Pat. No. 9,191,083.
Ex1008—File History for U.S. Pat. No. 11,244,666, Exhibit-1008, Filed on Jun. 12, 2024—Cited in IPR2024-01004, challenging U.S. Pat. No. 9,614,943.
Ex1009—Letter from Nikhil Krishnan to Thomas J. Friel, Jr., Exhibit-1009, Filed on Jun. 25, 2024—Cited in IPR2024-01031, challenging U.S. Pat. No. 7,049,850.
Ex1009—U.S. Appl. No. 90/019,169 Re of U.S. Pat. No. 11,244,666_ Part 1 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 1 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 2 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 2 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 3 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 3 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 4 of 5, Exhibit-1009, Filed on Jun. 12, 2024—Cited in IPR2024-01003, challenging U.S. Pat. No. 9,191,083.
Ex1009—U.S. Appl. No. 90/019,169 Re of U.S. Pat. No. 11,244,666_ Part 4 of 5, Exhibit-1009, Filed on Jun. 12, 2024—Cited in IPR2024-01004, challenging U.S. Pat. No. 9,614,943.
Ex1009—U.S. Appl. No. 90/019,169 Re of U.S. Pat. No. 11,244,666_ Part 5 of 5, Exhibit-1009, Filed on Jun. 12, 2024—Cited in IPR2024-01003, challenging U.S. Pat. No. 9,191,083.
Ex1009—U.S. Appl. No. 90019,169 Re of U.S. Pat. No. 11,244,666_ Part 5 of 5, Exhibit-1009, Filed on Jun. 12, 2024—Cited in IPR2024-01004, challenging U.S. Pat. No. 9,614,943.
Ex1010—473 Patent Family Tree, Exhibit-1010, Filed on Jun. 12, 2024—Cited in IPR2024-01003, challenging U.S. Pat. No. 9,191,083.
Ex1010—473 Patent Family Tree, Exhibit-1010, Filed on Jun. 12, 2024—Cited in IPR2024-01004, challenging U.S. Pat. No. 9,614,943.
Ex1011—Claim Construction Order, ED Tex, Exhibit-1011, Filed on Jun. 12, 2024—Cited in IPR2024-01003, challenging U.S. Pat. No. 9,191,083.
Ex1011—Claim Construction Order, ED Tex, Exhibit-1011, Filed on Jun. 12, 2024—Cited in IPR2024-01004, challenging U.S. Pat. No. 9,614,943.
EX1012—Docket Control Order, ED Tex, Exhibit-1012, Filed on Jun. 12, 2024—Cited in IPR2024-01003, challenging U.S. Pat. No. 9,191,083.
Ex1012—Docket Control Order, ED Tex, Exhibit-1012, Filed on Jun. 12, 2024—Cited in IPR2024-01004, challenging U.S. Pat. No. 9,614,943.
Ex1013—Letter from Nikhil Krishnan to Thomas J Friel, Jr, Exhibit-1013, Filed on Jun. 12, 2024—Cited in IPR2024-01003, challenging U.S. Pat. No. 9,191,083.
Ex1013—Letter from Nikhil Krishnan to Thomas J Friel, Jr, Exhibit-1013, Filed on Jun. 12, 2024—Cited in IPR2024-01004, challenging U.S. Pat. No. 9,614,943.
Ex1016—Stay Order from E.D. Tex.Exhibit1016,Nov. 20, 2024—Cited in IPR2024-01033, challenging U.S. Pat. No. 8,434,966.
Ex1019—U.S. Appl. No. 60/841,990 (Rosenberg Provisional) (annotated), Exhibit-1019, Filed on Jun. 12, 2024—Cited in IPR2024-01003, challenging U.S. Pat. No. 9,191,083.
Ex1023—Preliminary Constructions, E.D. Tex., Exhibit-1023, Filed on Jan. 31, 2023—Cited in IPR2022-00369, challenging U.S. Pat. No. 10,405,082.
Ex1023—Preliminary Constructions, E.D. Tex., Exhibit-1023, Filed on Jan. 31, 2023—Cited in IPR2022-00388, challenging U.S. Pat. No. 10,966,015.
Ex1024—Cohen, Exhibit-1024, Filed on Feb. 9, 2024—Cited in IPR2024-00559, challenging U.S. Pat. No. 11,610,587.
Ex1024—Transcript of Deposition of Marshall Buck, Exhibit-1024, Filed on Jan. 31, 2023—Cited in IPR2022-00369, challenging U.S. Pat. No. 10,405,082.
Ex1024—Transcript of Deposition of Marshall Buck, Exhibit-1024, Filed on Jan. 31, 2023—Cited in IPR2022-00388, challenging U.S. Pat. No. 10,966,015.
Ex1025—Blattner et al, Earcons and Icons, Exhibit-1025, Filed on Jun. 25, 2024—Cited in IPR2024-01031, challenging U.S. Pat. No. 7,049,850.
Ex1025—Deposition Transcript of David Kleinschmidt, Exhibit-1025, Filed on Jan. 11, 2023—Cited in IPR2022-00253, challenging U.S. Pat. No. 9,491,542.

(56) References Cited

OTHER PUBLICATIONS

Ex1025—Stay Order from E.D. Tex., Exhibit-1025, Filed on Nov. 20, 2024—Cited in IPR2024-01034, challenging U.S. Pat. No. 9,279,263.
Ex1025—Tanenbaum, Exhibit-1025, Filed on Feb. 9, 2024—Cited in IPR2024-00559, challenging U.S. Pat. No. 11,610,587.
Ex1025 Petitioners' Oral Hearing Demonstratives, Exhibit-1025, Filed on May 9, 2023—Cited in IPR2022-00369, challenging U.S. Pat. No. 10,405,082.
Ex1025 Petitioners' Oral Hearing Demonstratives, Exhibit-1025, Filed on May 9, 2023—Cited in IPR2022-00388, challenging U.S. Pat. No. 10,966,015.
Ex1026—Cessation from Merriam-Webster's Collegiate Dictionary, 10th Ed, Exhibit-1026, Filed on Jan. 11, 2023—Cited in IPR2022-00253, challenging U.S. Pat. No. 9,491,542.
Ex1026—Computer Dictionary 2nd Ed, Exhibit-1026, Filed on Feb. 9, 2024—Cited in IPR2024-00559, challenging U.S. Pat. No. 11,610,587.
Ex1027—Cessation from New World Dictionary, 2d College Ed, Exhibit-1027, Filed on Jan. 11, 2023—Cited in IPR2022-00253, challenging U.S. Pat. No. 9,491,542.
Ex1028—Basu, Exhibit-1028, Filed on Jun. 12, 2024—Cited in IPR2024-01003, challenging U.S. Pat. No. 9,191,083.
Ex1028—Basu, Smart Headphones, Exhibit-1028, Filed on Jun. 12, 2024—Cited in IPR2024-01004, challenging U.S. Pat. No. 9,614,943.
Ex1028—Supplemental Declaration of Nathanial Polish, Ph.D., Exhibit-1028, Filed on Jan. 11, 2023—Cited in IPR2022-00253, challenging U.S. Pat. No. 9,491,542.
Ex1029—Declaration of Nathanial Polish, Exhibit-1029, Filed on Jan. 11, 2023—Cited in IPR2022-00281, challenging U.S. Pat. No. 9,270,244.
Ex1029—Mueller, Transparent Hearing, Exhibit-1029, Filed on Jun. 12, 2024—Cited in IPR2024-01003, challenging U.S. Pat. No. 9,191,083.
Ex1029—Mueller, Transparent Hearing, Exhibit-1029, Filed on Jun. 12, 2024—Cited in IPR2024-01004, challenging U.S. Pat. No. 9,614,943.
Ex1030—Deposition Transcript of David Kleinschmidt, Exhibit-1030, Filed on Jan. 11, 2023—Cited in IPR2022-00281, challenging U.S. Pat. No. 9,270,244.
Ex1031—587 Patent Family Tree, Exhibit-1031, Filed on Feb. 9, 2024—Cited in IPR2024-00559, challenging U.S. Pat. No. 11,610,587.
Ex1031—Basu, et al, Smart Headphones, Exhibit-1031, Filed on Jun. 25, 2024—Cited in IPR2024-01031, challenging U.S. Pat. No. 7,049,850.
Ex1031—Cessation from Merriam-Webster's Collegiate Dictionary, 10th Ed, Exhibit-1031, Filed on Jan. 11, 2023—Cited in IPR2022-00281, challenging U.S. Pat. No. 9,270,244.
Ex1031—Patent Rule 4-3 Joint Claim Construction and Prehearing Statement, E.D. TX, Exhibit-1031, Filed on Mar. 7, 2023—Cited in IPR2022-00253, challenging U.S. Pat. No. 9,491,542.
Ex1032—Cessation from New World Dictionary, 2d College Ed, Exhibit-1032, Filed on Jan. 11, 2023—Cited in IPR2022-00281, challenging U.S. Pat. No. 9,270,244.
Ex1032—Ex. A-01_U.S. Pat. No. 11/610,587 Samsung Infringement Claim Chart, Exhibit-1032, Filed on Feb. 9, 2024—Cited in IPR2024-00559, challenging U.S. Pat. No. 11,610,587.
Ex1032—Excerpts from Microsoft Computer Dictionary, 4th ed, Exhibit-1032, Filed on Jun. 25, 2024—Cited in IPR2024-01031, challenging U.S. Pat. No. 7,049,850.
Ex1032—Petitioners' Oral Hearing Demonstratives, Exhibit-1032, Filed on Apr. 12, 2023—Cited in IPR2022-00253, challenging U.S. Pat. No. 9,491,542.
Ex1033—Order Granting Proposed Docket Control Order, Exhibit-1033, Filed on Feb. 9, 2024—Cited in IPR2024-00559, challenging U.S. Pat. No. 11,610,587.
Ex1033—Pending from Merriam-Webster's Collegiate Dictionary, 10th Ed, Exhibit-1033, Filed on Jan. 11, 2023—Cited in IPR2022-00281, challenging U.S. Pat. No. 9,270,244.
Ex1034—Computer Dictionary 2nd Ed, Exhibit-1034, Filed on Jun. 12, 2024—Cited in IPR2024-01003, challenging U.S. Pat. No. 9,191,083.
Ex1034—D Del Statistics, Exhibit-1034, Filed on Feb. 9, 2024—Cited in IPR2024-00559, challenging U.S. Pat. No. 11,610,587.
Ex1034—Pause from Merriam-Webster's Collegiate Dictionary, 10th Ed, Exhibit-1034, Filed on Jan. 11, 2023—Cited in IPR2022-00281, challenging U.S. Pat. No. 9,270,244.
Ex1035—Deposition Transcript for Daniel P. Anagnos, Exhibit-1035, Filed on Jan. 10, 2023—Cited in IPR2022-00324, challenging U.S. Pat. No. 8,254,591.
Ex1035—File History of U.S. Pat. No. 10,635,382; Exhibit-1035, Filed on Dec. 2, 2022—Cited in IPR2022-00234, challenging U.S. Pat. No. 9,124,982.
Ex1035—Letter to Techiya re 587 IPR Stipulation, Exhibit-1035, Filed on Feb. 9, 2024—Cited in IPR2024-00559, challenging U.S. Pat. No. 11,610,587.
Ex1035—National Judicial Caseload Profile, Exhibit-1035, Filed on Jun. 25, 2024—Cited in IPR2024-01031, challenging U.S. Pat. No. 7,049,850.
Ex1035—Patent Rule 4-3 Joint Claim Construction and Prehearing Statement, E.D. TX, Exhibit-1035, Filed on Mar. 7, 2023—Cited in IPR2022-00281, challenging U.S. Pat. No. 9,270,244.
Ex1035—Tanenbaum Excerpt, Exhibit-1035, Filed on Jun. 12, 2024—Cited in IPR2024-01003, challenging U.S. Pat. No. 9,191,083.
Ex1036—LinkedIn Profile for Harish Jonnalagadda, Exhibit-1036, Filed on Jan. 10, 2023—Cited in IPR2022-00324, challenging U.S. Pat. No. 8,254,591.
Ex1036—Oshana excerpt, Exhibit-1036, Filed on Jun. 12, 2024—Cited in IPR2024-01003, challenging U.S. Pat. No. 9,191,083.
Ex1036—Oshana excerpt, Exhibit-1036, Filed on Jun. 12, 2024—Cited in IPR2024-01004, challenging U.S. Pat. No. 9,614,943.
Ex1036—Petitioners' Oral Hearing Demonstratives, Exhibit-1036, Filed on Apr. 13, 2023—Cited in IPR2022-00281, challenging U.S. Pat. No. 9,270,244.
Ex1036—Stay Order from E.D. Tex., Exhibit-1036, Filed on Nov. 20, 2024—Cited in IPR2024-01031, challenging U.S. Pat. No. 7,049,850.
Ex1037—Confidential Settlement Agrement with Exhibits A-I, Exhibit-1037, Filed on Dec. 11, 2024—Cited in IPR2024-00559, challenging U.S. Pat. No. 11,610,587. [Document not publicly available at PTAB].
Ex1038—Confidential Settlement Agreement with Exhibits A-I, Exhibit-1038, Filed on Dec. 11, 2024—Cited in IPR2024-01031, challenging U.S. Pat. No. 7,049,850. [Document not publicly available at PTAB].
Ex1038—Handbook for Sound Engineers_Part 1 of 2, Exhibit-1038, Filed on Jun. 12, 2024—Cited in IPR2024-01003, challenging U.S. Pat. No. 9,191,083.
Ex1038—Handbook for Sound Engineers_Part 2 of 2, Exhibit-1038, Filed on Jun. 12, 2024—Cited in IPR2024-01003, challenging U.S. Pat. No. 9,191,083.
Ex1040—IPR2022-00234, Ex 2001, Declaration of Daniel P Anagnos; Exhibit-1040, Filed on Dec. 2, 2022—Cited in IPR2022-00234, challenging U.S. Pat. No. 9,124,982.
Ex1041—Nov. 18, 2022, Deposition Transcript of Daniel P Anagnos; Exhibit-1041, Filed on Dec. 2, 2022—Cited in IPR2022-00234, challenging U.S. Pat. No. 9,124,982.
Ex1041—Supplemental Declaration of Les E. Atlas, Ph.D., Exhibit-1041, Filed on Jan. 10, 2023—Cited in IPR2022-00324, challenging U.S. Pat. No. 8,254,591.
Ex1042—Excerpts from the Authoritative Dictionary of IEEE Standards Terms; Exhibit-1042, Filed on Dec. 2, 2022—Cited in IPR2022-00234, challenging U.S. Pat. No. 9,124,982.
Ex1042—Petitioners' Oral Hearing Demonstratives, Exhibit-1042, Filed on Apr. 4, 2023—Cited in IPR2022-00324, challenging U.S. Pat. No. 8,254,591.
Ex1043—Institution Decision, IPR2022-00234, Paper 16; Exhibit-1043, Filed on Dec. 2, 2022—Cited in IPR2022-00234, challenging U.S. Pat. No. 9,124,982.
Ex1044—Patent Owner Response, IPR2022-00234, Paper 22; Exhibit-1044, Filed on Dec. 2, 2022—Cited in IPR2022-00234, challenging U.S. Pat. No. 9,124,982.

(56) References Cited

OTHER PUBLICATIONS

Ex1045—Excerpt of Prosecution History of U.S. Appl. No. 17/483,190, Exhibit-1045, Filed on Jun. 12, 2024—Cited in IPR2024-01003, challenging U.S. Pat. No. 9,191,083.
Ex1056—U.S. Pat. No. 11,710,473 Samsung Infringement Claim Chart, Ex. A-06, Exhibit-1056, Filed on Jun. 12, 2024—Cited in IPR2024-01003, challenging U.S. Pat. No. 9,191,083.
Ex1056—U.S. Pat. No. 11,710,473 Samsung Infringement Claim Chart, Ex. A-06, Exhibit-1056, Filed on Jun. 12, 2024—Cited in IPR2024-01004, challenging U.S. Pat. No. 9,614,943.
Ex1058—Kuo, Active Noise Control, Exhibit-1058, Filed on Jun. 12, 2024—Cited in IPR2024-01004, challenging U.S. Pat. No. 9,614,943.
Ex1058—Petitioners' Oral Hearing Demonstratives, Exhibit-1058, Filed on Mar. 16, 2023—Cited in IPR2022-00242, challenging U.S. Pat. No. 8,111,839.
Ex1058—Petitioners' Oral Hearing Demonstratives, Exhibit-1058, Filed on Mar. 16, 2023—Cited in IPR2022-00243, challenging U.S. Pat. No. 8,111,839.
Ex1059—Stay Order from E.D. Tex., Exhibit-1059, Filed on Nov. 20, 2024—Cited in IPR2024-01003, challenging U.S. Pat. No. 9,191,083.
Ex1059—Stay Order from E.D. Tex., Exhibit-1059, Filed on Nov. 20, 2024—Cited in IPR2024-01004, challenging U.S. Pat. No. 9,614,943.
Ex1061—Confidential Settlement Agreement with Exhibits A-I, Exhibit-1061, Filed on Dec. 11, 2024—Cited in IPR2024-01004, challenging U.S. Pat. No. 9,614,943. [Document not publicly available at PTAB].
Ex1061—Confidential Settlement Agrement with Exhibits A-I, Exhibit-1061, Filed on Dec. 11, 2024—Cited in IPR2024-01003, challenging U.S. Pat. No. 9,191,083. [Document not publicly available at PTAB].
Excerpt from Computer Dictionary, 2d ed., Exhibit-1027, Filed on Dec. 13, 2021—Cited in IPR2022-00242, challenging U.S. Pat. No. 8,111,839.
Excerpt from Computer Dictionary, 2d ed., Exhibit-1027, Filed on Dec. 13, 2021—Cited in IPR2022-00243, challenging U.S. Pat. No. 8,111,839.
Excerpt from Computer Dictionary, 2d ed.; Exhibit-1029, Filed on Dec. 13, 2021—Cited in IPR2022-00234, challenging U.S. Pat. No. 9,124,982.
Excerpt from Dictionary of Scientific and Technical Terms, 5th ed., Exhibit-1026, Filed on Dec. 20, 2021—Cited in IPR2022-00324, challenging U.S. Pat. No. 8,254,591.
Excerpt from McGraw Hill Dictionary of Scientific and Technical Terms, 5th ed., Exhibit-1025, Filed on Dec. 13, 2021—Cited in IPR2022-00242, challenging U.S. Pat. No. 8,111,839.
Excerpt from McGraw-Hill Dictionary of Scientific and Technical Terms, 5th ed., Exhibit-1025, Filed on Dec. 13, 2021—Cited in IPR2022-00243, challenging U.S. Pat. No. 8,111,839.
Excerpt from Oshana; Exhibit-1030, Filed on Dec. 13, 2021—Cited in IPR2022-00234, challenging U.S. Pat. No. 9,124,982.
Excerpt of File History of U.S. Appl. No. 12/100,281; Exhibit-1006, Filed on Dec. 13, 2021—Cited in IPR2022-00234, challenging U.S. Pat. No. 9,124,982.
Excerpt of File History of U.S. Appl. No. 13/352,694; Exhibit-1007, Filed on Dec. 13, 2021—Cited in IPR2022-00234, challenging U.S. Pat. No. 9,124,982.
Excerpts from Federal Court Management Statistics, Exhibit-1022, Filed on Jul. 1, 2022—Cited in IPR2022-00369, challenging U.S. Pat. No. 10,405,082.
Excerpts from Federal Court Management Statistics, Exhibit-1022, Filed on Jul. 1, 2022—Cited in IPR2022-00388, challenging U.S. Pat. No. 10,966,015.
Excerpts from Federal Court Management Statistics, Exhibit-1023, Filed on Jul. 1, 2022—Cited in IPR2022-00410, challenging U.S. Pat. No. 10,979,836.
Excerpts from Federal Court Management Statistics, Exhibit-1024, Filed on Jul. 1, 2022—Cited in IPR2022-00253, challenging U.S. Pat. No. 9,491,542.
Excerpts from Federal Court Management Statistics, Exhibit-1026, Filed on Jul. 1, 2022—Cited in IPR2022-00302, challenging U.S. Pat. No. 9,609,424.
Excerpts from Federal Court Management Statistics, Exhibit-1028, Filed on Jul. 1, 2022—Cited in IPR2022-00281, challenging U.S. Pat. No. 9,270,244.
Excerpts from Federal Court Management Statistics, Exhibit-1034, Filed on Jul. 1, 2022—Cited in IPR2022-00324, challenging U.S. Pat. No. 8,254,591.
Excerpts from McGraw-Hill Dictionary of Scientific and Technical Terms, 5th ed.; Exhibit-1021, Filed on Dec. 13, 2021—Cited in IPR2022-00234, challenging U.S. Pat. No. 9,124,982.
Excerpts from Openheim, Exhibit-1016, Filed on Jan. 4, 2022—Cited in IPR2022-00388, challenging U.S. Pat. No. 10,966,015.
Excerpts from Oppenheim & Schafer, 3rd ed., Exhibit-1016, Filed on Dec. 30, 2021—Cited in IPR2022-00369, challenging U.S. Pat. No. 10,405,082.
Excerpts from Oshana, Exhibit-1027, Filed on Dec. 20, 2021—Cited in IPR2022-00324, challenging U.S. Pat. No. 8,254,591.
Excerpts from Oshana, Exhibit-1028, Filed on Dec. 13, 2021—Cited in IPR2022-00242, challenging U.S. Pat. No. 8,111,839.
Excerpts from Oshana, Exhibit-1028, Filed on Dec. 13, 2021—Cited in IPR2022-00243, challenging U.S. Pat. No. 8,111,839.
Exhibit 3001, Exhibit-3001, Filed on Jan. 5, 2023—Cited in IPR2022-00282, challenging U.S. Pat. No. 8,315,400.
Exhibit 3001, Exhibit-3001, Filed on Nov. 3, 2022—Cited in IPR2022-01078, challenging U.S. Pat. No. 11,057,701.
Exhibit 3001, Exhibit-3001, Filed on Nov. 3, 2022—Cited in IPR2022-01106, challenging U.S. Pat. No. 11,039,259.
Exhibit 3001, Exhibit-3001, Filed on Apr. 6, 2023—Cited in IPR2022-00369, challenging U.S. Pat. No. 10,405,082.
Expunged, Exhibit-1002, Filed on Jan. 4, 2022—Cited in IPR2022-00388, challenging U.S. Pat. No. 10,966,015. [Document expunged from PTAB record].
Expunged, Exhibit-1006, Filed on Dec. 13, 2021—Cited in IPR2022-00242, challenging U.S. Pat. No. 8,111,839.
Expunged, Exhibit-1006, Filed on Dec. 13, 2021—Cited in IPR2022-00243, challenging U.S. Pat. No. 8,111,839.
Expunged, Exhibit-1031, Filed on Apr. 13, 2023—Cited in IPR2022-00302, challenging U.S. Pat. No. 9,609,424.
Expunged, Exhibit-1036, Filed on Dec. 9, 2024—Cited in IPR2024-00559, challenging U.S. Pat. No. 11,610,587. [Document expunged from PTAB record].
Expunged, Exhibit-1037, Filed on Dec. 9, 2024—Cited in IPR2024-01031, challenging U.S. Pat. No. 7,049,850. [Document expunged from PTAB record].
Expunged, Exhibit-1060, Filed on Dec. 9, 2024—Cited in IPR2024-01003, challenging U.S. Pat. No. 9,191,083. [Document expunged from PTAB record].
Expunged, Exhibit-1060, Filed on Dec. 9, 2024—Cited in IPR2024-01004, challenging U.S. Pat. No. 9,614,943. [Document expunged from PTAB record].
Expunged, Exhibit-11, Filed on Jan. 18, 2023—Cited in IPR2022-01099, challenging U.S. Pat. No. 11,244,666. [Document expunged from PTAB record].
Expunged, Exhibit-12, Filed on Jan. 18, 2023—Cited in IPR2022-01098, challenging U.S. Pat. No. 11,217,237. [Document expunged from PTAB record].
Expunged, Exhibit-2008, Filed on Feb. 22, 2023—Cited in IPR2022-00281, challenging U.S. Pat. No. 9,270,244.
Expunged, Exhibit-3, Filed on Dec. 10, 2021—Cited in IPR2022-00282, challenging U.S. Pat. No. 8,315,400. [Document expunged from PTAB record].
Expunged, Exhibit-3, Filed on Jun. 9, 2022—Cited in IPR2022-01098, challenging U.S. Pat. No. 11,217,237. [Document expunged from PTAB record].
Expunged, Exhibit-3002, Filed on Apr. 6, 2023—Cited in IPR2022-00388, challenging U.S. Pat. No. 10,966,015. [Document expunged from PTAB record].

(56) References Cited

OTHER PUBLICATIONS

Expunged, Exhibit-37, Filed on Aug. 15, 2023—Cited in IPR2022-00243, challenging U.S. Pat. No. 8,111,839.
ExpungedExhibit1017,Dec. 9, 2024—Cited in IPR2024-01033, challenging U.S. Pat. No. 8,434,966. [Document expunged from PTAB record].
Extract from Federal Court Management Statistics, Exhibit-1021, Filed on Nov. 10, 2022—Cited in IPR2022-01099, challenging U.S. Pat. No. 11,244,666.
Extract from Federal Court Management Statistics, Exhibit-1024, Filed on Nov. 10, 2022—Cited in IPR2022-01078, challenging U.S. Pat. No. 11,057,701.
Extract from Federal Court Management Statistics, Exhibit-1027, Filed on Nov. 15, 2022—Cited in IPR2022-01098, challenging U.S. Pat. No. 11,217,237.
Extract from Federal Court Management Statistics, Exhibit-1030, Filed on Nov. 10, 2022—Cited in IPR2022-01106, challenging U.S. Pat. No. 11,039,259.
Federal Court Management Statistics (excerpt), Exhibit-2004, Filed on Jul. 1, 2022—Cited in IPR2022-00253, challenging U.S. Pat. No. 9,491,542.
Federal Court Management Statistics (excerpt), Exhibit-2004, Filed on Jul. 1, 2022—Cited in IPR2022-00281, challenging U.S. Pat. No. 9,270,244.
Federal Court Management Statistics (excerpt), Exhibit-2004, Filed on Jul. 1, 2022—Cited in IPR2022-00302, challenging U.S. Pat. No. 9,609,424.
Federal Court Management Statistics (excerpt), Exhibit-2004, Filed on Jul. 1, 2022—Cited in IPR2022-00324, challenging U.S. Pat. No. 8,254,591.
Federal Court Management Statistics (excerpt), Exhibit-2005, Filed on Jul. 1, 2022—Cited in IPR2022-00369, challenging U.S. Pat. No. 10,405,082.
Federal Court Management Statistics (excerpt), Exhibit-2005, Filed on Jul. 1, 2022—Cited in IPR2022-00410, challenging U.S. Pat. No. 10,979,836.
Federal Court Management Statistics (excerpt), Exhibit-2006, Filed on Jul. 1, 2022—Cited in IPR2022-00388, challenging U.S. Pat. No. 10,966,015.
File History for U.S. Pat. No. 9,491,542, Exhibit-1004, Filed on Dec. 17, 2021—Cited in IPR2022-00253, challenging U.S. Pat. No. 9,491,542.
File History of U.S. Appl. No. 16/168,752, Exhibit-2005, Filed on May 18, 2022—Cited in IPR2022-00388, challenging U.S. Pat. No. 10,966,015.
File History of U.S. Appl. No. 12/555,864, Exhibit-1012, Filed on Jan. 14, 2022—Cited in IPR2022-00410, challenging U.S. Pat. No. 10,979,836.
File History of U.S. Appl. No. 14/054,015, Exhibit-1011, Filed on Jan. 14, 2022—Cited in IPR2022-00410, challenging U.S. Pat. No. 10,979,836.
File History of U.S. Appl. No. 14/827,332, Exhibit-1010, Filed on Jan. 14, 2022—Cited in IPR2022-00410, challenging U.S. Pat. No. 10,979,836.
File History of U.S. Appl. No. 15/700,511, Exhibit-1009, Filed on Jan. 14, 2022—Cited in IPR2022-00410, challenging U.S. Pat. No. 10,979,836.
File History of U.S. Appl. No. 16/414,136, Exhibit-1013, Filed on Jan. 14, 2022—Cited in IPR2022-00410, challenging U.S. Pat. No. 10,979,836.
File History of U.S. Pat. No. 8,111,839, Exhibit-1005, Filed on Dec. 13, 2021—Cited in IPR2022-00242, challenging U.S. Pat. No. 8,111,839.
File History of U.S. Pat. No. 8,111,839, Exhibit-1005, Filed on Dec. 13, 2021—Cited in IPR2022-00243, challenging U.S. Pat. No. 8,111,839.
File History of U.S. Pat. No. 8,254,591, Exhibit-1004, Filed on Dec. 20, 2021—Cited in IPR2022-00324, challenging U.S. Pat. No. 8,254,591.
File History of U.S. Pat. No. 9,124,982; Exhibit-1004, Filed on Dec. 13, 2021—Cited in IPR2022-00234, challenging U.S. Pat. No. 9,124,982.
File History of U.S. Pat. No. 10,405,082, Exhibit-1004, Filed on Dec. 30, 2021—Cited in IPR2022-00369, challenging U.S. Pat. No. 10,405,082.
File History of U.S. Pat. No. 10,966,015, Exhibit-1005, Filed on Jan. 4, 2022—Cited in IPR2022-00388, challenging U.S. Pat. No. 10,966,015.
File History of U.S. Pat. No. 10,979,836,, U.S. Appl. No. 16/838,277, Exhibit-1004, Filed on Jan. 14, 2022—Cited in IPR2022-00410, challenging U.S. Pat. No. 10,979,836.
File History of U.S. Pat. No. 8,315,400, Exhibit-1004, Filed on Dec. 10, 2021—Cited in IPR2022-00282, challenging U.S. Pat. No. 8,315,400.
File History of U.S. Pat. No. 8,774,433, Exhibit-1009, Filed on Dec. 21, 2021—Cited in IPR2022-00302, challenging U.S. Pat. No. 9,609,424.
File History of U.S. Pat. No. 9,270,244, Exhibit-1004, Filed on Dec. 21, 2021—Cited in IPR2022-00281, challenging U.S. Pat. No. 9,270,244.
File History of U.S. Pat. No. 9,332,364, Exhibit-1005, Filed on Dec. 21, 2021—Cited in IPR2022-00302, challenging U.S. Pat. No. 9,609,424.
File History of U.S. Pat. No. 9,609,424, Exhibit-1004, Filed on Dec. 21, 2021—Cited in IPR2022-00302, challenging U.S. Pat. No. 9,609,424.
File History of U.S. Appl. No. 60/910,808; Exhibit-1005, Filed on Dec. 13, 2021—Cited in IPR2022-00234, challenging U.S. Pat. No. 9,124,982.
File History of U.S. Appl. No. 61/098,250, Exhibit-1005, Filed on Jan. 14, 2022—Cited in IPR2022-00410, challenging U.S. Pat. No. 10,979,836.
File History of U.S. Appl. No. 60/619,517 (Allen Provisional), Exhibit-1020, Filed on Dec. 21, 2021—Cited in IPR2022-00302, challenging U.S. Pat. No. 9,609,424.
File History of U.S. Appl. No. 60/866,420, Exhibit-1010, Filed on Dec. 21, 2021—Cited in IPR2022-00302, challenging U.S. Pat. No. 9,609,424.
Final Written Decision, IPR2022-00282 (Paper No. 28, Jun. 14, 2023), Exhibit-1035, Filed on Jun. 30, 2023—Cited in IPR2022-01106, challenging U.S. Pat. No. 11,039,259.
Final Written Decision: Final Written Decision Determining All Challenged Claims Unpatentable 35 U.S.C. sec. 318a, Exhibit-32, Filed on Jan. 5, 2024—Cited in IPR2022-01106, challenging U.S. Pat. No. 11,039,259.
Final Written Decision: original, Exhibit-28, Filed on Jun. 14, 2023—Cited in IPR2022-00282, challenging U.S. Pat. No. 8,315,400.
Final Written Decision: original, Exhibit-31, Filed on Jul. 13, 2023—Cited in IPR2022-00281, challenging U.S. Pat. No. 9,270,244.
Final Written Decision: original, Exhibit-33, Filed on Jul. 10, 2023—Cited in IPR2022-00324, challenging U.S. Pat. No. 8,254,591.
Final Written Decision: original, Exhibit-33, Filed on Jul. 14, 2023—Cited in IPR2022-00253, challenging U.S. Pat. No. 9,491,542.
Final Written Decision: original, Exhibit-36, Filed on Jun. 16, 2023—Cited in IPR2022-00242, challenging U.S. Pat. No. 8,111,839.
Final Written Decision: original; Exhibit-29, Filed on Jun. 14, 2023—Cited in IPR2022-00234, challenging U.S. Pat. No. 9,124,982.
Final Written Decision: Judgment Final Written Decision Determining All Challenged Claims Unpatentable 35 U.S.C. § 318(a), Exhibit-35, Filed on Jun. 20, 2023—Cited in IPR2022-00243, challenging U.S. Pat. No. 8,111,839.
First Amended Complaint, *Staton Techiya* v. *Samsung*, E.D. Tex., Exhibit-1008, Filed on Dec. 10, 2021—Cited in IPR2022-00282, challenging U.S. Pat. No. 8,315,400.
First Amended Complaint, *Techiya* v. *Samsung*, E.D. Tex., Exhibit-1018, Filed on Dec. 21, 2021—Cited in IPR2022-00281, challenging U.S. Pat. No. 9,270,244.
First Amended Complaint, *Techiya* v. *Samsung*, E.D. Tex., Exhibit-1020, Filed on Dec. 17, 2021—Cited in IPR2022-00253, challenging U.S. Pat. No. 9,491,542.

(56) References Cited

OTHER PUBLICATIONS

First Amended Complaint, *Techiya* v. *Samsung*, E.D. Tex., Exhibit-1029, Filed on Dec. 20, 2021—Cited in IPR2022-00324, challenging U.S. Pat. No. 8,254,591.
First Amended Complaint, *Techiya* v. *Samsung*, E.D. Tex., Exhibit-1040, Filed on Dec. 13, 2021—Cited in IPR2022-00242, challenging U.S. Pat. No. 8,111,839.
First Amended Complaint, *Techiya* v. *Samsung*, E.D. Tex., Exhibit-1040, Filed on Dec. 13, 2021—Cited in IPR2022-00243, challenging U.S. Pat. No. 8,111,839.
First Amended Complaint, *Techiya* v. *Samsung*, E.D. Tex.; Exhibit-1031, Filed on Dec. 13, 2021—Cited in IPR2022-00234, challenging U.S. Pat. No. 9,124,982.
Granting Institution of Inter Partes Review 35 U.S.C. § 314, Exhibit-13, Filed on Jul. 15, 2022—Cited in IPR2022-00253, challenging U.S. Pat. No. 9,491,542.
Granting Institution of Inter Partes Review 35 U.S.C. § 314, Exhibit-13, Filed on Jul. 15, 2022—Cited in IPR2022-00281, challenging U.S. Pat. No. 9,270,244.
Granting Institution of Inter Partes Review 35 U.S.C. § 314, Exhibit-13, Filed on Aug. 16, 2022—Cited in IPR2022-00388, challenging U.S. Pat. No. 10,966,015.
Granting Institution of Inter Partes Review 35 U.S.C. § 314, Exhibit-14, Filed on Aug. 16, 2022—Cited in IPR2022-00369, challenging U.S. Pat. No. 10,405,082.
Harman Q&As about Microphone Windscreens, Exhibit-2013, Filed on Sep. 13, 2022—Cited in IPR2022-00242, challenging U.S. Pat. No. 8,111,839.
Harman, Q&As about Microphone Screens; Exhibit-2012, Filed on Sep. 9, 2022—Cited in IPR2022-00234, challenging U.S. Pat. No. 9,124,982.
IEEE Dictionary of Standards Terms (excerpts), Exhibit-2006, Filed on Mar. 21, 2022—Cited in IPR2022-00282, challenging U.S. Pat. No. 8,315,400.
Institution Decision: Deny, Exhibit-12, Filed on Aug. 12, 2022—Cited in IPR2022-00410, challenging U.S. Pat. No. 10,979,836.
Institution Decision: Grant, Exhibit-10, Filed on Jan. 9, 2023—Cited in IPR2022-01106, challenging U.S. Pat. No. 11,039,259.
Institution Decision: Grant, Exhibit-12, Filed on Jun. 17, 2022—Cited in IPR2022-00282, challenging U.S. Pat. No. 8,315,400.
Institution Decision: Grant, Exhibit-13, Filed on Jul. 11, 2022—Cited in IPR2022-00302, challenging U.S. Pat. No. 9,609,424.
Institution Decision: Grant, Exhibit-13, Filed on Jul. 11, 2022—Cited in IPR2022-00324, challenging U.S. Pat. No. 8,254,591.
Institution Decision: Grant, Exhibit-15, Filed on Jun. 21, 2022—Cited in IPR2022-00243, challenging U.S. Pat. No. 8,111,839.
Institution Decision: Grant, Exhibit-16, Filed on Jun. 21, 2022—Cited in IPR2022-00242, challenging U.S. Pat. No. 8,111,839.
Institution Decision: Grant, Exhibit-8, Filed on Aug. 16, 2024—Cited in IPR2024-00559, challenging U.S. Pat. No. 11,610,587.
Institution Decision: Grant; Exhibit-12, Filed on Jun. 17, 2022—Cited in IPR2022-00234, challenging U.S. Pat. No. 9,124,982.
Joint Motion to Consolidate; Exhibit-2005, Filed on Apr. 29, 2022—Cited in IPR2022-00234, challenging U.S. Pat. No. 9,124,982.
Joint Motion to Terminate Proceeding, Exhibit-17, Filed on Dec. 9, 2024—Cited in IPR2024-00559, challenging U.S. Pat. No. 11,610,587.
Joint Request to Treat Settlement Agreement as Business Confidential Information, Exhibit-14, Filed on Dec. 9, 2024—Cited in IPR2024-01003, challenging U.S. Pat. No. 9,191,083.
Joint Request to Treat Settlement Agreement as Business Confidential Information, Exhibit-14, Filed on Dec. 9, 2024—Cited in IPR2024-01004, challenging U.S. Pat. No. 9,614,943.
Joint Request to Treat Settlement Agreement as Business Confidential Information, Exhibit-14, Filed on Dec. 9, 2024—Cited in IPR2024-01031, challenging U.S. Pat. No. 7,049,850.
Joint Request to Treat Settlement Agreement as Business Confidential Information, Exhibit-15, Filed on Dec. 9, 2024—Cited in IPR2024-01034, challenging U.S. Pat. No. 9,279,263.
Joint Request to Treat Settlement Agreement as Business Confidential Information, Exhibit-18, Filed on Dec. 9, 2024—Cited in IPR2024-00559, challenging U.S. Pat. No. 11,610,587.
Joint Request to Treat Settlement Agreement as Business Confidential InformationPaper13,Dec. 9, 2024—Cited in IPR2024-01033, challenging U.S. Pat. No. 8,434,966.
Joint Statement Regarding Oral Argument, Exhibit-15, Filed on Jul. 29, 2022—Cited in IPR2022-00253, challenging U.S. Pat. No. 9,491,542.
Joint Statement Regarding Oral Argument, Exhibit-15, Filed on Jul. 29, 2022—Cited in IPR2022-00281, challenging U.S. Pat. No. 9,270,244.
Joint Statement Regarding Oral Argument, Exhibit-15, Filed on Jul. 29, 2022—Cited in IPR2022-00302, challenging U.S. Pat. No. 9,609,424.
Joint Statement Regarding Oral Argument, Exhibit-15, Filed on Aug. 24, 2022—Cited in IPR2022-00388, challenging U.S. Pat. No. 10,966,015.
Joint Statement Regarding Oral Argument, Exhibit-16, Filed on Jul. 29, 2022—Cited in IPR2022-00324, challenging U.S. Pat. No. 8,254,591.
Joint Statement Regarding Oral Argument, Exhibit-16, Filed on Aug. 24, 2022—Cited in IPR2022-00369, challenging U.S. Pat. No. 10,405,082.
Joint Statement Regarding Oral Argument, Exhibit-18, Filed on Jul. 29, 2022—Cited in IPR2022-00243, challenging U.S. Pat. No. 8,111,839.
Joint Statement Regarding Oral Argument, Exhibit-19, Filed on Jul. 29, 2022—Cited in IPR2022-00242, challenging U.S. Pat. No. 8,111,839.
Joint Stipulation to Modify Due Dates 1-3, Exhibit-10, Filed on Oct. 25, 2024—Cited in IPR2024-00559, challenging U.S. Pat. No. 11,610,587.
Joint Stipulation to Modify Due Dates 1-3, Exhibit-12, Filed on Nov. 22, 2024—Cited in IPR2024-00559, challenging U.S. Pat. No. 11,610,587.
Joint Stipulation to Modify Scheduling Order, Exhibit-14, Filed on Mar. 14, 2023—Cited in IPR2022-01106, challenging U.S. Pat. No. 11,039,259.
Joint Stipulation to Modify the Scheduling Order, Exhibit-16, Filed on Aug. 16, 2022—Cited in IPR2022-00253, challenging U.S. Pat. No. 9,491,542.
Joint Stipulation to Modify the Scheduling Order, Exhibit-16, Filed on Aug. 16, 2022—Cited in IPR2022-00281, challenging U.S. Pat. No. 9,270,244.
Joint Stipulation to Modify the Scheduling Order, Exhibit-16, Filed on Aug. 16, 2022—Cited in IPR2022-00302, challenging U.S. Pat. No. 9,609,424.
Joint Stipulation to Modify the Scheduling Order, Exhibit-19, Filed on Aug. 16, 2022—Cited in IPR2022-00324, challenging U.S. Pat. No. 8,254,591.
Kleinschmidt Declaration in Support of Patent Owner Response, Exhibit-2018, Filed on Apr. 10, 2023—Cited in IPR2022-01106, challenging U.S. Pat. No. 11,039,259.
LEAP Practitioner Request and Verification Form (Patent Owner), Exhibit-29, Filed on Feb. 28, 2023—Cited in IPR2022-00243, challenging U.S. Pat. No. 8,111,839.
LEAP Practitioner Request and Verification Form (Patent Owner), Exhibit-30, Filed on Feb. 28, 2023—Cited in IPR2022-00242, challenging U.S. Pat. No. 8,111,839.
LEAP Practitioner Request and Verification Form (Petitioner), Exhibit-30, Filed on Mar. 13, 2023—Cited in IPR2022-00243, challenging U.S. Pat. No. 8,111,839.
LEAP Practitioner Request and Verification Form (Petitioner), Exhibit-31, Filed on Mar. 13, 2023—Cited in IPR2022-00242, challenging U.S. Pat. No. 8,111,839.
Letter from Petitioners' Counsel to PO's Counsel Apr. 20, 2022, Exhibit-2004, Filed on May 18, 2022—Cited in IPR2022-00369, challenging U.S. Pat. No. 10,405,082.
Letter from Petitioners' Counsel to PO's Counsel Apr. 20, 2022, Exhibit-2004, Filed on May 18, 2022—Cited in IPR2022-00388, challenging U.S. Pat. No. 10,966,015.

(56) References Cited

OTHER PUBLICATIONS

Letter from Petitioners' Counsel to PO's Counsel Apr. 20, 2022, Exhibit-2004, Filed on May 18, 2022—Cited in IPR2022-00410, challenging U.S. Pat. No. 10,979,836.
Markman Hearing Transcript (excerpts), Exhibit-2022, Filed on Oct. 19, 2023—Cited in IPR2022-01106, challenging U.S. Pat. No. 11,039,259.
Mauer, Embedded Indexing, Exhibit-2008, Filed on Sep. 13, 2022—Cited in IPR2022-00242, challenging U.S. Pat. No. 8,111,839.
Mauer, Embedded Indexing: Pros and Cons for the Indexer; Exhibit-2008, Filed on Sep. 9, 2022—Cited in IPR2022-00234, challenging U.S. Pat. No. 9,124,982.
McGraw-Hill Dictionary of Scientific and Technical Terms, Exhibit-2010, Filed on Sep. 13, 2022—Cited in IPR2022-00242, challenging U.S. Pat. No. 8,111,839.
McGraw-Hill Dictionary of Scientific and Technical Terms; Exhibit-2009, Filed on Sep. 9, 2022—Cited in IPR2022-00234, challenging U.S. Pat. No. 9,124,982.
Merriam-Webster's Collegiate Dictionary (excerpt), Exhibit-2010, Filed on Oct. 11, 2022—Cited in IPR2022-01106, challenging U.S. Pat. No. 11,039,259.
Montgomery Declaration with Exhibit A, Exhibit-1018, Filed on Jan. 14, 2022—Cited in IPR2022-00410, challenging U.S. Pat. No. 10,979,836.
Motion for Leave to File Corrected Petition, Exhibit-10, Filed on Jan. 31, 2022—Cited in IPR2022-00242, challenging U.S. Pat. No. 8,111,839.
Motion: Motion to dismiss due to settlement (pre-DI), Exhibit-13, Filed on Dec. 9, 2024—Cited in IPR2024-01003, challenging U.S. Pat. No. 9,191,083.
Motion: Motion to dismiss due to settlement (pre-DI), Exhibit-13, Filed on Dec. 9, 2024—Cited in IPR2024-01004, challenging U.S. Pat. No. 9,614,943.
Motion: Motion to dismiss due to settlement (pre-DI), Exhibit-13, Filed on Dec. 9, 2024—Cited in IPR2024-01031, challenging U.S. Pat. No. 7,049,850.
Motion: Motion to dismiss due to settlement (pre-DI), Exhibit-14, Filed on Dec. 9, 2024—Cited in IPR2024-01034, challenging U.S. Pat. No. 9,279,263.
Motion: Motion to dismiss due to settlement (pre-DI)Paper12,Dec. 9, 2024—Cited in IPR2024-01033, challenging U.S. Pat. No. 8,434,966.
Notice : Mandatory Notice, Exhibit-5, Filed on Jul. 16, 2024—Cited in IPR2024-01031, challenging U.S. Pat. No. 7,049,850.
Notice : Mandatory Notice, Exhibit-6, Filed on Jul. 16, 2024—Cited in IPR2024-01034, challenging U.S. Pat. No. 9,279,263.
Notice : Mandatory Notice, Exhibit-7, Filed on Mar. 1, 2024—Cited in IPR2024-00559, challenging U.S. Pat. No. 11,610,587.
Notice : Other—Notice of Ranking, Exhibit-4, Filed on Jul. 1, 2024—Cited in IPR2024-01034, challenging U.S. Pat. No. 9,279,263.
Notice : Power of Attorney for Harman International Industries, Exhibit-3, Filed on Feb. 9, 2024—Cited in IPR2024-00559, challenging U.S. Pat. No. 11,610,587.
Notice : Power of Attorney for Harman International Industries, Inc., Exhibit-3, Filed on Jun. 25, 2024—Cited in IPR2024-01031, challenging U.S. Pat. No. 7,049,850.
Notice : Power of Attorney for Harman International Industries, Inc., Exhibit-3, Filed on Jul. 1, 2024—Cited in IPR2024-01034, challenging U.S. Pat. No. 9,279,263.
Notice : Power of Attorney for Samsung Electronics America, Exhibit-2, Filed on Feb. 9, 2024—Cited in IPR2024-00559, challenging U.S. Pat. No. 11,610,587.
Notice : Power of Attorney for Samsung Electronics America, Inc., Exhibit-2, Filed on Jun. 12, 2024—Cited in IPR2024-01003, challenging U.S. Pat. No. 9,191,083.
Notice : Power of Attorney for Samsung Electronics America, Inc., Exhibit-2, Filed on Jun. 12, 2024—Cited in IPR2024-01004, challenging U.S. Pat. No. 9,614,943.
Notice : Power of Attorney for Samsung Electronics America, Inc., Exhibit-2, Filed on Jun. 25, 2024—Cited in IPR2024-01031, challenging U.S. Pat. No. 7,049,850.
Notice : Power of Attorney for Samsung Electronics America, Inc., Exhibit-2, Filed on Jul. 1, 2024—Cited in IPR2024-01034, challenging U.S. Pat. No. 9,279,263.
Notice : Power of Attorney for Samsung Electronics America, Inc.Paper2,Jun. 18, 2024—Cited in IPR2024-01033, challenging U.S. Pat. No. 8,434,966.
Notice : Power of Attorney for Samsung Electronics Co., Ltd., Exhibit-1, Filed on Feb. 9, 2024—Cited in IPR2024-00559, challenging U.S. Pat. No. 11,610,587.
Notice : Power of Attorney for Samsung Electronics Co., Ltd., Exhibit-1, Filed on Jun. 12, 2024—Cited in IPR2024-01003, challenging U.S. Pat. No. 9,191,083.
Notice : Power of Attorney for Samsung Electronics Co., Ltd., Exhibit-1, Filed on Jun. 12, 2024—Cited in IPR2024-01004, challenging U.S. Pat. No. 9,614,943.
Notice : Power of Attorney for Samsung Electronics Co., Ltd., Exhibit-1, Filed on Jul. 1, 2024—Cited in IPR2024-01034, challenging U.S. Pat. No. 9,279,263.
Notice : Power of Attorney for Samsung Electronics Co., Ltd. Paper1,Jun. 18, 2024—Cited in IPR2024-01033, challenging U.S. Pat. No. 8,434,966.
Notice : Power of Attorney for Samsung Electronics Corp., Exhibit-1, Filed on Jun. 25, 2024—Cited in IPR2024-01031, challenging U.S. Pat. No. 7,049,850.
Notice : Power of Attorney, Exhibit-6, Filed on Mar. 1, 2024—Cited in IPR2024-00559, challenging U.S. Pat. No. 11,610,587.
Notice : Power of Attorney, Exhibit-6, Filed on Jul. 16, 2024—Cited in IPR2024-01031, challenging U.S. Pat. No. 7,049,850.
Notice : Power of Attorney, Exhibit-7, Filed on Jul. 16, 2024—Cited in IPR2024-01034, challenging U.S. Pat. No. 9,279,263.
Notice of Deposition of Chris Kyriakakis, Ph.D., Exhibit-17, Filed on Sep. 13, 2022—Cited in IPR2022-00302, challenging U.S. Pat. No. 9,609,424.
Notice of Deposition of Daniel P Anagnos, Exhibit-21, Filed on Dec. 14, 2022—Cited in IPR2022-00324, challenging U.S. Pat. No. 8,254,591.
Notice of Deposition of David Kleinschmidt, Exhibit-20, Filed on Dec. 2, 2022—Cited in IPR2022-00253, challenging U.S. Pat. No. 9,491,542.
Notice of Deposition of David Kleinschmidt, Exhibit-20, Filed on Dec. 2, 2022—Cited in IPR2022-00281, challenging U.S. Pat. No. 9,270,244.
Notice of Deposition of Les E. Atlas, Ph.D., Exhibit-13, Filed on Mar. 9, 2023—Cited in IPR2022-01106, challenging U.S. Pat. No. 11,039,259.
Notice of Deposition of Les E. Atlas, Ph.D., Exhibit-17, Filed on Aug. 8, 2022—Cited in IPR2022-00324, challenging U.S. Pat. No. 8,254,591.
Notice of Deposition of Les E. Atlas, Ph.D., Exhibit-19, Filed on Aug. 4, 2022—Cited in IPR2022-00243, challenging U.S. Pat. No. 8,111,839.
Notice of Deposition of Les E. Atlas, Ph.D., Exhibit-20, Filed on Aug. 4, 2022—Cited in IPR2022-00242, challenging U.S. Pat. No. 8,111,839.
Notice of Deposition of Les E. Atlas, Ph.D.; Exhibit-15, Filed on Aug. 4, 2022—Cited in IPR2022-00234, challenging U.S. Pat. No. 9,124,982.
Notice of Deposition of Marshall Buck, Exhibit-19, Filed on Dec. 16, 2022—Cited in IPR2022-00388, challenging U.S. Pat. No. 10,966,015.
Notice of Deposition of Marshall Buck, Exhibit-20, Filed on Dec. 16, 2022—Cited in IPR2022-00369, challenging U.S. Pat. No. 10,405,082.
Notice of Deposition of Nathaniel Polish, Ph.D., Exhibit-18, Filed on Sep. 13, 2022—Cited in IPR2022-00253, challenging U.S. Pat. No. 9,491,542.
Notice of Deposition of Nathaniel Polish, Ph.D., Exhibit-18, Filed on Sep. 13, 2022—Cited in IPR2022-00281, challenging U.S. Pat. No. 9,270,244.
Notice of Deposition of Richard M. Stern, Ph.D., Exhibit-13, Filed on Feb. 28, 2023—Cited in IPR2022-01078, challenging U.S. Pat. No. 11,057,701.

(56) References Cited

OTHER PUBLICATIONS

Notice of Deposition of Richard M. Stern, Ph.D., Exhibit-14, Filed on Aug. 5, 2022—Cited in IPR2022-00282, challenging U.S. Pat. No. 8,315,400.
Notice of Deposition of Richard M. Stern, Ph.D., Exhibit-17, Filed on Oct. 14, 2022—Cited in IPR2022-00388, challenging U.S. Pat. No. 10,966,015.
Notice of Deposition of Richard M. Stern, Ph.D., Exhibit-18, Filed on Oct. 14, 2022—Cited in IPR2022-00369, challenging U.S. Pat. No. 10,405,082.
Notice of Filing Date Accorded to Petition, Exhibit-5, Filed on Dec. 23, 2021—Cited in IPR2022-00242, challenging U.S. Pat. No. 8,111,839.
Notice of Filing Date Accorded to Petition, Exhibit-5, Filed on Dec. 23, 2021—Cited in IPR2022-00243, challenging U.S. Pat. No. 8,111,839.
Notice of Ranking, Exhibit-4, Filed on Dec. 13, 2021—Cited in IPR2022-00242, challenging U.S. Pat. No. 8,111,839.
Notice of Ranking, Exhibit-4, Filed on Dec. 13, 2021—Cited in IPR2022-00243, challenging U.S. Pat. No. 8,111,839.
Notice of Ranking, Exhibit-4, Filed on Jun. 12, 2024—Cited in IPR2024-01003, challenging U.S. Pat. No. 9,191,083.
Notice of Ranking, Exhibit-4, Filed on Jun. 12, 2024—Cited in IPR2024-01004, challenging U.S. Pat. No. 9,614,943.
Notice Regarding Transcript of Markman Hearing, Exhibit-29, Filed on Oct. 19, 2023—Cited in IPR2022-01106, challenging U.S. Pat. No. 11,039,259.
Notice: Notice filing date accorded, Exhibit-5, Filed on Dec. 21, 2021—Cited in IPR2022-00282, challenging U.S. Pat. No. 8,315,400.
Notice: Notice filing date accorded, Exhibit-5, Filed on Feb. 27, 2024—Cited in IPR2024-00559, challenging U.S. Pat. No. 11,610,587.
Notice: Notice filing date accorded, Exhibit-5, Filed on Jun. 17, 2024—Cited in IPR2024-01003, challenging U.S. Pat. No. 9,191,083.
Notice: Notice filing date accorded, Exhibit-5, Filed on Jun. 18, 2024—Cited in IPR2024-01004, challenging U.S. Pat. No. 9,614,943.
Notice: Notice filing date accorded, Exhibit-6, Filed on Jan. 13, 2022—Cited in IPR2022-00302, challenging U.S. Pat. No. 9,609,424.
Notice: Notice filing date accorded, Exhibit-6, Filed on Jan. 13, 2022—Cited in IPR2022-00324, challenging U.S. Pat. No. 8,254,591.
Notice: Notice filing date accorded, Exhibit-6, Filed on Jan. 18, 2022—Cited in IPR2022-00253, challenging U.S. Pat. No. 9,491,542.
Notice: Notice filing date accorded, Exhibit-6, Filed on Jan. 18, 2022—Cited in IPR2022-00281, challenging U.S. Pat. No. 9,270,244.
Notice: Notice filing date accorded, Exhibit-6, Filed on Feb. 18, 2022—Cited in IPR2022-00410, challenging U.S. Pat. No. 10,979,836.
Notice: Notice filing date accorded, Exhibit-6, Filed on Jul. 7, 2022—Cited in IPR2022-01078, challenging U.S. Pat. No. 11,057,701.
Notice: Notice filing date accorded, Exhibit-6, Filed on Jul. 7, 2022—Cited in IPR2022-01099, challenging U.S. Pat. No. 11,244,666.
Notice: Notice filing date accorded, Exhibit-6, Filed on Jul. 8, 2022—Cited in IPR2022-01106, challenging U.S. Pat. No. 11,039,259.
Notice: Notice filing date accorded, Exhibit-7, Filed on Feb. 18, 2022—Cited in IPR2022-00388, challenging U.S. Pat. No. 10,966,015.
Notice: Notice filing date accorded, Exhibit-7, Filed on Jul. 7, 2022—Cited in IPR2022-01098, challenging U.S. Pat. No. 11,217,237.
Notice: Notice filing date accorded, Exhibit-8, Filed on Feb. 18, 2022—Cited in IPR2022-00369, challenging U.S. Pat. No. 10,405,082.
Notice: Notice filing date accorded, Exhibit-8, Filed on Jul. 24, 2024—Cited in IPR2024-01031, challenging U.S. Pat. No. 7,049,850.
Notice: Notice filing date accorded, Exhibit-9, Filed on Aug. 16, 2024—Cited in IPR2024-01034, challenging U.S. Pat. No. 9,279,263.
Notice: Notice filing date accorded; Exhibit-4, Filed on Dec. 21, 2021—Cited in IPR2022-00234, challenging U.S. Pat. No. 9,124,982.
Notice: Notice filing date accordedPaper4,Jun. 20, 2024—Cited in IPR2024-01033, challenging U.S. Pat. No. 8,434,966.
Notice: refund approved, Exhibit-13, Filed on Mar. 7, 2023—Cited in IPR2022-01099, challenging U.S. Pat. No. 11,244,666.
Notice: refund approved, Exhibit-14, Filed on Jan. 20, 2023—Cited in IPR2022-00410, challenging U.S. Pat. No. 10,979,836.
Notice: refund approved, Exhibit-14, Filed on Mar. 7, 2023—Cited in IPR2022-01098, challenging U.S. Pat. No. 11,217,237.
Notice: refund approved, Exhibit-18, Filed on Dec. 17, 2024—Cited in IPR2024-01003, challenging U.S. Pat. No. 9,191,083.
Notice: refund approved, Exhibit-18, Filed on Dec. 17, 2024—Cited in IPR2024-01004, challenging U.S. Pat. No. 9,614,943.
Notice: refund approved, Exhibit-18, Filed on Dec. 17, 2024—Cited in IPR2024-01031, challenging U.S. Pat. No. 7,049,850.
Notice: refund approved, Exhibit-19, Filed on Dec. 17, 2024—Cited in IPR2024-01034, challenging U.S. Pat. No. 9,279,263.
Notice: refund approvedPaper17,Dec. 17, 2024—Cited in IPR2024-01033, challenging U.S. Pat. No. 8,434,966.
Olwal 2005, Exhibit-1023, Filed on Dec. 21, 2021—Cited in IPR2022-00281, challenging U.S. Pat. No. 9,270,244.
Order Adopting Claim Construction Order, Exhibit-2015, Filed on Apr. 10, 2023—Cited in IPR2022-01106, challenging U.S. Pat. No. 11,039,259.
Order Clarifying Claim Construction Order, Exhibit-2014, Filed on Apr. 10, 2023—Cited in IPR2022-01106, challenging U.S. Pat. No. 11,039,259.
Order Conditionally Granting Patent Owner's Motion to Withdraw and Substitute Counsel 37 C.F.R. § 42.10, Exhibit-12, Filed on Dec. 9, 2024—Cited in IPR2024-01003, challenging U.S. Pat. No. 9,191,083.
Order Conditionally Granting Patent Owner's Motion to Withdraw and Substitute Counsel 37 C.F.R. § 42.10, Exhibit-12, Filed on Dec. 9, 2024—Cited in IPR2024-01004, challenging U.S. Pat. No. 9,614,943.
Order Conditionally Granting Patent Owner's Motion to Withdraw and Substitute Counsel 37 C.F.R. § 42.10, Exhibit-12, Filed on Dec. 9, 2024—Cited in IPR2024-01031, challenging U.S. Pat. No. 7,049,850.
Order Conditionally Granting Patent Owner's Motion to Withdraw and Substitute Counsel 37 C.F.R. § 42.10, Exhibit-13, Filed on Dec. 9, 2024—Cited in IPR2024-01034, challenging U.S. Pat. No. 9,279,263.
Order Conditionally Granting Patent Owner's Motion to Withdraw and Substitute Counsel 37 C.F.R. § 42.10Paper11,Dec. 9, 2024—Cited in IPR2024-01033, challenging U.S. Pat. No. 8,434,966.
Order Conditionally Granting Patent Owner's Motion to Withdraw and Substitute Counsel, Exhibit-13, Filed on Dec. 5, 2024—Cited in IPR2024-00559, challenging U.S. Pat. No. 11,610,587.
Order Granting Patent Owner's Motions for Pro Hac Vice Admission of Roy Falik 37 C.F.R. § 42.10(c), Exhibit-9, Filed on Sep. 23, 2024—Cited in IPR2024-01031, challenging U.S. Pat. No. 7,049,850.
Order Trial Hearing 37 C.F.R. 42.70, Exhibit-23, Filed on Feb. 6, 2023—Cited in IPR2022-00282, challenging U.S. Pat. No. 8,315,400.
Order Trial Hearing 37 C.F.R. 42.70; Exhibit-24, Filed on Feb. 6, 2023—Cited in IPR2022-00234, challenging U.S. Pat. No. 9,124,982.
Order Trial Hearing 37 C.F.R. § 42.70, Exhibit-24, Filed on Mar. 1, 2023—Cited in IPR2022-00302, challenging U.S. Pat. No. 9,609,424.
Order Trial Hearing 37 C.F.R. § 42.70, Exhibit-26, Filed on Oct. 10, 2023—Cited in IPR2022-01106, challenging U.S. Pat. No. 11,039,259.
Order Trial Hearing 37 C.F.R. § 42.70, Exhibit-26, Filed on Mar. 1, 2023—Cited in IPR2022-00324, challenging U.S. Pat. No. 8,254,591.
Order Trial Hearing 37 C.F.R. sec 42.70, Exhibit-28, Filed on Feb. 8, 2023—Cited in IPR2022-00243, challenging U.S. Pat. No. 8,111,839.
Order Trial Hearing 37 C.F.R. sec 42.70, Exhibit-29, Filed on Feb. 8, 2023—Cited in IPR2022-00242, challenging U.S. Pat. No. 8,111,839.
Order Trial Hearing, Exhibit-25, Filed on Mar. 1, 2023—Cited in IPR2022-00281, challenging U.S. Pat. No. 9,270,244.
Order Vacating Standing Orders, Exhibit-2005, Filed on Jul. 1, 2022—Cited in IPR2022-00253, challenging U.S. Pat. No. 9,491,542.
Order Vacating Standing Orders, Exhibit-2005, Filed on Jul. 1, 2022—Cited in IPR2022-00281, challenging U.S. Pat. No. 9,270,244.
Order Vacating Standing Orders, Exhibit-2005, Filed on Jul. 1, 2022—Cited in IPR2022-00302, challenging U.S. Pat. No. 9,609,424.
Order Vacating Standing Orders, Exhibit-2005, Filed on Jul. 1, 2022—Cited in IPR2022-00324, challenging U.S. Pat. No. 8,254,591.
Order Vacating Standing Orders, Exhibit-2006, Filed on Jul. 1, 2022—Cited in IPR2022-00369, challenging U.S. Pat. No. 10,405,082.
Order Vacating Standing Orders, Exhibit-2006, Filed on Jul. 1, 2022—Cited in IPR2022-00410, challenging U.S. Pat. No. 10,979,836.
Order Vacating Standing Orders, Exhibit-2007, Filed on Jul. 1, 2022—Cited in IPR2022-00388, challenging U.S. Pat. No. 10,966,015.

(56) References Cited

OTHER PUBLICATIONS

Order: Conduct of the Proceeding 37 C.F.R. sec. 42.5, Exhibit-18, Filed on Jan. 5, 2023—Cited in IPR2022-00282, challenging U.S. Pat. No. 8,315,400.
Order: Granting Patent Owner's Motion for Pro Hac Vice Admission of Roy Falik 37 C.F.R. § 42.10, Exhibit-10, Filed on Oct. 4, 2024—Cited in IPR2024-01034, challenging U.S. Pat. No. 9,279,263.
Order: Granting Patent Owner's Motions for Admission Pro Hac Vice of Roy Falik 37 C.F.R. § 42.10, Exhibit-9, Filed on Oct. 4, 2024—Cited in IPR2024-01004, challenging U.S. Pat. No. 9,614,943.
Order: Granting Patent Owner's Motions for Admission Pro Hac Vice of Roy Falik 37 C.F.R. § 42.10Paper8,Oct. 4, 2024—Cited in IPR2024-01033, challenging U.S. Pat. No. 8,434,966.
Order: on Motion, Exhibit-9, Filed on Oct. 4, 2024—Cited in IPR2024-01003, challenging U.S. Pat. No. 9,191,083.
Order: Order Setting Oral Argument 37 C.F.R. § 42.70, Exhibit-22, Filed on Aug. 21, 2023—Cited in IPR2022-01078, challenging U.S. Pat. No. 11,057,701.
Order: Other, Exhibit-12, Filed on Feb. 22, 2023—Cited in IPR2022-01078, challenging U.S. Pat. No. 11,057,701.
Order: Panel Change Order, Exhibit-22, Filed on Feb. 10, 2023—Cited in IPR2022-00253, challenging U.S. Pat. No. 9,491,542.
Order: Scheduling Order, Exhibit-13, Filed on Jun. 17, 2022—Cited in IPR2022-00282, challenging U.S. Pat. No. 8,315,400.
Order: Scheduling Order; Exhibit-13, Filed on Jun. 17, 2022—Cited in IPR2022-00234, challenging U.S. Pat. No. 9,124,982.
Order: Trial Hearing (Revised), Exhibit-27, Filed on Mar. 3, 2023—Cited in IPR2022-00324, challenging U.S. Pat. No. 8,254,591.
Order: Trial Hearing—37 CFR 42.70, Exhibit-26, Filed on Mar. 2, 2023—Cited in IPR2022-00253, challenging U.S. Pat. No. 9,491,542.
Order: Hearing Order, Exhibit-26, Filed on Apr. 7, 2023—Cited in IPR2022-00388, challenging U.S. Pat. No. 10,966,015.
Order: Hearing Order, Exhibit-27, Filed on Apr. 7, 2023—Cited in IPR2022-00369, challenging U.S. Pat. No. 10,405,082.
Order: Trial Hearing (Revised), Exhibit-25, Filed on Mar. 3, 2023—Cited in IPR2022-00302, challenging U.S. Pat. No. 9,609,424.
OSHA, Appx A to 1910.95—Noise Exposure Computation, Exhibit-2014, Filed on Sep. 13, 2022—Cited in IPR2022-00242, challenging U.S. Pat. No. 8,111,839.
OSHA, Appx A to 1910.95—Noise Exposure Computation; Exhibit-2013, Filed on Sep. 9, 2022—Cited in IPR2022-00234, challenging U.S. Pat. No. 9,124,982.
Oshana, Chapters 3-4, Exhibit-1017, Filed on Jan. 14, 2022—Cited in IPR2022-00410, challenging U.S. Pat. No. 10,979,836.
Other: Hearing transcript, Exhibit-25, Filed on Oct. 16, 2023—Cited in IPR2022-01078, challenging U.S. Pat. No. 11,057,701.
Other: Hearing transcript, Exhibit-27, Filed on Apr. 18, 2023—Cited in IPR2022-00282, challenging U.S. Pat. No. 8,315,400.
Other: Hearing transcript, Exhibit-30, Filed on Jul. 25, 2023—Cited in IPR2022-00388, challenging U.S. Pat. No. 10,966,015.
Other: Hearing transcript, Exhibit-31, Filed on Dec. 13, 2023—Cited in IPR2022-01106, challenging U.S. Pat. No. 11,039,259.
Other: Hearing transcript, Exhibit-31, Filed on Jul. 25, 2023—Cited in IPR2022-00369, challenging U.S. Pat. No. 10,405,082.
Other: Hearing transcript, Exhibit-32, Filed on Jul. 3, 2023—Cited in IPR2022-00324, challenging U.S. Pat. No. 8,254,591.
Other: Hearing transcript, Exhibit-32, Filed on Jul. 31, 2023—Cited in IPR2022-00281, challenging U.S. Pat. No. 9,270,244.
Other: Hearing transcript, Exhibit-32, Filed on Jul. 6, 2023—Cited in IPR2022-00253, challenging U.S. Pat. No. 9,491,542.
Other: Hearing transcript, Exhibit-34, Filed on Jun. 1, 2023—Cited in IPR2022-00243, challenging U.S. Pat. No. 8,111,839.
Other: Hearing transcript, Exhibit-34, Filed on Jun. 22, 2023—Cited in IPR2022-00302, challenging U.S. Pat. No. 9,609,424.
Other: Hearing transcript, Exhibit-35, Filed on Jun. 1, 2023—Cited in IPR2022-00242, challenging U.S. Pat. No. 8,111,839.
Other: Hearing transcript, Exhibit-36, Filed on Jul. 6, 2023—Cited in IPR2022-00302, challenging U.S. Pat. No. 9,609,424.
Other: Hearing transcript; Exhibit-28, Filed on Apr. 18, 2023—Cited in IPR2022-00234, challenging U.S. Pat. No. 9,124,982.
Other: Order Granting Motion for Leave to File Corrected Petition , Exhibit-10, Filed on Feb. 2, 2022—Cited in IPR2022-00243, challenging U.S. Pat. No. 8,111,839.
Other: Order Granting Motion for Leave to File Corrected Petition , Exhibit-11, Filed on Feb. 2, 2022—Cited in IPR2022-00242, challenging U.S. Pat. No. 8,111,839.
Other: Fed Circuit mandate, Exhibit-34, Filed on Jun. 27, 2024—Cited in IPR2022-01106, challenging U.S. Pat. No. 11,039,259.
Other: Fed Circuit mandate, Exhibit-36, Filed on Jun. 27, 2024—Cited in IPR2022-00324, challenging U.S. Pat. No. 8,254,591.
Oxford Dictionary of Elecs and Electrical Eng (excerpts), Exhibit-2005, Filed on Mar. 21, 2022—Cited in IPR2022-00282, challenging U.S. Pat. No. 8,315,400.
P.R. 4-5(d) Joint Claim Construction Chart, Exhibit-2009, Filed on Feb. 22, 2023—Cited in IPR2022-00253, challenging U.S. Pat. No. 9,491,542.
P.R. 4-5(d) Joint Claim Construction Chart, Exhibit-2009, Filed on Feb. 22, 2023—Cited in IPR2022-00281, challenging U.S. Pat. No. 9,270,244.
Panel Change Order, Exhibit-12, Filed on Feb. 3, 2023—Cited in IPR2022-01106, challenging U.S. Pat. No. 11,039,259.
Patent Owner Brief Regarding Interim Procedure for Discretionary Denials, Exhibit-12, Filed on Jul. 1, 2022—Cited in IPR2022-00253, challenging U.S. Pat. No. 9,491,542.
Patent Owner Response; Exhibit-17, Filed on Sep. 9, 2022—Cited in IPR2022-00234, challenging U.S. Pat. No. 9,124,982.
Patent Owner Stanton Techiya LLC's Mandatory NoticePaper6,Jul. 3, 2024—Cited in IPR2024-01033, challenging U.S. Pat. No. 8,434,966.
Patent Owner Staton Techiya, LLC's Mandatory Notice, Exhibit-7, Filed on Jul. 3, 2024—Cited in IPR2024-01004, challenging U.S. Pat. No. 9,614,943.
Patent Owner Staton Techiya, LLC's Mandatory Notices, Exhibit-7, Filed on Jul. 3, 2024—Cited in IPR2024-01003, challenging U.S. Pat. No. 9,191,083.
Patent Owner Staton Techiya, LLC's Motion for the Pro Hac Vice Admission of Roy Falik, Exhibit-8, Filed on Jul. 5, 2024—Cited in IPR2024-01003, challenging U.S. Pat. No. 9,191,083.
Patent Owner Staton Techiya, LLC's Motion for the Pro Hac Vice Admission of Roy Falik, Exhibit-8, Filed on Jul. 5, 2024—Cited in IPR2024-01004, challenging U.S. Pat. No. 9,614,943.
Patent Owner Staton Techiya, LLC's Motion for the Pro Hac Vice Admission of Roy FalikPaper7,Jul. 5, 2024—Cited in IPR2024-01033, challenging U.S. Pat. No. 8,434,966.
Patent Owner Staton Techiya, LLC's Power of Attorney, Exhibit-6, Filed on Jul. 3, 2024—Cited in IPR2024-01003, challenging U.S. Pat. No. 9,191,083.
Patent Owner Staton Techiya, LLC's Power of Attorney, Exhibit-6, Filed on Jul. 3, 2024—Cited in IPR2024-01004, challenging U.S. Pat. No. 9,614,943.
Patent Owner Staton Techiya, LLC's Power of AttorneyPaper5,Jul. 3, 2024—Cited in IPR2024-01033, challenging U.S. Pat. No. 8,434,966.
Patent Owner's Brief Regarding Interim Procedure for Discretionary Denials, Exhibit-11, Filed on Jul. 1, 2022—Cited in IPR2022-00410, challenging U.S. Pat. No. 10,979,836.
Patent Owner's Brief Regarding Interim Procedure for Discretionary Denials, Exhibit-12, Filed on Jul. 1, 2022—Cited in IPR2022-00281, challenging U.S. Pat. No. 9,270,244.
Patent Owner's Brief Regarding Interim Procedure for Discretionary Denials, Exhibit-12, Filed on Jul. 1, 2022—Cited in IPR2022-00302, challenging U.S. Pat. No. 9,609,424.
Patent Owner's Brief Regarding Interim Procedure for Discretionary Denials, Exhibit-12, Filed on Jul. 1, 2022—Cited in IPR2022-00324, challenging U.S. Pat. No. 8,254,591.
Patent Owner's Brief Regarding Interim Procedure for Discretionary Denials, Exhibit-12, Filed on Jul. 1, 2022—Cited in IPR2022-00388, challenging U.S. Pat. No. 10,966,015.
Patent Owner's Brief Regarding Interim Procedure for Discretionary Denials, Exhibit-13, Filed on Jul. 1, 2022—Cited in IPR2022-00369, challenging U.S. Pat. No. 10,405,082.
Patent Owner's Corrected Notice of Appeal, Exhibit-38, Filed on Aug. 15, 2023—Cited in IPR2022-00243, challenging U.S. Pat. No. 8,111,839.

(56) References Cited

OTHER PUBLICATIONS

Patent Owner's Demonstratives, Exhibit-2008, Filed on Apr. 11, 2023—Cited in IPR2022-00302, challenging U.S. Pat. No. 9,609,424.
Patent Owner's Demonstratives, Exhibit-2010, Filed on Apr. 12, 2023—Cited in IPR2022-00253, challenging U.S. Pat. No. 9,491,542.
Patent Owner's Demonstratives, Exhibit-2010, Filed on Apr. 13, 2023—Cited in IPR2022-00281, challenging U.S. Pat. No. 9,270,244.
Patent Owner's Demonstratives, Exhibit-2010, Filed on Apr. 4, 2023—Cited in IPR2022-00324, challenging U.S. Pat. No. 8,254,591.
Patent Owner's Demonstratives, Exhibit-2012, Filed on May 9, 2023—Cited in IPR2022-00369, challenging U.S. Pat. No. 10,405,082.
Patent Owner's Demonstratives, Exhibit-2012, Filed on May 9, 2023—Cited in IPR2022-00388, challenging U.S. Pat. No. 10,966,015.
Patent Owner's Demonstratives, Exhibit-2014, Filed on Mar. 14, 2023—Cited in IPR2022-00282, challenging U.S. Pat. No. 8,315,400.
Patent Owner's Demonstratives, Exhibit-2014, Filed on Sep. 25, 2023—Cited in IPR2022-01078, challenging U.S. Pat. No. 11,057,701.
Patent Owner's Demonstratives, Exhibit-2015, Filed on Mar. 16, 2023—Cited in IPR2022-00242, challenging U.S. Pat. No. 8,111,839.
Patent Owner's Demonstratives, Exhibit-2015, Filed on Mar. 16, 2023—Cited in IPR2022-00243, challenging U.S. Pat. No. 8,111,839.
Patent Owner's Demonstratives, Exhibit-2021, Filed on Oct. 11, 2023—Cited in IPR2022-01106, challenging U.S. Pat. No. 11,039,259.
Patent Owner's Demonstratives; Exhibit-2014, Filed on Mar. 14, 2023—Cited in IPR2022-00234, challenging U.S. Pat. No. 9,124,982.
Patent Owner's Mandatory Notice under 37 C.F.R. 42.8, Exhibit-5, Filed on Jan. 19, 2022—Cited in IPR2022-00388, challenging U.S. Pat. No. 10,966,015.
Patent Owner's Mandatory Notice under 37 C.F.R. 42.8, Exhibit-5, Filed on Jan. 19, 2022—Cited in IPR2022-00410, challenging U.S. Pat. No. 10,979,836.
Patent Owner's Mandatory Notice under 37 C.F.R. 42.8, Exhibit-5, Filed on Dec. 28, 2021—Cited in IPR2022-00253, challenging U.S. Pat. No. 9,491,542.
Patent Owner's Mandatory Notice under 37 C.F.R. 42.8, Exhibit-5, Filed on Dec. 28, 2021—Cited in IPR2022-00281, challenging U.S. Pat. No. 9,270,244.
Patent Owner's Mandatory Notice under 37 C.F.R. 42.8, Exhibit-5, Filed on Dec. 28, 2021—Cited in IPR2022-00302, challenging U.S. Pat. No. 9,609,424.
Patent Owner's Mandatory Notice under 37 C.F.R. 42.8, Exhibit-5, Filed on Dec. 28, 2021—Cited in IPR2022-00324, challenging U.S. Pat. No. 8,254,591.
Patent Owner's Mandatory Notice under 37 C.F.R. 42.8, Exhibit-5, Filed on Jun. 22, 2022—Cited in IPR2022-01078, challenging U.S. Pat. No. 11,057,701.
Patent Owner's Mandatory Notice under 37 C.F.R. 42.8, Exhibit-5, Filed on Jun. 22, 2022—Cited in IPR2022-01099, challenging U.S. Pat. No. 11,244,666.
Patent Owner's Mandatory Notice under 37 C.F.R. 42.8, Exhibit-5, Filed on Jun. 22, 2022—Cited in IPR2022-01106, challenging U.S. Pat. No. 11,039,259.
Patent Owner's Mandatory Notice under 37 C.F.R. 42.8, Exhibit-6, Filed on Jun. 22, 2022—Cited in IPR2022-01098, challenging U.S. Pat. No. 11,217,237.
Patent Owner's Mandatory Notice under 37 C.F.R. 42.8, Exhibit-7, Filed on Dec. 28, 2021—Cited in IPR2022-00242, challenging U.S. Pat. No. 8,111,839.
Patent Owner's Mandatory Notice under 37 C.F.R. 42.8, Exhibit-7, Filed on Dec. 28, 2021—Cited in IPR2022-00243, challenging U.S. Pat. No. 8,111,839.
Patent Owner's Mandatory Notice under 37 C.F.R. 42.8, Exhibit-7, Filed on Dec. 28, 2021—Cited in IPR2022-00282, challenging U.S. Pat. No. 8,315,400.
Patent Owner's Mandatory Notice under 37 C.F.R. 42.8; Exhibit-6, Filed on Dec. 28, 2021—Cited in IPR2022-00234, challenging U.S. Pat. No. 9,124,982.
Patent Owner's Mandatory Notice under 37 CFR 42.8, Exhibit-6, Filed on Jan. 19, 2022—Cited in IPR2022-00369, challenging U.S. Pat. No. 10,405,082.
Patent Owner's Notice of Appeal, Exhibit-30, Filed on Aug. 11, 2023—Cited in IPR2022-00282, challenging U.S. Pat. No. 8,315,400.
Patent Owner's Notice of Appeal, Exhibit-33, Filed on Mar. 5, 2024—Cited in IPR2022-01106, challenging U.S. Pat. No. 11,039,259.
Patent Owner's Notice of Appeal, Exhibit-33, Filed on Sep. 8, 2023—Cited in IPR2022-00281, challenging U.S. Pat. No. 9,270,244.
Patent Owner's Notice of Appeal, Exhibit-34, Filed on Sep. 8, 2023—Cited in IPR2022-00253, challenging U.S. Pat. No. 9,491,542.
Patent Owner's Notice of Appeal, Exhibit-34, Filed on Sep. 8, 2023—Cited in IPR2022-00324, challenging U.S. Pat. No. 8,254,591.
Patent Owner's Notice of Appeal, Exhibit-38, Filed on Aug. 15, 2023—Cited in IPR2022-00242, challenging U.S. Pat. No. 8,111,839.
Patent Owner's Notice of Appeal; Exhibit-31, Filed on Aug. 11, 2023—Cited in IPR2022-00234, challenging U.S. Pat. No. 9,124,982.
Patent Owner's Notice of Cross-Appeal, Exhibit-39, Filed on Aug. 23, 2023—Cited in IPR2022-00302, challenging U.S. Pat. No. 9,609,424.
Patent Owner's Power of Attorney, Exhibit-4, Filed on Jan. 19, 2022—Cited in IPR2022-00388, challenging U.S. Pat. No. 10,966,015.
Patent Owner's Power of Attorney, Exhibit-4, Filed on Jan. 19, 2022—Cited in IPR2022-00410, challenging U.S. Pat. No. 10,979,836.
Patent Owner's Power of Attorney, Exhibit-4, Filed on Dec. 28, 2021—Cited in IPR2022-00253, challenging U.S. Pat. No. 9,491,542.
Patent Owner's Power of Attorney, Exhibit-4, Filed on Dec. 28, 2021—Cited in IPR2022-00281, challenging U.S. Pat. No. 9,270,244.
Patent Owner's Power of Attorney, Exhibit-4, Filed on Dec. 28, 2021—Cited in IPR2022-00302, challenging U.S. Pat. No. 9,609,424.
Patent Owner's Power of Attorney, Exhibit-4, Filed on Dec. 28, 2021—Cited in IPR2022-00324, challenging U.S. Pat. No. 8,254,591.
Patent Owner's Power of Attorney, Exhibit-4, Filed on Jun. 22, 2022—Cited in IPR2022-01078, challenging U.S. Pat. No. 11,057,701.
Patent Owner's Power of Attorney, Exhibit-4, Filed on Jun. 22, 2022—Cited in IPR2022-01099, challenging U.S. Pat. No. 11,244,666.
Patent Owner's Power of Attorney, Exhibit-4, Filed on Jun. 22, 2022—Cited in IPR2022-01106, challenging U.S. Pat. No. 11,039,259.
Patent Owner's Power of Attorney, Exhibit-5, Filed on Jan. 19, 2022—Cited in IPR2022-00369, challenging U.S. Pat. No. 10,405,082.
Patent Owner's Power of Attorney, Exhibit-5, Filed on Jun. 22, 2022—Cited in IPR2022-01098, challenging U.S. Pat. No. 11,217,237.
Patent Owner's Power of Attorney, Exhibit-6, Filed on Dec. 28, 2021—Cited in IPR2022-00242, challenging U.S. Pat. No. 8,111,839.
Patent Owner's Power of Attorney, Exhibit-6, Filed on Dec. 28, 2021—Cited in IPR2022-00243, challenging U.S. Pat. No. 8,111,839.
Patent Owner's Power of Attorney, Exhibit-6, Filed on Dec. 28, 2021—Cited in IPR2022-00282, challenging U.S. Pat. No. 8,315,400.
Patent Owner's Power of Attorney; Exhibit-5, Filed on Dec. 28, 2021—Cited in IPR2022-00234, challenging U.S. Pat. No. 9,124,982.
Patent Owner's Preliminary Response, Exhibit-12, Filed on Mar. 23, 2022—Cited in IPR2022-00243, challenging U.S. Pat. No. 8,111,839.
Patent Owner's Preliminary Response, Exhibit-13, Filed on Mar. 23, 2022—Cited in IPR2022-00242, challenging U.S. Pat. No. 8,111,839.
Patent Owner's Preliminary Response, Exhibit-7, Filed on Oct. 11, 2022—Cited in IPR2022-01106, challenging U.S. Pat. No. 11,039,259.
Patent Owner's Preliminary Response, Exhibit-7, Filed on Oct. 7, 2022—Cited in IPR2022-01078, challenging U.S. Pat. No. 11,057,701.
Patent Owner's Preliminary Response, Exhibit-7, Filed on Oct. 7, 2022—Cited in IPR2022-01099, challenging U.S. Pat. No. 11,244,666.
Patent Owner's Preliminary Response, Exhibit-7, Filed on May 18, 2022—Cited in IPR2022-00410, challenging U.S. Pat. No. 10,979,836.
Patent Owner's Preliminary Response, Exhibit-8, Filed on Oct. 7, 2022—Cited in IPR2022-01098, challenging U.S. Pat. No. 11,217,237.
Patent Owner's Preliminary Response, Exhibit-8, Filed on Apr. 13, 2022—Cited in IPR2022-00302, challenging U.S. Pat. No. 9,609,424.
Patent Owner's Preliminary Response, Exhibit-8, Filed on Apr. 13, 2022—Cited in IPR2022-00324, challenging U.S. Pat. No. 8,254,591.
Patent Owner's Preliminary Response, Exhibit-8, Filed on Apr. 18, 2022—Cited in IPR2022-00253, challenging U.S. Pat. No. 9,491,542.
Patent Owner's Preliminary Response, Exhibit-8, Filed on Apr. 18, 2022—Cited in IPR2022-00281, challenging U.S. Pat. No. 9,270,244.
Patent Owner's Preliminary Response, Exhibit-8, Filed on May 18, 2022—Cited in IPR2022-00388, challenging U.S. Pat. No. 10,966,015.

(56) References Cited

OTHER PUBLICATIONS

Patent Owner's Preliminary Response, Exhibit-9, Filed on Mar. 21, 2022—Cited in IPR2022-00282, challenging U.S. Pat. No. 8,315,400.
Patent Owner's Preliminary Response, Exhibit-9, Filed on May 18, 2022—Cited in IPR2022-00369, challenging U.S. Pat. No. 10,405,082.
Patent Owner's Preliminary Response; Exhibit-9, Filed on Mar. 21, 2022—Cited in IPR2022-00234, challenging U.S. Pat. No. 9,124,982.
Patent Owner's Preliminary Sur-Reply, Exhibit-10, Filed on Nov. 22, 2022—Cited in IPR2022-01098, challenging U.S. Pat. No. 11,217,237.
Patent Owner's Preliminary Sur-Reply, Exhibit-10, Filed on May 19, 2022—Cited in IPR2022-00302, challenging U.S. Pat. No. 9,609,424.
Patent Owner's Preliminary Sur-Reply, Exhibit-10, Filed on May 20, 2022—Cited in IPR2022-00324, challenging U.S. Pat. No. 8,254,591.
Patent Owner's Preliminary Sur-Reply, Exhibit-10, Filed on May 31, 2022—Cited in IPR2022-00253, challenging U.S. Pat. No. 9,491,542.
Patent Owner's Preliminary Sur-Reply, Exhibit-10, Filed on Jun. 23, 2022—Cited in IPR2022-00388, challenging U.S. Pat. No. 10,966,015.
Patent Owner's Preliminary Sur-Reply, Exhibit-10, Filed on Jun. 7, 2022—Cited in IPR2022-00281, challenging U.S. Pat. No. 9,270,244.
Patent Owner's Preliminary Sur-Reply, Exhibit-11, Filed on Apr. 29, 2022—Cited in IPR2022-00282, challenging U.S. Pat. No. 8,315,400.
Patent Owner's Preliminary Sur-Reply, Exhibit-11, Filed on Jun. 23, 2022—Cited in IPR2022-00369, challenging U.S. Pat. No. 10,405,082.
Patent Owner's Preliminary Sur-Reply, Exhibit-14, Filed on Apr. 29, 2022—Cited in IPR2022-00243, challenging U.S. Pat. No. 8,111,839.
Patent Owner's Preliminary Sur-Reply, Exhibit-15, Filed on Apr. 29, 2022—Cited in IPR2022-00242, challenging U.S. Pat. No. 8,111,839.
Patent Owner's Preliminary Sur-Reply, Exhibit-9, Filed on Nov. 17, 2022—Cited in IPR2022-01099, challenging U.S. Pat. No. 11,244,666.
Patent Owner's Preliminary Sur-Reply, Exhibit-9, Filed on Nov. 18, 2022—Cited in IPR2022-01078, challenging U.S. Pat. No. 11,057,701.
Patent Owner's Preliminary Sur-Reply, Exhibit-9, Filed on Nov. 18, 2022—Cited in IPR2022-01106, challenging U.S. Pat. No. 11,039,259.
Patent Owner's Preliminary Sur-Reply, Exhibit-9, Filed on Jun. 23, 2022—Cited in IPR2022-00410, challenging U.S. Pat. No. 10,979,836.
Patent Owner's Preliminary Sur-Reply; Exhibit-11, Filed on Apr. 29, 2022—Cited in IPR2022-00234, challenging U.S. Pat. No. 9,124,982.
Patent Owner's Request for Oral Argument, Exhibit-21, Filed on Feb. 3, 2023—Cited in IPR2022-00282, challenging U.S. Pat. No. 8,315,400.
Patent Owner's Request for Oral Argument, Exhibit-21, Filed on Aug. 17, 2023—Cited in IPR2022-01078, challenging U.S. Pat. No. 11,057,701.
Patent Owner's Request for Oral Argument, Exhibit-22, Filed on Feb. 28, 2023—Cited in IPR2022-00302, challenging U.S. Pat. No. 9,609,424.
Patent Owner's Request for Oral Argument, Exhibit-23, Filed on Mar. 1, 2023—Cited in IPR2022-00281, challenging U.S. Pat. No. 9,270,244.
Patent Owner's Request for Oral Argument, Exhibit-24, Filed on Feb. 28, 2023—Cited in IPR2022-00324, challenging U.S. Pat. No. 8,254,591.
Patent Owner's Request for Oral Argument, Exhibit-24, Filed on Mar. 1, 2023—Cited in IPR2022-00253, challenging U.S. Pat. No. 9,491,542.
Patent Owner's Request for Oral Argument, Exhibit-24, Filed on Apr. 4, 2023—Cited in IPR2022-00388, challenging U.S. Pat. No. 10,966,015.
Patent Owner's Request for Oral Argument, Exhibit-25, Filed on Apr. 4, 2023—Cited in IPR2022-00369, challenging U.S. Pat. No. 10,405,082.
Patent Owner's Request for Oral Argument, Exhibit-25, Filed on Aug. 28, 2023—Cited in IPR2022-01106, challenging U.S. Pat. No. 11,039,259.
Patent Owner's Request for Oral Argument, Exhibit-26, Filed on Feb. 7, 2023—Cited in IPR2022-00243, challenging U.S. Pat. No. 8,111,839.
Patent Owner's Request for Oral Argument, Exhibit-27, Filed on Feb. 7, 2023—Cited in IPR2022-00242, challenging U.S. Pat. No. 8,111,839.
Patent Owner's Request for Oral Argument; Exhibit-22, Filed on Feb. 3, 2023—Cited in IPR2022-00234, challenging U.S. Pat. No. 9,124,982.
Patent Owner's Response, Exhibit-14, Filed on Mar. 23, 2023—Cited in IPR2022-01078, challenging U.S. Pat. No. 11,057,701.
Patent Owner's Response, Exhibit-15, Filed on Sep. 9, 2022—Cited in IPR2022-00282, challenging U.S. Pat. No. 8,315,400.
Patent Owner's Response, Exhibit-16, Filed on Dec. 6, 2024—Cited in IPR2024-00559, challenging U.S. Pat. No. 11,610,587.
Patent Owner's Response, Exhibit-17, Filed on Apr. 10, 2023—Cited in IPR2022-01106, challenging U.S. Pat. No. 11,039,259.
Patent Owner's Response, Exhibit-18, Filed on Oct. 17, 2022—Cited in IPR2022-00302, challenging U.S. Pat. No. 9,609,424.
Patent Owner's Response, Exhibit-18, Filed on Nov. 8, 2022—Cited in IPR2022-00388, challenging U.S. Pat. No. 10,966,015.
Patent Owner's Response, Exhibit-19, Filed on Oct. 19, 2022—Cited in IPR2022-00253, challenging U.S. Pat. No. 9,491,542.
Patent Owner's Response, Exhibit-19, Filed on Oct. 19, 2022—Cited in IPR2022-00281, challenging U.S. Pat. No. 9,270,244.
Patent Owner's Response, Exhibit-19, Filed on Nov. 8, 2022—Cited in IPR2022-00369, challenging U.S. Pat. No. 10,405,082.
Patent Owner's Response, Exhibit-20, Filed on Oct. 17, 2022—Cited in IPR2022-00324, challenging U.S. Pat. No. 8,254,591.
Patent Owner's Response, Exhibit-21, Filed on Sep. 13, 2022—Cited in IPR2022-00243, challenging U.S. Pat. No. 8,111,839.
Patent Owner's Response, Exhibit-22, Filed on Sep. 13, 2022—Cited in IPR2022-00242, challenging U.S. Pat. No. 8,111,839.
Patent Owner's Sur-Reply, Exhibit-19, Filed on Jan. 12, 2023—Cited in IPR2022-00282, challenging U.S. Pat. No. 8,315,400.
Patent Owner's Sur-Reply, Exhibit-19, Filed on Jul. 26, 2023—Cited in IPR2022-01078, challenging U.S. Pat. No. 11,057,701.
Patent Owner's Sur-Reply, Exhibit-21, Filed on Feb. 21, 2023—Cited in IPR2022-00302, challenging U.S. Pat. No. 9,609,424.
Patent Owner's Sur-Reply, Exhibit-22, Filed on Feb. 22, 2023—Cited in IPR2022-00281, challenging U.S. Pat. No. 9,270,244.
Patent Owner's Sur-Reply, Exhibit-22, Filed on Mar. 13, 2023—Cited in IPR2022-00388, challenging U.S. Pat. No. 10,966,015.
Patent Owner's Sur-Reply, Exhibit-23, Filed on Feb. 20, 2023—Cited in IPR2022-00324, challenging U.S. Pat. No. 8,254,591.
Patent Owner's Sur-Reply, Exhibit-23, Filed on Feb. 22, 2023—Cited in IPR2022-00253, challenging U.S. Pat. No. 9,491,542.
Patent Owner's Sur-Reply, Exhibit-23, Filed on Mar. 13, 2023—Cited in IPR2022-00369, challenging U.S. Pat. No. 10,405,082.
Patent Owner's Sur-Reply, Exhibit-23, Filed on Aug. 14, 2023—Cited in IPR2022-01106, challenging U.S. Pat. No. 11,039,259.
Patent Owner's Sur-Reply, Exhibit-25, Filed on Jan. 17, 2023—Cited in IPR2022-00243, challenging U.S. Pat. No. 8,111,839.
Patent Owner's Sur-Reply, Exhibit-26, Filed on Jan. 12, 2023—Cited in IPR2022-00242, challenging U.S. Pat. No. 8,111,839.
Patent Owner's Sur-Reply; Exhibit-21, Filed on Jan. 13, 2023—Cited in IPR2022-00234, challenging U.S. Pat. No. 9,124,982.
Patent Owner's Unopposed Motion to Withdraw and Substitute Counsel Under 37 CFR 11.116, Exhibit-11, Filed on Nov. 13, 2024—Cited in IPR2024-00559, challenging U.S. Pat. No. 11,610,587.
Patent Owner's Unopposed Motion to Withdraw and Substitute Counsel Under 37 CFR 11.116, Exhibit-11, Filed on Nov. 21, 2024—Cited in IPR2024-01003, challenging U.S. Pat. No. 9,191,083.
Patent Owner's Unopposed Motion to Withdraw and Substitute Counsel Under 37 CFR 11.116, Exhibit-11, Filed on Nov. 21, 2024—Cited in IPR2024-01004, challenging U.S. Pat. No. 9,614,943.
Patent Owner's Unopposed Motion to Withdraw and Substitute Counsel Under 37 CFR 11.116, Exhibit-11, Filed on Nov. 21, 2024—Cited in IPR2024-01031, challenging U.S. Pat. No. 7,049,850.

(56) References Cited

OTHER PUBLICATIONS

Patent Owner's Unopposed Motion to Withdraw and Substitute Counsel Under 37 CFR 11.116, Exhibit-12, Filed on Nov. 21, 2024—Cited in IPR2024-01034, challenging U.S. Pat. No. 9,279,263.
Patent Owner's Unopposed Motion to Withdraw and Substitute Counsel Under 37 CFR 11.116Paper10,Nov. 21, 2024—Cited in IPR2024-01033, challenging U.S. Pat. No. 8,434,966.
Patent Owner's Updated Exhibit List, Exhibit-23, Filed on Sep. 25, 2023—Cited in IPR2022-01078, challenging U.S. Pat. No. 11,057,701.
Patent Owner's Updated Mandatory Notice under 37 C.F.R. 42.8, Exhibit-15, Filed on Jul. 27, 2022—Cited in IPR2022-00324, challenging U.S. Pat. No. 8,254,591.
Patent Owner's Updated Mandatory Notice under 37 C.F.R. 42.8, Exhibit-17, Filed on Jul. 27, 2022—Cited in IPR2022-00243, challenging U.S. Pat. No. 8,111,839.
Patent Owner's Updated Mandatory Notice under 37 C.F.R. 42.8, Exhibit-18, Filed on Jul. 27, 2022—Cited in IPR2022-00242, challenging U.S. Pat. No. 8,111,839.
Patent Owner's Updated Mandatory Notice under 37 C.F.R. 42.8, Exhibit-8, Filed on Dec. 28, 2021—Cited in IPR2022-00242, challenging U.S. Pat. No. 8,111,839.
Patent Owner's Updated Mandatory Notice under 37 C.F.R. 42.8; Exhibit-14, Filed on Jul. 27, 2022—Cited in IPR2022-00234, challenging U.S. Pat. No. 9,124,982.
Patent Owner's Updated Mandatory Notice under 37 C.F.R. 42.8; Exhibit-7, Filed on Dec. 28, 2021—Cited in IPR2022-00234, challenging U.S. Pat. No. 9,124,982.
Patent Owner's Updated Mandatory Notice, Exhibit-17, Filed on Sep. 13, 2022—Cited in IPR2022-00253, challenging U.S. Pat. No. 9,491,542.
Patent Owner's Updated Mandatory Notice, Exhibit-17, Filed on Sep. 13, 2022—Cited in IPR2022-00281, challenging U.S. Pat. No. 9,270,244.
Patent Owner's Updated Mandatory Notice, Exhibit-18, Filed on Jun. 28, 2023—Cited in IPR2022-01078, challenging U.S. Pat. No. 11,057,701.
Patent Owner's Updated Mandatory Notice, Exhibit-20, Filed on Jun. 28, 2023—Cited in IPR2022-01106, challenging U.S. Pat. No. 11,039,259.
Patent Owner's Updated Mandatory Notice, Exhibit-29, Filed on Jun. 28, 2023—Cited in IPR2022-00282, challenging U.S. Pat. No. 8,315,400.
Patent Owner's Updated Mandatory Notice, Exhibit-29, Filed on Jun. 28, 2023—Cited in IPR2022-00388, challenging U.S. Pat. No. 10,966,015.
Patent Owner's Updated Mandatory Notice, Exhibit-30, Filed on Jun. 28, 2023—Cited in IPR2022-00281, challenging U.S. Pat. No. 9,270,244.
Patent Owner's Updated Mandatory Notice, Exhibit-30, Filed on Jun. 28, 2023—Cited in IPR2022-00369, challenging U.S. Pat. No. 10,405,082.
Patent Owner's Updated Mandatory Notice, Exhibit-31, Filed on Jun. 28, 2023—Cited in IPR2022-00253, challenging U.S. Pat. No. 9,491,542.
Patent Owner's Updated Mandatory Notice, Exhibit-31, Filed on Jun. 28, 2023—Cited in IPR2022-00324, challenging U.S. Pat. No. 8,254,591.
Patent Owner's Updated Mandatory Notice, Exhibit-35, Filed on Jun. 28, 2023—Cited in IPR2022-00302, challenging U.S. Pat. No. 9,609,424.
Patent Owner's Updated Mandatory Notice, Exhibit-36, Filed on Jun. 28, 2023—Cited in IPR2022-00243, challenging U.S. Pat. No. 8,111,839.
Patent Owner's Updated Mandatory Notice, Exhibit-37, Filed on Jun. 28, 2023—Cited in IPR2022-00242, challenging U.S. Pat. No. 8,111,839.
Patent Owner's Updated Mandatory Notice; Exhibit-30, Filed on Jun. 28, 2023—Cited in IPR2022-00234, challenging U.S. Pat. No. 9,124,982.
Patent Owner's Updated Mandatory Notices, Exhibit-15, Filed on Dec. 6, 2024—Cited in IPR2024-00559, challenging U.S. Pat. No. 11,610,587.
Patent Owner's Updated Power of Attorney Pursuant to 37 CFR 41.10(b), Exhibit-14, Filed on Dec. 6, 2024—Cited in IPR2024-00559, challenging U.S. Pat. No. 11,610,587.
Petition : as filed for Inter Partes Review of U.S. Pat. No. 11,610,587, Exhibit-4, Filed on Feb. 9, 2024—Cited in IPR2024-00559, challenging U.S. Pat. No. 11,610,587.
Petition : as filed, Exhibit-3, Filed on Jun. 12, 2024—Cited in IPR2024-01003, challenging U.S. Pat. No. 9,191,083.
Petition : as filed, Exhibit-3, Filed on Jun. 12, 2024—Cited in IPR2024-01004, challenging U.S. Pat. No. 9,614,943.
Petition : as filed, Exhibit-4, Filed on Jun. 25, 2024—Cited in IPR2024-01031, challenging U.S. Pat. No. 7,049,850.
Petition : as filed, Exhibit-5, Filed on Jul. 1, 2024—Cited in IPR2024-01034, challenging U.S. Pat. No. 9,279,263.
Petition : as filedPaper3,Jun. 18, 2024—Cited in IPR2024-01033, challenging U.S. Pat. No. 8,434,966.
Petition for Inter Partes Review of U.S. Pat. No. 11,217,237, Exhibit-4, Filed on Jun. 9, 2022—Cited in IPR2022-01098, challenging U.S. Pat. No. 11,217,237.
Petition for Inter Partes Review of U.S. Pat. No. 11,244,666, Exhibit-3, Filed on Jun. 9, 2022—Cited in IPR2022-01099, challenging U.S. Pat. No. 11,244,666.
Petition for Inter Partes Review of U.S. Pat. No. 8,254,591, Exhibit-3, Filed on Dec. 20, 2021—Cited in IPR2022-00324, challenging U.S. Pat. No. 8,254,591.
Petition for Inter Partes Review of U.S. Pat. No. 10,405,082, Exhibit-3, Filed on Dec. 30, 2021—Cited in IPR2022-00369, challenging U.S. Pat. No. 10,405,082.
Petition for Inter Partes Review of U.S. Pat. No. 10,966,015, Exhibit-3, Filed on Jan. 4, 2022—Cited in IPR2022-00388, challenging U.S. Pat. No. 10,966,015.
Petition for Inter Partes Review of U.S. Pat. No. 10,979,836, Exhibit-3, Filed on Jan. 14, 2022—Cited in IPR2022-00410, challenging U.S. Pat. No. 10,979,836.
Petition for Inter Partes Review of U.S. Pat. No. 11,039,259, Exhibit-3, Filed on Jun. 9, 2022—Cited in IPR2022-01106, challenging U.S. Pat. No. 11,039,259.
Petition for Inter Partes Review of U.S. Pat. No. 8,111,839, Exhibit-3, Filed on Dec. 13, 2021—Cited in IPR2022-00242, challenging U.S. Pat. No. 8,111,839.
Petition for Inter Partes Review of U.S. Pat. No. 8,111,839, Exhibit-3, Filed on Dec. 13, 2021—Cited in IPR2022-00243, challenging U.S. Pat. No. 8,111,839.
Petition for Inter Partes Review of U.S. Pat. No. 9,124,982; Exhibit-3, Filed on Dec. 13, 2021—Cited in IPR2022-00234, challenging U.S. Pat. No. 9,124,982.
Petition for Inter Partes Review of U.S. Pat. No. 9,270,244, Exhibit-3, Filed on Dec. 21, 2021—Cited in IPR2022-00281, challenging U.S. Pat. No. 9,270,244.
Petition for Inter Partes Review of U.S. Pat. No. 9,491,542, Exhibit-3, Filed on Dec. 17, 2021—Cited in IPR2022-00253, challenging U.S. Pat. No. 9,491,542.
Petition for Inter Partes Review of U.S. Pat. No. 9,609,424, Exhibit-3, Filed on Dec. 21, 2021—Cited in IPR2022-00302, challenging U.S. Pat. No. 9,609,424.
Petition of Inter Partes Review of U.S. Pat. No. 11,057,701, Exhibit-3, Filed on Jun. 9, 2022—Cited in IPR2022-01078, challenging U.S. Pat. No. 11,057,701.
Petition with Proposed Corrections in Redline, Exhibit-1042, Filed on Jan. 31, 2022—Cited in IPR2022-00242, challenging U.S. Pat. No. 8,111,839.
Petition with Proposed Corrections in Redline, Exhibit-1042, Filed on Jan. 31, 2022—Cited in IPR2022-00243, challenging U.S. Pat. No. 8,111,839.
Petitioner's Power of Attorney from Samsung Electronics Co., Ltd.; Exhibit-1, Filed on Dec. 13, 2021—Cited in IPR2022-00234, challenging U.S. Pat. No. 9,124,982.
Petitioner's Power of Attorney from Samsung Electronics, America, Inc.; Exhibit-2, Filed on Dec. 13, 2021—Cited in IPR2022-00234, challenging U.S. Pat. No. 9,124,982.

(56) References Cited

OTHER PUBLICATIONS

Petitioner's Updated Mandatory Notices, Exhibit-16, Filed on Oct. 13, 2022—Cited in IPR2022-00388, challenging U.S. Pat. No. 10,966,015.
Petitioner's Updated Mandatory Notices, Exhibit-17, Filed on Oct. 13, 2022—Cited in IPR2022-00369, challenging U.S. Pat. No. 10,405,082.
Petitioner's Updated Mandatory Notices; Exhibit-27, Filed on Apr. 3, 2023—Cited in IPR2022-00234, challenging U.S. Pat. No. 9,124,982.
Petitioners Supplemental Brief on Interim Fintiv Guidance, Exhibit-10, Filed on Jul. 1, 2022—Cited in IPR2022-00410, challenging U.S. Pat. No. 10,979,836.
Petitioners Supplemental Brief on Interim Fintiv Guidance, Exhibit-11, Filed on Jul. 1, 2022—Cited in IPR2022-00253, challenging U.S. Pat. No. 9,491,542.
Petitioners Supplemental Brief on Interim Fintiv Guidance, Exhibit-11, Filed on Jul. 1, 2022—Cited in IPR2022-00281, challenging U.S. Pat. No. 9,270,244.
Petitioners Supplemental Brief on Interim Fintiv Guidance, Exhibit-11, Filed on Jul. 1, 2022—Cited in IPR2022-00302, challenging U.S. Pat. No. 9,609,424.
Petitioners Supplemental Brief on Interim Fintiv Guidance, Exhibit-11, Filed on Jul. 1, 2022—Cited in IPR2022-00324, challenging U.S. Pat. No. 8,254,591.
Petitioners Supplemental Brief on Interim Fintiv Guidance, Exhibit-11, Filed on Jul. 1, 2022—Cited in IPR2022-00388, challenging U.S. Pat. No. 10,966,015.
Petitioners Supplemental Brief on Interim Fintiv Guidance, Exhibit-12, Filed on Jul. 1, 2022—Cited in IPR2022-00369, challenging U.S. Pat. No. 10,405,082.
Petitioners' Demonstrative Exhibits for Oral Argument, Exhibit-1019, Filed on Mar. 14, 2023—Cited in IPR2022-00282, challenging U.S. Pat. No. 8,315,400.
Petitioners' Demonstrative Exhibits for Oral Argument; Exhibit-1045, Filed on Mar. 14, 2023—Cited in IPR2022-00234, challenging U.S. Pat. No. 9,124,982.
Petitioners' Motion for Leave to File Corrected Petition, Exhibit-9, Filed on Jan. 31, 2022—Cited in IPR2022-00243, challenging U.S. Pat. No. 8,111,839.
Petitioners' Motion to Submit Supplemental Information Pursuant to 37 C.F.R. §42.123(b), Exhibit-29, Filed on Apr. 13, 2023—Cited in IPR2022-00302, challenging U.S. Pat. No. 9,609,424.
Petitioners' Notice of Appeal, Exhibit-31, Filed on Aug. 11, 2023—Cited in IPR2022-00282, challenging U.S. Pat. No. 8,315,400.
Petitioners' Notice of Appeal, Exhibit-38, Filed on Aug. 11, 2023—Cited in IPR2022-00302, challenging U.S. Pat. No. 9,609,424.
Petitioners' Notice of Cross-Appeal, Exhibit-34, Filed on Sep. 20, 2023—Cited in IPR2022-00281, challenging U.S. Pat. No. 9,270,244.
Petitioners' Notice of Cross-Appeal, Exhibit-35, Filed on Sep. 20, 2023—Cited in IPR2022-00253, challenging U.S. Pat. No. 9,491,542.
Petitioners' Notice of Cross-Appeal, Exhibit-35, Filed on Sep. 20, 2023—Cited in IPR2022-00324, challenging U.S. Pat. No. 8,254,591.
Petitioners' Notice of Cross-Appeal, Exhibit-39, Filed on Aug. 24, 2023—Cited in IPR2022-00242, challenging U.S. Pat. No. 8,111,839.
Petitioners' Notice of Cross-Appeal; Exhibit-32, Filed on Aug. 24, 2023—Cited in IPR2022-00234, challenging U.S. Pat. No. 9,124,982.
Petitioners' Notice of Depo of Chrisotpher Struck, Exhibit-16, Filed on May 15, 2023—Cited in IPR2022-01078, challenging U.S. Pat. No. 11,057,701.
Petitioners' Notice of Deposition of Christopher Struck, Exhibit-19, Filed on Nov. 15, 2022—Cited in IPR2022-00302, challenging U.S. Pat. No. 9,609,424.
Petitioners' Notice of Deposition of Daniel P. Anagnos, Exhibit-23, Filed on Nov. 9, 2022—Cited in IPR2022-00243, challenging U.S. Pat. No. 8,111,839.
Petitioners' Notice of Deposition of Daniel P. Anagnos, Exhibit-24, Filed on Nov. 9, 2022—Cited in IPR2022-00242, challenging U.S. Pat. No. 8,111,839.
Petitioners' Notice of Deposition of Daniel P. Anagnos; Exhibit-19, Filed on Nov. 9, 2022—Cited in IPR2022-00234, challenging U.S. Pat. No. 9,124,982.
Petitioners' Notice of Deposition of David Kleinschmidt, Exhibit-19, Filed on May 24, 2023—Cited in IPR2022-01106, challenging U.S. Pat. No. 11,039,259.
Petitioners' Notice of Objections to Evidence, Exhibit-18, Filed on Apr. 19, 2023—Cited in IPR2022-01106, challenging U.S. Pat. No. 11,039,259.
Petitioners' Notice of Objections to Evidence, Exhibit-22, Filed on Sep. 20, 2022—Cited in IPR2022-00243, challenging U.S. Pat. No. 8,111,839.
Petitioners' Notice of Objections to Evidence, Exhibit-23, Filed on Sep. 20, 2022—Cited in IPR2022-00242, challenging U.S. Pat. No. 8,111,839.
Petitioners' Notice of Objections to Evidence; Exhibit-18, Filed on Sep. 16, 2022—Cited in IPR2022-00234, challenging U.S. Pat. No. 9,124,982.
Petitioners' Preliminary Reply, Exhibit-10, Filed on Apr. 20, 2022—Cited in IPR2022-00282, challenging U.S. Pat. No. 8,315,400.
Petitioners' Preliminary Reply, Exhibit-10, Filed on Jun. 14, 2022—Cited in IPR2022-00369, challenging U.S. Pat. No. 10,405,082.
Petitioners' Preliminary Reply, Exhibit-13, Filed on Apr. 20, 2022—Cited in IPR2022-00243, challenging U.S. Pat. No. 8,111,839.
Petitioners' Preliminary Reply, Exhibit-14, Filed on Apr. 20, 2022—Cited in IPR2022-00242, challenging U.S. Pat. No. 8,111,839.
Petitioners' Preliminary Reply, Exhibit-8, Filed on Nov. 10, 2022—Cited in IPR2022-01078, challenging U.S. Pat. No. 11,057,701.
Petitioners' Preliminary Reply, Exhibit-8, Filed on Nov. 10, 2022—Cited in IPR2022-01099, challenging U.S. Pat. No. 11,244,666.
Petitioners' Preliminary Reply, Exhibit-8, Filed on Nov. 10, 2022—Cited in IPR2022-01106, challenging U.S. Pat. No. 11,039,259.
Petitioners' Preliminary Reply, Exhibit-8, Filed on Jun. 14, 2022—Cited in IPR2022-00410, challenging U.S. Pat. No. 10,979,836.
Petitioners' Preliminary Reply, Exhibit-9, Filed on Nov. 15, 2022—Cited in IPR2022-01098, challenging U.S. Pat. No. 11,217,237.
Petitioners' Preliminary Reply, Exhibit-9, Filed on May 10, 2022—Cited in IPR2022-00302, challenging U.S. Pat. No. 9,609,424.
Petitioners' Preliminary Reply, Exhibit-9, Filed on May 11, 2022—Cited in IPR2022-00324, challenging U.S. Pat. No. 8,254,591.
Petitioners' Preliminary Reply, Exhibit-9, Filed on May 20, 2022—Cited in IPR2022-00253, challenging U.S. Pat. No. 9,491,542.
Petitioners' Preliminary Reply, Exhibit-9, Filed on May 27, 2022—Cited in IPR2022-00281, challenging U.S. Pat. No. 9,270,244.
Petitioners' Preliminary Reply, Exhibit-9, Filed on Jun. 14, 2022—Cited in IPR2022-00388, challenging U.S. Pat. No. 10,966,015.
Petitioners' Preliminary Reply; Exhibit-10, Filed on Apr. 20, 2022—Cited in IPR2022-00234, challenging U.S. Pat. No. 9,124,982.
Petitioners' Reply to Patent Owner's Response, Exhibit-17, Filed on Dec. 2, 2022—Cited in IPR2022-00282, challenging U.S. Pat. No. 8,315,400.
Petitioners' Reply to Patent Owner's Response, Exhibit-17, Filed on Jun. 15, 2023—Cited in IPR2022-01078, challenging U.S. Pat. No. 11,057,701.
Petitioners' Reply to Patent Owner's Response, Exhibit-20, Filed on Jan. 10, 2023—Cited in IPR2022-00302, challenging U.S. Pat. No. 9,609,424.
Petitioners' Reply to Patent Owner's Response, Exhibit-20, Filed on Jan. 31, 2023—Cited in IPR2022-00388, challenging U.S. Pat. No. 10,966,015.
Petitioners' Reply to Patent Owner's Response, Exhibit-21, Filed on Jan. 11, 2023—Cited in IPR2022-00281, challenging U.S. Pat. No. 9,270,244.
Petitioners' Reply to Patent Owner's Response, Exhibit-21, Filed on Jan. 31, 2023—Cited in IPR2022-00369, challenging U.S. Pat. No. 10,405,082.
Petitioners' Reply to Patent Owner's Response, Exhibit-21, Filed on Jun. 30, 2023—Cited in IPR2022-01106, challenging U.S. Pat. No. 11,039,259.
Petitioners' Reply to Patent Owner's Response, Exhibit-22, Filed on Jan. 10, 2023—Cited in IPR2022-00324, challenging U.S. Pat. No. 8,254,591.

(56) References Cited

OTHER PUBLICATIONS

Petitioners' Reply to Patent Owner's Response, Exhibit-24, Filed on Dec. 6, 2022—Cited in IPR2022-00243, challenging U.S. Pat. No. 8,111,839.
Petitioners' Reply to Patent Owner's Response, Exhibit-25, Filed on Dec. 6, 2022—Cited in IPR2022-00242, challenging U.S. Pat. No. 8,111,839.
Petitioners' Reply to Patent Owner's Response; Exhibit-20, Filed on Dec. 2, 2022—Cited in IPR2022-00234, challenging U.S. Pat. No. 9,124,982.
Petitioners' Reply to Patent Owners Response, Exhibit-21, Filed on Jan. 11, 2023—Cited in IPR2022-00253, challenging U.S. Pat. No. 9,491,542.
Petitioners' Request for Oral Argument, Exhibit-20, Filed on Aug. 17, 2023—Cited in IPR2022-01078, challenging U.S. Pat. No. 11,057,701.
Petitioners' Request for Oral Argument, Exhibit-22, Filed on Feb. 3, 2023—Cited in IPR2022-00282, challenging U.S. Pat. No. 8,315,400.
Petitioners' Request for Oral Argument, Exhibit-23, Filed on Feb. 28, 2023—Cited in IPR2022-00302, challenging U.S. Pat. No. 9,609,424.
Petitioners' Request for Oral Argument, Exhibit-24, Filed on Mar. 1, 2023—Cited in IPR2022-00281, challenging U.S. Pat. No. 9,270,244.
Petitioners' Request for Oral Argument, Exhibit-24, Filed on Aug. 28, 2023—Cited in IPR2022-01106, challenging U.S. Pat. No. 11,039,259.
Petitioners' Request for Oral Argument, Exhibit-25, Filed on Feb. 28, 2023—Cited in IPR2022-00324, challenging U.S. Pat. No. 8,254,591.
Petitioners' Request for Oral Argument, Exhibit-25, Filed on Mar. 1, 2023—Cited in IPR2022-00253, challenging U.S. Pat. No. 9,491,542.
Petitioners' Request for Oral Argument, Exhibit-25, Filed on Apr. 4, 2023—Cited in IPR2022-00388, challenging U.S. Pat. No. 10,966,015.
Petitioners' Request for Oral Argument, Exhibit-26, Filed on Apr. 4, 2023—Cited in IPR2022-00369, challenging U.S. Pat. No. 10,405,082.
Petitioners' Request for Oral Argument, Exhibit-27, Filed on Feb. 7, 2023—Cited in IPR2022-00243, challenging U.S. Pat. No. 8,111,839.
Petitioners' Request for Oral Argument, Exhibit-28, Filed on Feb. 7, 2023—Cited in IPR2022-00242, challenging U.S. Pat. No. 8,111,839.
Petitioners' Request for Oral Argument; Exhibit-23, Filed on Feb. 3, 2023—Cited in IPR2022-00234, challenging U.S. Pat. No. 9,124,982.
Petitioners' Request for Refund of Post-Institution Fee, Exhibit-12, Filed on Mar. 2, 2023—Cited in IPR2022-01099, challenging U.S. Pat. No. 11,244,666.
Petitioners' Request for Refund of Post-Institution Fee, Exhibit-13, Filed on Jan. 18, 2023—Cited in IPR2022-00410, challenging U.S. Pat. No. 10,979,836.
Petitioners' Request for Refund of Post-Institution Fee, Exhibit-13, Filed on Mar. 2, 2023—Cited in IPR2022-01098, challenging U.S. Pat. No. 11,217,237.
Petitioners' Request for Refund of Post-Institution Fees, Exhibit-17, Filed on Dec. 16, 2024—Cited in IPR2024-01003, challenging U.S. Pat. No. 9,191,083.
Petitioners' Request for Refund of Post-Institution Fees, Exhibit-17, Filed on Dec. 16, 2024—Cited in IPR2024-01004, challenging U.S. Pat. No. 9,614,943.
Petitioners' Request for Refund of Post-Institution Fees, Exhibit-17, Filed on Dec. 16, 2024—Cited in IPR2024-01031, challenging U.S. Pat. No. 7,049,850.
Petitioners' Request for Refund of Post-Institution Fees, Exhibit-18, Filed on Dec. 16, 2024—Cited in IPR2024-01034, challenging U.S. Pat. No. 9,279,263.
Petitioners' Request for Refund of Post-Institution FeesPaper16,Dec. 16, 2024—Cited in IPR2024-01033, challenging U.S. Pat. No. 8,434,966.
Petitioners' Submission of Supplemental Information, Exhibit-33, Filed on May 15, 2023—Cited in IPR2022-00302, challenging U.S. Pat. No. 9,609,424.
Petitioners' Sur-Sur-Reply to Patent Owner's Sur-Reply, Exhibit-20, Filed on Jan. 27, 2023—Cited in IPR2022-00282, challenging U.S. Pat. No. 8,315,400.
Petitioners' Sur-Sur-Reply to Patent Owner's Sur-Reply, Exhibit-26, Filed on Mar. 7, 2023—Cited in IPR2022-00281, challenging U.S. Pat. No. 9,270,244.
Petitioners' Sur-Sur-Reply to Patent Owner's Sur-Reply, Exhibit-27, Filed on Mar. 7, 2023—Cited in IPR2022-00253, challenging U.S. Pat. No. 9,491,542.
Petitioners' Updated Exhibit List, Exhibit-10, Filed on Nov. 20, 2024—Cited in IPR2024-01003, challenging U.S. Pat. No. 9,191,083.
Petitioners' Updated Exhibit List, Exhibit-10, Filed on Nov. 20, 2024—Cited in IPR2024-01004, challenging U.S. Pat. No. 9,614,943.
Petitioners' Updated Exhibit List, Exhibit-10, Filed on Nov. 20, 2024—Cited in IPR2024-01031, challenging U.S. Pat. No. 7,049,850.
Petitioners' Updated Exhibit List, Exhibit-11, Filed on Nov. 20, 2024—Cited in IPR2024-01034, challenging U.S. Pat. No. 9,279,263.
Petitioners' Updated Exhibit List, Exhibit-15, Filed on Dec. 11, 2024—Cited in IPR2024-01003, challenging U.S. Pat. No. 9,191,083.
Petitioners' Updated Exhibit List, Exhibit-15, Filed on Dec. 11, 2024—Cited in IPR2024-01004, challenging U.S. Pat. No. 9,614,943.
Petitioners' Updated Exhibit List, Exhibit-15, Filed on Dec. 11, 2024—Cited in IPR2024-01031, challenging U.S. Pat. No. 7,049,850.
Petitioners' Updated Exhibit List, Exhibit-16, Filed on Dec. 11, 2024—Cited in IPR2024-01034, challenging U.S. Pat. No. 9,279,263.
Petitioners' Updated Exhibit List, Exhibit-19, Filed on Dec. 11, 2024—Cited in IPR2024-00559, challenging U.S. Pat. No. 11,610,587.
Petitioners' Updated Exhibit List, Exhibit-24, Filed on Mar. 14, 2023—Cited in IPR2022-00282, challenging U.S. Pat. No. 8,315,400.
Petitioners' Updated Exhibit List, Exhibit-24, Filed on Sep. 26, 2023—Cited in IPR2022-01078, challenging U.S. Pat. No. 11,057,701.
Petitioners' Updated Exhibit List, Exhibit-27, Filed on May 9, 2023—Cited in IPR2022-00388, challenging U.S. Pat. No. 10,966,015.
Petitioners' Updated Exhibit List, Exhibit-28, Filed on Oct. 11, 2023—Cited in IPR2022-01106, challenging U.S. Pat. No. 11,039,259.
Petitioners' Updated Exhibit List, Exhibit-28, Filed on Apr. 11, 2023—Cited in IPR2022-00302, challenging U.S. Pat. No. 9,609,424.
Petitioners' Updated Exhibit List, Exhibit-28, Filed on Apr. 13, 2023—Cited in IPR2022-00281, challenging U.S. Pat. No. 9,270,244.
Petitioners' Updated Exhibit List, Exhibit-28, Filed on May 9, 2023—Cited in IPR2022-00369, challenging U.S. Pat. No. 10,405,082.
Petitioners' Updated Exhibit List, Exhibit-30, Filed on Apr. 12, 2023—Cited in IPR2022-00253, challenging U.S. Pat. No. 9,491,542.
Petitioners' Updated Exhibit List, Exhibit-30, Filed on Apr. 13, 2023—Cited in IPR2022-00302, challenging U.S. Pat. No. 9,609,424.
Petitioners' Updated Exhibit List, Exhibit-30, Filed on Apr. 4, 2023—Cited in IPR2022-00324, challenging U.S. Pat. No. 8,254,591.
Petitioners' Updated Exhibit List, Exhibit-31, Filed on Mar. 16, 2023—Cited in IPR2022-00243, challenging U.S. Pat. No. 8,111,839.
Petitioners' Updated Exhibit List, Exhibit-31, Filed on Apr. 13, 2023—Cited in IPR2022-00302, challenging U.S. Pat. No. 9,609,424.
Petitioners' Updated Exhibit List, Exhibit-32, Filed on Mar. 16, 2023—Cited in IPR2022-00242, challenging U.S. Pat. No. 8,111,839.
Petitioners' Updated Exhibit List; Exhibit-25, Filed on Mar. 14, 2023—Cited in IPR2022-00234, challenging U.S. Pat. No. 9,124,982.
Petitioners' Updated Exhibit ListPaper14,Dec. 11, 2024—Cited in IPR2024-01033, challenging U.S. Pat. No. 8,434,966.
Petitioners' Updated Exhibit ListPaper9,Nov. 20, 2024—Cited in IPR2024-01033, challenging U.S. Pat. No. 8,434,966.
Petitioners' Updated Mandatory Notices, Exhibit-15, Filed on Apr. 3, 2023—Cited in IPR2022-01078, challenging U.S. Pat. No. 11,057,701.
Petitioners' Updated Mandatory Notices, Exhibit-16, Filed on Mar. 28, 2023—Cited in IPR2022-01106, challenging U.S. Pat. No. 11,039,259.
Petitioners' Updated Mandatory Notices, Exhibit-18, Filed on Aug. 10, 2022—Cited in IPR2022-00324, challenging U.S. Pat. No. 8,254,591.
Petitioners' Updated Mandatory Notices, Exhibit-20, Filed on Aug. 10, 2022—Cited in IPR2022-00243, challenging U.S. Pat. No. 8,111,839.

(56) References Cited

OTHER PUBLICATIONS

Petitioners' Updated Mandatory Notices, Exhibit-21, Filed on Feb. 8, 2023—Cited in IPR2022-00388, challenging U.S. Pat. No. 10,966,015.
Petitioners' Updated Mandatory Notices, Exhibit-21, Filed on Aug. 10, 2022—Cited in IPR2022-00242, challenging U.S. Pat. No. 8,111,839.
Petitioners' Updated Mandatory Notices, Exhibit-22, Filed on Feb. 8, 2023—Cited in IPR2022-00369, challenging U.S. Pat. No. 10,405,082.
Petitioners' Updated Mandatory Notices, Exhibit-23, Filed on Apr. 3, 2023—Cited in IPR2022-00388, challenging U.S. Pat. No. 10,966,015.
Petitioners' Updated Mandatory Notices, Exhibit-24, Filed on Apr. 3, 2023—Cited in IPR2022-00369, challenging U.S. Pat. No. 10,405,082.
Petitioners' Updated Mandatory Notices, Exhibit-26, Filed on Apr. 3, 2023—Cited in IPR2022-00282, challenging U.S. Pat. No. 8,315,400.
Petitioners' Updated Mandatory Notices, Exhibit-26, Filed on Apr. 3, 2023—Cited in IPR2022-00302, challenging U.S. Pat. No. 9,609,424.
Petitioners' Updated Mandatory Notices, Exhibit-27, Filed on Apr. 3, 2023—Cited in IPR2022-00281, challenging U.S. Pat. No. 9,270,244.
Petitioners' Updated Mandatory Notices, Exhibit-28, Filed on Apr. 3, 2023—Cited in IPR2022-00253, challenging U.S. Pat. No. 9,491,542.
Petitioners' Updated Mandatory Notices, Exhibit-28, Filed on Apr. 3, 2023—Cited in IPR2022-00324, challenging U.S. Pat. No. 8,254,591.
Petitioners' Updated Mandatory Notices, Exhibit-33, Filed on Apr. 3, 2023—Cited in IPR2022-00243, challenging U.S. Pat. No. 8,111,839.
Petitioners' Updated Mandatory Notices, Exhibit-34, Filed on Apr. 3, 2023—Cited in IPR2022-00242, challenging U.S. Pat. No. 8,111,839.
Petitioners' Updated Mandatory Notices, Exhibit-4, Filed on Jan. 6, 2022—Cited in IPR2022-00369, challenging U.S. Pat. No. 10,405,082.
Petitioners' Updated Mandatory Notices, Exhibit-6, Filed on Jan. 20, 2022—Cited in IPR2022-00388, challenging U.S. Pat. No. 10,966,015.
Petitioners' Updated Mandatory Notices, Exhibit-7, Filed on Jan. 20, 2022—Cited in IPR2022-00253, challenging U.S. Pat. No. 9,491,542.
Petitioners' Updated Mandatory Notices, Exhibit-7, Filed on Jan. 20, 2022—Cited in IPR2022-00281, challenging U.S. Pat. No. 9,270,244.
Petitioners' Updated Mandatory Notices, Exhibit-7, Filed on Jan. 20, 2022—Cited in IPR2022-00302, challenging U.S. Pat. No. 9,609,424.
Petitioners' Updated Mandatory Notices, Exhibit-7, Filed on Jan. 20, 2022—Cited in IPR2022-00324, challenging U.S. Pat. No. 8,254,591.
Petitioners' Updated Mandatory Notices, Exhibit-7, Filed on Jan. 20, 2022—Cited in IPR2022-00369, challenging U.S. Pat. No. 10,405,082.
Petitioners' Updated Mandatory Notices, Exhibit-8, Filed on Jan. 20, 2022—Cited in IPR2022-00243, challenging U.S. Pat. No. 8,111,839.
Petitioners' Updated Mandatory Notices, Exhibit-8, Filed on Jan. 20, 2022—Cited in IPR2022-00282, challenging U.S. Pat. No. 8,315,400.
Petitioners' Updated Mandatory Notices, Exhibit-9, Filed on Jan. 20, 2022—Cited in IPR2022-00242, challenging U.S. Pat. No. 8,111,839.
Petitioners' Updated Mandatory Notices; Exhibit-16, Filed on Aug. 10, 2022—Cited in IPR2022-00234, challenging U.S. Pat. No. 9,124,982.
Petitioners' Updated Mandatory Notices; Exhibit-8, Filed on Jan. 20, 2022—Cited in IPR2022-00234, challenging U.S. Pat. No. 9,124,982.
PO's Opposition to Motion to File Supplemental Information, Exhibit-32, Filed on Apr. 17, 2023—Cited in IPR2022-00302, challenging U.S. Pat. No. 9,609,424.
PO's Updated Exhibit List, Exhibit-25, Filed on Mar. 14, 2023—Cited in IPR2022-00282, challenging U.S. Pat. No. 8,315,400.
PO's Updated Exhibit List, Exhibit-27, Filed on Oct. 11, 2023—Cited in IPR2022-01106, challenging U.S. Pat. No. 11,039,259.
PO's Updated Exhibit List, Exhibit-27, Filed on Apr. 11, 2023—Cited in IPR2022-00302, challenging U.S. Pat. No. 9,609,424.
PO's Updated Exhibit List, Exhibit-28, Filed on May 9, 2023—Cited in IPR2022-00388, challenging U.S. Pat. No. 10,966,015.
PO's Updated Exhibit List, Exhibit-29, Filed on Apr. 12, 2023—Cited in IPR2022-00253, challenging U.S. Pat. No. 9,491,542.
PO's Updated Exhibit List, Exhibit-29, Filed on Apr. 13, 2023—Cited in IPR2022-00281, challenging U.S. Pat. No. 9,270,244.
PO's Updated Exhibit List, Exhibit-29, Filed on Apr. 4, 2023—Cited in IPR2022-00324, challenging U.S. Pat. No. 8,254,591.
PO's Updated Exhibit List, Exhibit-29, Filed on May 9, 2023—Cited in IPR2022-00369, challenging U.S. Pat. No. 10,405,082.
PO's Updated Exhibit List, Exhibit-30, Filed on Oct. 19, 2023—Cited in IPR2022-01106, challenging U.S. Pat. No. 11,039,259.
PO's Updated Exhibit List, Exhibit-32, Filed on Mar. 16, 2023—Cited in IPR2022-00243, challenging U.S. Pat. No. 8,111,839.
PO's Updated Exhibit List, Exhibit-33, Filed on Mar. 16, 2023—Cited in IPR2022-00242, challenging U.S. Pat. No. 8,111,839.
PO's Updated Exhibit List; Exhibit-26, Filed on Mar. 14, 2023—Cited in IPR2022-00234, challenging U.S. Pat. No. 9,124,982.
Power of Attorney for Samsung Electronics America, Inc., Exhibit-2, Filed on Dec. 30, 2021—Cited in IPR2022-00369, challenging U.S. Pat. No. 10,405,082.
Power of Attorney for Samsung Electronics America, Inc., Exhibit-2, Filed on Jun. 9, 2022—Cited in IPR2022-01078, challenging U.S. Pat. No. 11,057,701.
Power of Attorney for Samsung Electronics America, Inc., Exhibit-2, Filed on Jun. 9, 2022—Cited in IPR2022-01098, challenging U.S. Pat. No. 11,217,237.
Power of Attorney for Samsung Electronics America, Inc., Exhibit-2, Filed on Jun. 9, 2022—Cited in IPR2022-01099, challenging U.S. Pat. No. 11,244,666.
Power of Attorney for Samsung Electronics America, Inc., Exhibit-2, Filed on Jun. 9, 2022—Cited in IPR2022-01106, challenging U.S. Pat. No. 11,039,259.
Power of Attorney for Samsung Electronics Co. Ltd., Exhibit-1, Filed on Jun. 9, 2022—Cited in IPR2022-01078, challenging U.S. Pat. No. 11,057,701.
Power of Attorney for Samsung Electronics Co., Ltd., Exhibit-1, Filed on Dec. 10, 2021—Cited in IPR2022-00282, challenging U.S. Pat. No. 8,315,400.
Power of Attorney for Samsung Electronics Co., Ltd., Exhibit-1, Filed on Dec. 30, 2021—Cited in IPR2022-00369, challenging U.S. Pat. No. 10,405,082.
Power of Attorney for Samsung Electronics Co., Ltd., Exhibit-1, Filed on Jun. 9, 2022—Cited in IPR2022-01098, challenging U.S. Pat. No. 11,217,237.
Power of Attorney for Samsung Electronics Co., Ltd., Exhibit-1, Filed on Jun. 9, 2022—Cited in IPR2022-01099, challenging U.S. Pat. No. 11,244,666.
Power of Attorney for Samsung Electronics Co., Ltd., Exhibit-1, Filed on Jun. 9, 2022—Cited in IPR2022-01106, challenging U.S. Pat. No. 11,039,259.
Power of Attorney for Samsung Electronics, America, Inc., Exhibit-2, Filed on Dec. 10, 2021—Cited in IPR2022-00282, challenging U.S. Pat. No. 8,315,400.
Power of Attorney from Samsung Electronics America, Inc., Exhibit-2, Filed on Jan. 14, 2022—Cited in IPR2022-00410, challenging U.S. Pat. No. 10,979,836.
Power of Attorney from Samsung Electronics America, Inc., Exhibit-2, Filed on Jan. 4, 2022—Cited in IPR2022-00388, challenging U.S. Pat. No. 10,966,015.
Power of Attorney from Samsung Electronics America, Inc., Exhibit-2, Filed on Dec. 13, 2021—Cited in IPR2022-00242, challenging U.S. Pat. No. 8,111,839.
Power of Attorney from Samsung Electronics America, Inc., Exhibit-2, Filed on Dec. 13, 2021—Cited in IPR2022-00243, challenging U.S. Pat. No. 8,111,839.
Power of Attorney from Samsung Electronics America, Inc., Exhibit-2, Filed on Dec. 17, 2021—Cited in IPR2022-00253, challenging U.S. Pat. No. 9,491,542.

(56) References Cited

OTHER PUBLICATIONS

Power of Attorney from Samsung Electronics America, Inc., Exhibit-2, Filed on Dec. 20, 2021—Cited in IPR2022-00324, challenging U.S. Pat. No. 8,254,591.
Power of Attorney from Samsung Electronics America, Inc., Exhibit-2, Filed on Dec. 21, 2021—Cited in IPR2022-00281, challenging U.S. Pat. No. 9,270,244.
Power of Attorney from Samsung Electronics America, Inc., Exhibit-2, Filed on Dec. 21, 2021—Cited in IPR2022-00302, challenging U.S. Pat. No. 9,609,424.
Power of Attorney from Samsung Electronics Co., Ltd., Exhibit-1, Filed on Jan. 14, 2022—Cited in IPR2022-00410, challenging U.S. Pat. No. 10,979,836.
Power of Attorney from Samsung Electronics Co., Ltd., Exhibit-1, Filed on Jan. 4, 2022—Cited in IPR2022-00388, challenging U.S. Pat. No. 10,966,015.
Power of Attorney from Samsung Electronics Co., Ltd., Exhibit-1, Filed on Dec. 13, 2021—Cited in IPR2022-00242, challenging U.S. Pat. No. 8,111,839.
Power of Attorney from Samsung Electronics Co., Ltd., Exhibit-1, Filed on Dec. 13, 2021—Cited in IPR2022-00243, challenging U.S. Pat. No. 8,111,839.
Power of Attorney from Samsung Electronics Co., Ltd., Exhibit-1, Filed on Dec. 17, 2021—Cited in IPR2022-00253, challenging U.S. Pat. No. 9,491,542.
Power of Attorney from Samsung Electronics Co., Ltd., Exhibit-1, Filed on Dec. 20, 2021—Cited in IPR2022-00324, challenging U.S. Pat. No. 8,254,591.
Power of Attorney from Samsung Electronics Co., Ltd., Exhibit-1, Filed on Dec. 21, 2021—Cited in IPR2022-00281, challenging U.S. Pat. No. 9,270,244.
Power of Attorney from Samsung Electronics Co., Ltd., Exhibit-1, Filed on Dec. 21, 2021—Cited in IPR2022-00302, challenging U.S. Pat. No. 9,609,424.
PR 4-3 JCC Statement, Exhibit-2013, Filed on Jan. 12, 2023—Cited in IPR2022-00282, challenging U.S. Pat. No. 8,315,400.
PR 4-5(d) JCC Chart, Exhibit-2011, Filed on Jan. 12, 2023—Cited in IPR2022-00282, challenging U.S. Pat. No. 8,315,400.
Revised Scheduling Order, Exhibit-22, Filed on Jul. 12, 2023—Cited in IPR2022-01106, challenging U.S. Pat. No. 11,039,259.
Roy Falik, Exhibit-7, Filed on Jul. 18, 2024—Cited in IPR2024-01031, challenging U.S. Pat. No. 7,049,850.
Roy Falik, Exhibit-8, Filed on Jul. 18, 2024—Cited in IPR2024-01034, challenging U.S. Pat. No. 9,279,263.
Sage Journal, The Future of Hearing Aid Technology, Exhibit-2008, Filed on Oct. 17, 2022—Cited in IPR2022-00324, challenging U.S. Pat. No. 8,254,591.
*Samsung Elecs. Co., Ltd., et al.* v. *Staton Techiya, LLC*, IPR2022-00302, Paper 11, Exhibit-2006, Filed on Oct. 11, 2022—Cited in IPR2022-01106, challenging U.S. Pat. No. 11,039,259.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01078, challenging U.S. Pat. No. 11,057,701.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01098, challenging U.S. Pat. No. 11,217,237.
*Samsung Elecs. Co., Ltd., et al.* v. *Staton Techiya, LLC*, IPR2022-00302, Paper 11, Exhibit-2006, Filed on Oct. 7, 2022—Cited in IPR2022-01099, challenging U.S. Pat. No. 11,244,666.
Samsung's Claim Construction Brief, Exhibit-2012, Filed on Jan. 12, 2023—Cited in IPR2022-00282, challenging U.S. Pat. No. 8,315,400.
Samsung's Responsive Claim Construction Brief, Exhibit-2012, Filed on Apr. 10, 2023—Cited in IPR2022-01106, challenging U.S. Pat. No. 11,039,259.
Scheduling Order, Exhibit-11, Filed on Jan. 9, 2023—Cited in IPR2022-01106, challenging U.S. Pat. No. 11,039,259.
Scheduling Order, Exhibit-11, Filed on Dec. 30, 2022—Cited in IPR2022-01078, challenging U.S. Pat. No. 11,057,701.
Scheduling Order, Exhibit-14, Filed on Jul. 12, 2022—Cited in IPR2022-00302, challenging U.S. Pat. No. 9,609,424.
Scheduling Order, Exhibit-14, Filed on Jul. 12, 2022—Cited in IPR2022-00324, challenging U.S. Pat. No. 8,254,591.
Scheduling Order, Exhibit-14, Filed on Jul. 15, 2022—Cited in IPR2022-00253, challenging U.S. Pat. No. 9,491,542.
Scheduling Order, Exhibit-14, Filed on Jul. 15, 2022—Cited in IPR2022-00281, challenging U.S. Pat. No. 9,270,244.
Scheduling Order, Exhibit-14, Filed on Aug. 16, 2022—Cited in IPR2022-00388, challenging U.S. Pat. No. 10,966,015.
Scheduling Order, Exhibit-15, Filed on Aug. 16, 2022—Cited in IPR2022-00369, challenging U.S. Pat. No. 10,405,082.
Scheduling Order, Exhibit-16, Filed on Jun. 21, 2022—Cited in IPR2022-00243, challenging U.S. Pat. No. 8,111,839.
Scheduling Order, Exhibit-17, Filed on Jun. 21, 2022—Cited in IPR2022-00242, challenging U.S. Pat. No. 8,111,839.
Scheduling Order, Exhibit-9, Filed on Aug. 22, 2024—Cited in IPR2024-00559, challenging U.S. Pat. No. 11,610,587.
*Staton Techiya* v *Samsung*—Docket Control Order, Exhibit-2003, Filed on Apr. 18, 2022—Cited in IPR2022-00253, challenging U.S. Pat. No. 9,491,542.
*Staton Techiya* v *Samsung*—Docket Control Order, Exhibit-2003, Filed on Apr. 18, 2022—Cited in IPR2022-00281, challenging U.S. Pat. No. 9,270,244.
*Staton Techiya* v *Samsung*, Docket Control Order, Exhibit-2003, Filed on Mar. 21, 2022—Cited in IPR2022-00282, challenging U.S. Pat. No. 8,315,400.
*Staton Techiya* v *Samsung*, Docket Control Order, Exhibit-2003, Filed on Apr. 13, 2022—Cited in IPR2022-00302, challenging U.S. Pat. No. 9,609,424.
*Staton Techiya* v *Samsung*, Docket Control Order, Exhibit-2003, Filed on Apr. 13, 2022—Cited in IPR2022-00324, challenging U.S. Pat. No. 8,254,591.
*Staton Techiya* v. *Samsung*, Claim Construction Order, Exhibit-2012, Filed on Mar. 23, 2023—Cited in IPR2022-01078, challenging U.S. Pat. No. 11,057,701.
*Staton Techiya* v. *Samsung*, Docket Control Order, Exhibit-2003, Filed on Mar. 23, 2022—Cited in IPR2022-00242, challenging U.S. Pat. No. 8,111,839.
*Staton Techiya* v. *Samsung*, Docket Control Order, Exhibit-2003, Filed on Mar. 23, 2022—Cited in IPR2022-00243, challenging U.S. Pat. No. 8,111,839.
*Staton Techiya* v. *Samsung*, Docket Control Order, Exhibit-2003, Filed on May 18, 2022—Cited in IPR2022-00369, challenging U.S. Pat. No. 10,405,082.
*Staton Techiya* v. *Samsung*, Docket Control Order, Exhibit-2003, Filed on May 18, 2022—Cited in IPR2022-00388, challenging U.S. Pat. No. 10,966,015.
*Staton Techiya* v. *Samsung*, Docket Control Order, Exhibit-2003, Filed on May 18, 2022—Cited in IPR2022-00410, challenging U.S. Pat. No. 10,979,836.
*Staton Techiya* v. *Samsung*, Docket Control Order; Exhibit-2003, Filed on Mar. 21, 2022—Cited in IPR2022-00234, challenging U.S. Pat. No. 9,124,982.
*Staton Techiya* v. *Samsung*, Joint Motion to Consolidate, Exhibit-2005, Filed on Apr. 29, 2022—Cited in IPR2022-00242, challenging U.S. Pat. No. 8,111,839.
*Staton Techiya* v. *Samsung*, Joint Mtn to Consolidate, Exhibit-2005, Filed on Apr. 29, 2022—Cited in IPR2022-00243, challenging U.S. Pat. No. 8,111,839.
*Staton Techiya* v. *Samsung*, Joint Mtn to Consolidate, Exhibit-2008, Filed on Apr. 29, 2022—Cited in IPR2022-00282, challenging U.S. Pat. No. 8,315,400.
*Staton Techiya* v. *Samsung*, P.R. 4-5(d) Joint Claim Construction Chart, Exhibit-2011, Filed on Mar. 23, 2023—Cited in IPR2022-01078, challenging U.S. Pat. No. 11,057,701.
*Staton Techiya, LLC* v. *Samsung Elecs. Co., Ltd.*, Appendix B to P.R. 4-3 Statement, Exhibit-2007, Filed on Nov. 8, 2022—Cited in IPR2022-00369, challenging U.S. Pat. No. 10,405,082.
*Staton Techiya, LLC* v. *Samsung Elecs. Co., Ltd.*, Appendix B to P.R. 4-3 Statement, Exhibit-2009, Filed on Nov. 18, 2022—Cited in IPR2022-01078, challenging U.S. Pat. No. 11,057,701.

(56) References Cited

OTHER PUBLICATIONS

*Staton Techiya, LLC* v. *Samsung Elecs. Co., Ltd.*, Appendix B to P.R. 4-3 Statement, Exhibit-2010, Filed on Nov. 8, 2022—Cited in IPR2022-00388, challenging U.S. Pat. No. 10,966,015.
*Staton Techiya, LLC* v. *Samsung Elecs., Co., Ltd.*, Appendix B to P.R. 4-3 Statement, Exhibit-2011, Filed on Nov. 18, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit-2004, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Defendants' P.R. 4-2 Disclosures, Exhibit-2004, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Docket Control Order (Dkt. No. 43), Exhibit-2005, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Docket Control Order, Exhibit-2005, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Joint Motion to Consolidate (Dkt. No. 39), Exhibit-2007, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Joint Motion to Consolidate, Exhibit-2007, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiff's Infringement Contentions, dated Apr. 6, 2022, Exhibit-2008, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Plaintiff's P.R. 4-2 Disclosures, Exhibit-2003, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' Infringement Contentions dated Apr. 6, 2022, Exhibit-2008, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' Infringement Contentions, dated Apr. 6, 2022, Exhibit-2008, Filed on Oct. 7, 2022—Cited in IPR2022-01098, challenging U.S. Pat. No. 11,217,237.
*Staton Techiya, LLC, et al.* v. *Samsung Elecs. Co., Ltd., et al.*, Plaintiffs' Infringement Contentions, dated Apr. 6, 2022, Exhibit-2008, Filed on Oct. 7, 2022—Cited in IPR2022-01099, challenging U.S. Pat. No. 11,244,666.
*Staton Techiya, LLC, et al.* v. *Samsung Elecs. Co., Ltd., et al.*, Plaintiffs' P.R. 4-2 Disclosures, Exhibit-2003, Filed on Oct. 11, 2022—Cited in IPR2022-01106, challenging U.S. Pat. No. 11,039,259.
*Staton Techiya, LLC, et al.* v. *Samsung Elecs. Co., Ltd., et al.*, Plaintiffs' P.R. 4-2 Disclosures, Exhibit-2003, Filed on Oct. 7, 2022—Cited in IPR2022-01078, challenging U.S. Pat. No. 11,057,701.
*Staton Techiya, LLC, et al.* v. *Samsung Elecs. Co., Ltd., et al.*, Plaintiffs' P.R. 4-2 Disclosures, Exhibit-2003, Filed on Oct. 7, 2022—Cited in IPR2022-01098, challenging U.S. Pat. No. 11,217,237.
Stipulation Letter dated Apr. 20, 2022, Exhibit-1031, Filed on May 11, 2022—Cited in IPR2022-00324, challenging U.S. Pat. No. 8,254,591.
Stipulation Letter from D. Rokach to J. Snodgrass, Exhibit-1025, Filed on Nov. 10, 2022—Cited in IPR2022-01099, challenging U.S. Pat. No. 11,244,666.
Stipulation Letter from D. Rokach to J. Snodgrass, Exhibit-1027, Filed on Nov. 10, 2022—Cited in IPR2022-01078, challenging U.S. Pat. No. 11,057,701.
Stipulation Letter from D. Rokach to J. Snodgrass, Exhibit-1030, Filed on Nov. 15, 2022—Cited in IPR2022-01098, challenging U.S. Pat. No. 11,217,237.
Stipulation Letter from D. Rokach to J. Snodgrass, Exhibit-1033, Filed on Nov. 10, 2022—Cited in IPR2022-01106, challenging U.S. Pat. No. 11,039,259.
Stipulation Letter, Exhibit-1015, Filed on Apr. 20, 2022—Cited in IPR2022-00282, challenging U.S. Pat. No. 8,315,400.
Stipulation Letter, Exhibit-1019, Filed on Jun. 14, 2022—Cited in IPR2022-00369, challenging U.S. Pat. No. 10,405,082.
Stipulation Letter, Exhibit-1019, Filed on Jun. 14, 2022—Cited in IPR2022-00388, challenging U.S. Pat. No. 10,966,015.
Stipulation Letter, Exhibit-1020, Filed on Jun. 14, 2022—Cited in IPR2022-00410, challenging U.S. Pat. No. 10,979,836.
Stipulation Letter, Exhibit-1023, Filed on May 10, 2022—Cited in IPR2022-00302, challenging U.S. Pat. No. 9,609,424.
Stipulation Letter, Exhibit-1044, Filed on Apr. 20, 2022—Cited in IPR2022-00242, challenging U.S. Pat. No. 8,111,839.
Stipulation Letter, Exhibit-1044, Filed on Apr. 20, 2022—Cited in IPR2022-00243, challenging U.S. Pat. No. 8,111,839.
Stipulation Letter; Exhibit-1034, Filed on Apr. 20, 2022—Cited in IPR2022-00234, challenging U.S. Pat. No. 9,124,982.
Summary of all applications in the '082 patent family, Exhibit-1018, Filed on Dec. 30, 2021—Cited in IPR2022-00369, challenging U.S. Pat. No. 10,405,082.
Summary of all applications in the '836 patent's family, Exhibit-1019, Filed on Jan. 14, 2022—Cited in IPR2022-00410, challenging U.S. Pat. No. 10,979,836.
Summary of Application in '839 Patent Priority Chain, Exhibit-1041, Filed on Dec. 13, 2021—Cited in IPR2022-00243, challenging U.S. Pat. No. 8,111,839.
Summary of applications in '015 patent family, Exhibit-1018, Filed on Jan. 4, 2022—Cited in IPR2022-00388, challenging U.S. Pat. No. 10,966,015.
Summary of applications in '591 priority chain, Exhibit-1030, Filed on Dec. 20, 2021—Cited in IPR2022-00324, challenging U.S. Pat. No. 8,254,591.
Summary of Applications in '839 Priority Chain, Exhibit-1041, Filed on Dec. 13, 2021—Cited in IPR2022-00242, challenging U.S. Pat. No. 8,111,839.
Summary of Applications in '982 Priority Chain; Exhibit-1032, Filed on Dec. 13, 2021—Cited in IPR2022-00234, challenging U.S. Pat. No. 9,124,982.
Techopedia, Faceplate, Exhibit-2011, Filed on Sep. 13, 2022—Cited in IPR2022-00242, challenging U.S. Pat. No. 8,111,839.
Techopedia, Faceplate; Exhibit-2010, Filed on Sep. 9, 2022—Cited in IPR2022-00234, challenging U.S. Pat. No. 9,124,982.
Termination Decision: Post-DI Settlement, Exhibit-20, Filed on Dec. 12, 2024—Cited in IPR2024-00559, challenging U.S. Pat. No. 11,610,587.
Termination Decision: Pre-DI settlement, Exhibit-16, Filed on Dec. 12, 2024—Cited in IPR2024-01003, challenging U.S. Pat. No. 9,191,083.
Termination Decision: Pre-DI settlement, Exhibit-16, Filed on Dec. 12, 2024—Cited in IPR2024-01004, challenging U.S. Pat. No. 9,614,943.
Termination Decision: Pre-DI settlement, Exhibit-16, Filed on Dec. 12, 2024—Cited in IPR2024-01031, challenging U.S. Pat. No. 7,049,850.

(56) References Cited

OTHER PUBLICATIONS

Termination Decision: Pre-DI settlement, Exhibit-17, Filed on Dec. 12, 2024—Cited in IPR2024-01034, challenging U.S. Pat. No. 9,279,263.
Termination Decision: Pre-DI settlementPaper15,Dec. 12, 2024—Cited in IPR2024-01033, challenging U.S. Pat. No. 8,434,966.
Transcript of Deposition of Chris Kyriakakis, Ph.D. taken Oct. 7, 2022, Exhibit-2007, Filed on Oct. 17, 2022—Cited in IPR2022-00302, challenging U.S. Pat. No. 9,609,424.
Transcript of Deposition of Christopher Struck, Exhibit-1028, Filed on Jun. 15, 2023—Cited in IPR2022-01078, challenging U.S. Pat. No. 11,057,701.
Transcript of Deposition of Dr. Les Atlas, Exhibit-2007, Filed on Oct. 17, 2022—Cited in IPR2022-00324, challenging U.S. Pat. No. 8,254,591.
Transcript of Deposition of Dr. Les Atlas; Exhibit-2007, Filed on Sep. 9, 2022—Cited in IPR2022-00234, challenging U.S. Pat. No. 9,124,982.
Transcript of Deposition of Les Atlas, Ph.D., Aug. 18, 2022, Exhibit-2007, Filed on Sep. 13, 2022—Cited in IPR2022-00242, challenging U.S. Pat. No. 8,111,839.
Transcript of Deposition of Les Atlas, Ph.D., Aug. 18, 2022, Exhibit-2007, Filed on Sep. 13, 2022—Cited in IPR2022-00243, challenging U.S. Pat. No. 8,111,839.
Transcript of Deposition of Les Atlas, Ph.D., Exhibit-2016, Filed on Apr. 10, 2023—Cited in IPR2022-01106, challenging U.S. Pat. No. 11,039,259.
Transcript of Deposition of Nathaniel Polish, Ph.D., taken Sep. 29, 2022, Exhibit-2007, Filed on Oct. 19, 2022—Cited in IPR2022-00253, challenging U.S. Pat. No. 9,491,542.
Transcript of Deposition of Nathaniel Polish, Ph.D., taken Sep. 29, 2022, Exhibit-2007, Filed on Oct. 19, 2022—Cited in IPR2022-00281, challenging U.S. Pat. No. 9,270,244.
Transcript of Deposition of Richard M. Stern, Exhibit-2010, Filed on Mar. 23, 2023—Cited in IPR2022-01078, challenging U.S. Pat. No. 11,057,701.
Transcript of Deposition of Richard M. Stern, Ph.D., taken Oct. 27, 2022, Exhibit-2009, Filed on Nov. 8, 2022—Cited in IPR2022-00369, challenging U.S. Pat. No. 10,405,082.
Transcript of Deposition of Richard M. Stern, Ph.D., taken Oct. 27, 2022, Exhibit-2009, Filed on Nov. 8, 2022—Cited in IPR2022-00388, challenging U.S. Pat. No. 10,966,015.
Transcript of Deposition of Richard Stern, Ph.D., Exhibit-2010, Filed on Sep. 9, 2022—Cited in IPR2022-00282, challenging U.S. Pat. No. 8,315,400.
U.S. Appl. No. 09/653,869, Exhibit-1007, Filed on Dec. 20, 2021—Cited in IPR2022-00324, challenging U.S. Pat. No. 8,254,591.
U.S. Pat. No. 10,405,082, Exhibit-1001, Filed on Dec. 30, 2021—Cited in IPR2022-00369, challenging U.S. Pat. No. 10,405,082.
U.S. Appl. No. 61/778,737, Exhibit-1008, Filed on Dec. 12, 2021—Cited in IPR2022-00281, challenging U.S. Pat. No. 9,270,244.
U.S. Appl. No. 62/575,713, Exhibit-1006, Filed on Dec. 30, 2021—Cited in IPR2022-00369, challenging U.S. Pat. No. 10,405,082.
U.S. Appl. No. 62/575/713, Exhibit-1006, Filed on Jan. 4, 2022—Cited in IPR2022-00388, challenging U.S. Pat. No. 10,966,015.
Wikipedia, Apple headphones, Exhibit-2010, Filed on Sep. 13, 2022—Cited in IPR2022-00243, challenging U.S. Pat. No. 8,111,839.
Wikipedia, Microphone, Exhibit-2012, Filed on Sep. 13, 2022—Cited in IPR2022-00242, challenging U.S. Pat. No. 8,111,839.
Wikipedia, Microphone; Exhibit-2011, Filed on Sep. 9, 2022—Cited in IPR2022-00234, challenging U.S. Pat. No. 9,124,982.
Wiley Elec and Elecs Eng Dictionary (excerpts), Exhibit-2004, Filed on Mar. 21, 2022—Cited in IPR2022-00282, challenging U.S. Pat. No. 8,315,400.
Wiley Electrical and Electronics Engineering Dictionary (excerpt), Exhibit-2009, Filed on Oct. 7, 2022—Cited in IPR2022-01098, challenging U.S. Pat. No. 11,217,237.
3M/Aearo Technologies' E-A-RFitTM Dual-Ear Validation System ("E-A-RFit"), Sep. 4, 2015 WayBack Machine capture of 3M's website contains an image of the E-A-RFit and states "[t]he 3M™ E-A-Rfit™ Dual Ear Validation System makes . . . " https://web.archive.org/web/20150904132810/ http:/solutions.3m.com/wps/portal/3M/en_US/3M-PPE-Safety-Solutions/Personal- Protective-Equipment/safety-management/safety-training/hearing- protection-fit-testing/?WT.mc_id=www.3m.com/EARfitDe mo/ (SAM-TECH_00052276; SAM-TECH ; SAM-TECH 00052239), 2 pgs.
Chung, Challenges and Recent Developments in Hearing Aids, Trends in Amplification, 2004, pp. 125-164, vol. 8, No. 4, 42 pages.
Declaration and Affirmation of Debbie Montgomery, as presented in *Samsung* v. *Techiya*, IPR2022-00410 as Exhibit 1018, including that Declaration's attached Exhibit A (2022), 10 pages.
Exhibit E9—Invalidity of U.S. Pat. No. 9,270,244 ("the '244 Patent") in view of U.S. Pat. No. 6,567,524 ("Svean"), pp. 1-55 (date not available), 55 pages.
Exhibit F5—Invalidity of U.S. Pat. No. 9,491,542 ("the '542 Patent") in view of U.S. Pat. App. Pub. 2011/0293103 ("Park"), pp. 1-81 (date not available), 81 pages.
Exhibit H5—Invalidity of U.S. Pat. No. 10,405,082 ("the '082 Patent") in view of U.S. Pat. Appl. Pub. No. 2014/0163976, pp. 1-151 (date not available), 151 pages.
File History of corresponding Reexamination U.S. Appl. No. 90/015,146, filed Oct. 28, 2022, 1270 pages.
File History of corresponding Reexamination U.S. Appl. No. 90/019,169, filed Feb. 24, 2023, Reexamination Certificate Issued Oct. 11, 2023 as U.S. Pat. No. 11,244,666 C1., 998 pages.
Mueller, There's less talking in barrels, but the occlusion effect is still with us, The Hearing Journal, Aug. 2003, pp. 10-16, vol. 56, No. 8, 4 pages.
Muggleton, Nacre's Quietpro+ Intelligent Hearing System: Delivering Performance and Hearing Protection Now for the Future of the Soldier, SoldierMod Jan. 2009, pp. 28-29, vol. 2.
Samsung's Motion for Summary Judgment of Invalidity under 35 U.S.C. §112 of the '666 Patent (Redacted) (Dkt. No. 457), Jun. 26, 2023, 78 pages.
Samsung's Reply in Support of Its Motion for Summary Judgment of Invalidity under 35 U.S.C. § 112 of the '666 Patent (Redacted) (Dkt. No. 556), Aug. 7, 2023, 22 pages.
Strand, et al. On the Feasibility of ASR in Extreme Noise Using the Parat Earplug Communication Terminal, IEEE, 2003, pp. 315-320.
Techiya's Opposition to Samsung's Motion for Summary Judgment of Invalidity under 35 U.S.C. § 112 of the '666 Patent (Redacted) (Dkt. No. 515), Jul. 24, 2023, 30 pages.
Techiya's Sur-Reply to Samsung's Motion for Summary Judgment of Invalidity under 35 U.S.C. § 112 of the '666 Patent (Dkt. No. 587), Aug. 21, 2023, 5 pages.
Vraalsen, A Multimodal Context Aware Mobile Maintenance Terminal for Noisy Environments, 2004, pp. 79-92.
Zhengyou Zhang, et al., Multi-Sensory Microphones for Robust Speech Detection, Enhancement and Recognition, Microsoft Research, 2004, 4 pages.

* cited by examiner

METHOD AND DEVICE FOR ACUTE SOUND DETECTION AND REPRODUCTION

CROSS-REFERENCE TO RELATED APPLICATION(S)

This is a continuation of and claims priority to U.S. patent application Ser. No. 17/592,143 filed 3 Feb. 2022, which is a continuation of and claims priority to U.S. patent application Ser. No. 17/321,892, filed 17 May 2021, which is a continuation of and claims priority to U.S. patent application Ser. No. 16/987,396, filed 7 Aug. 2020, which is a continuation of and claims priority to U.S. patent application Ser. No. 16/669,490, filed 30 Oct. 2019, which is a continuation of and claims priority to U.S. patent application Ser. No. 16/193,568, filed 16 Nov. 2018, now U.S. Pat. No. 10,535,334, which is a continuation of and claims priority to U.S. patent application Ser. No. 14/574,589, filed on Dec. 18, 2014, now U.S. Pat. No. 10,134,377, which claims priority to and is a continuation of U.S. patent application Ser. No. 12/017,878, filed on Jan. 22, 2008, now U.S. Pat. No. 8,917,894, which claims the benefit of U.S. Provisional Patent Application Ser. No. 60/885,917, filed on Jan. 22, 2007, all of which are herein incorporated by reference in their entireties.

FIELD OF THE INVENTION

The present invention relates to a device that monitors sound directed to an occluded ear, and more particularly, though not exclusively, to an earpiece and method of operating an earpiece that detects acute sounds and allows the acute sounds to be reproduced in an ear canal of the occluded ear.

BACKGROUND

Since the advent of industrialization over two centuries ago, the human auditory system has been increasingly stressed to tolerate high noise levels to which it had hitherto been unexposed. Recently, human knowledge of the causes of hearing damage have been researched intensively and models for predicting hearing loss have been developed and verified with empirical data from decades of scientific research. Yet it can be strongly argued that the danger of permanent hearing damage is more present in our daily lives than ever, and that sound levels from personal audio systems in particular (i.e. from portable audio devices), live sound events, and the urban environment are a ubiquitous threat to healthy auditory functioning across the global population.

Environmental noise is constantly presented in industrialized societies given the ubiquity of external sound intrusions. Examples include people talking on their cell phones, blaring music in health clubs, or the constant hum of air conditioning systems in schools and office buildings.

Excess noise exposure can also induce auditory fatigue, possibly comprising a person's listening abilities. On a daily basis, people are exposed to various environmental sounds and noises within their environment, such as the sounds from traffic, construction, and industry.

To combat the undesired cacophony of annoying sounds, people are arming themselves with portable audio playback devices to drown out intrusive noise. The majority of devices providing the person with audio content do so using insert (or in-ear) earbuds. These earbuds deliver sound directly to the ear canal at high sound levels over the background noise even though the earbuds generally provide little to no ambient sound isolation. Moreover, when people wear earbuds (or headphones) to listen to music, or engage in a call using a telephone, they can effectively impair their auditory judgment and their ability to discriminate between sounds. With such devices, the person is immersed in the audio experience and generally less likely to hear warning sounds within their environment. In some cases, the user may even tum up the volume to hear their personal audio over environmental noises. It also puts them at high sound exposure risk which can potentially cause long term hearing damage.

With earbuds, personal audio reproduction levels can reach in excess of 100 dB. This is enough to exceed recommended daily sound exposure levels in less than a minute and to cause permanent acoustic trauma. Furthermore, rising population densities have continually increased sound levels in society. According to researchers, 40% of the European community is continuously exposed to transportation noise of 55 dBA and 20% are exposed to greater than 65 dBA. This level of 65 dBA is considered by the World Health Organization to be intrusive or annoying, and as mentioned, can lead to users of personal audio devices increasing reproduction levels to compensate for ambient noise. A need therefore exists for enhancing the user's ability to listen in the environment without harming his or her hearing faculties.

SUMMARY

Embodiments in accordance with the present invention provide a method and device for acute sound detection and reproduction.

In a first embodiment, an earpiece can include an Ambient Sound Microphone (ASM) to capture ambient sound, at least one Ear Canal Receiver (ECR) to deliver audio to an ear canal; and a processor operatively coupled to the ASM and the at least one ECR. The processor can monitor a change in the ambient sound level to detect an acute sound from the change. The acute sound can be reproduced within the ear canal via the ECR responsive to detecting the acute sound.

The processor can pass (transmit) sound from the ASM directly to the ECR to produce sound within the ear canal at a same sound pressure level (SPL) as the acute sound measured at an entrance to the ear canal. In one arrangement, the processor can maintain an approximately constant ratio between an audio content level (ACL) and an internal ambient sound level (iASL) measured within the ear canal. In one arrangement, the processor can measure an external ambient sound level (xASL) of the ambient sound with the ASM and subtract an attenuation level of the earpiece from the xASL to estimate the internal ambient sound level (iASL) within the ear canal.

The earpiece can further include an Ear Canal Microphone (ECM) to measure an ear canal sound level (ECL) within the ear canal. In this configuration, the processor can estimate the internal ambient sound level (iASL) within the ear canal by subtracting an estimated audio content sound level (ACL) from the ECL. For instance, the processor can measure a voltage level of the audio content sent to the ECR, and apply a transfer function of the ECR to convert the voltage level to the ACL. The processor can be located external to the earpiece on a portable computing device.

In a second embodiment, an earpiece can comprise an Ambient Sound Microphone (ASM) to capture ambient sound, at least one Ear Canal Receiver (ECR) to deliver audio to an ear canal, an audio interface operatively coupled to the processor to receive audio content, and a processor operatively coupled to the ASM and the at least one ECR. The processor can monitor a change in the ambient sound level to detect an acute sound from the change, adjust an audio content level (ACL) of the audio content delivered to the ear canal, and reproduce the acute sound within the ear canal via the ECR responsive to detecting the acute sound and based on the ACL.

The audio interface can receive the audio content from at least one among a portable music player, a cell phone, and a portable communication device. During operation, the processor can maintain an approximately constant ratio between an audio content level (ACL) and an internal ambient sound level (iASL) measured within the ear canal. In one arrangement, the processor can mute the audio content and pass the acute sound to the ECR for reproducing the acute sound within the ear canal. In another arrangement, the processor can amplify the acute sound with respect to the audio content level (ACL).

In a third embodiment, a method for acute sound detection and reproduction can include the steps of measuring an ambient sound level (xASL) of ambient sound external to an ear canal at least partially occluded by the earpiece, monitoring a change in the xASL for detecting an acute sound, and reproducing the acute sound within the ear canal responsive to detecting the acute sound. The reproducing can include enhancing the acute sound over the ambient sound. The step of reproducing can produce sound within the ear canal at a same sound pressure level (SPL) as the acute sound measured at an entrance to the ear canal.

The method can further include receiving audio content from an audio interface that is directed to the ear canal, and maintaining an approximately constant ratio between a level of the audio content (ACL) and a level of an internal ambient sound level (iASL) measured within the ear canal. The ACL can be determined by measuring a voltage level of the audio content sent to the ECR, and applying a transfer function of the ECR to convert the voltage level to the ACL. The method can further include measuring an Ear Canal Level (ECL) within the ear canal, and subtracting the ACL from the ECL to estimate the iASL. The iASL can be estimated by subtracting an attenuation level of the earpiece from the xASL.

In a fourth embodiment, a method for acute sound detection and reproduction suitable for use with an earpiece can include the steps of measuring an external ambient sound level (xASL) in an ear canal at least partially occluded by the earpiece, monitoring a change in the xASL for detecting an acute sound, estimating a proximity of the acute sound, and reproducing the acute sound within the ear canal responsive to detecting the acute sound based on the proximity. The step of estimating a proximity can include performing a cross correlation analysis between at least two microphones, identifying a peak in the cross correlation and an associated time lag, and determining the direction from the associated time lag. The method can further include identifying whether the acute sound is a vocal signal produced by a user operating the earpiece or a sound source external from the user.

In a fifth embodiment, a method for acute sound detection and reproduction suitable for use with an earpiece can include measuring an external ambient sound level (xASL) due to ambient sound outside of an ear canal at least partially occluded by the earpiece, measuring an internal ambient sound level (iASL) due to residual ambient sound within the ear canal at least partially occluded by the earpiece, monitoring a high frequency change between the xASL and the iASL with respect to a low frequency change between the xASL and the iASL for detecting an acute sound, and reproducing the xASL within the ear canal responsive to detecting the high frequency change. The method can further include determining a proximity of a sound source producing the acute sound.

DETAILED DESCRIPTION

Figure 1:
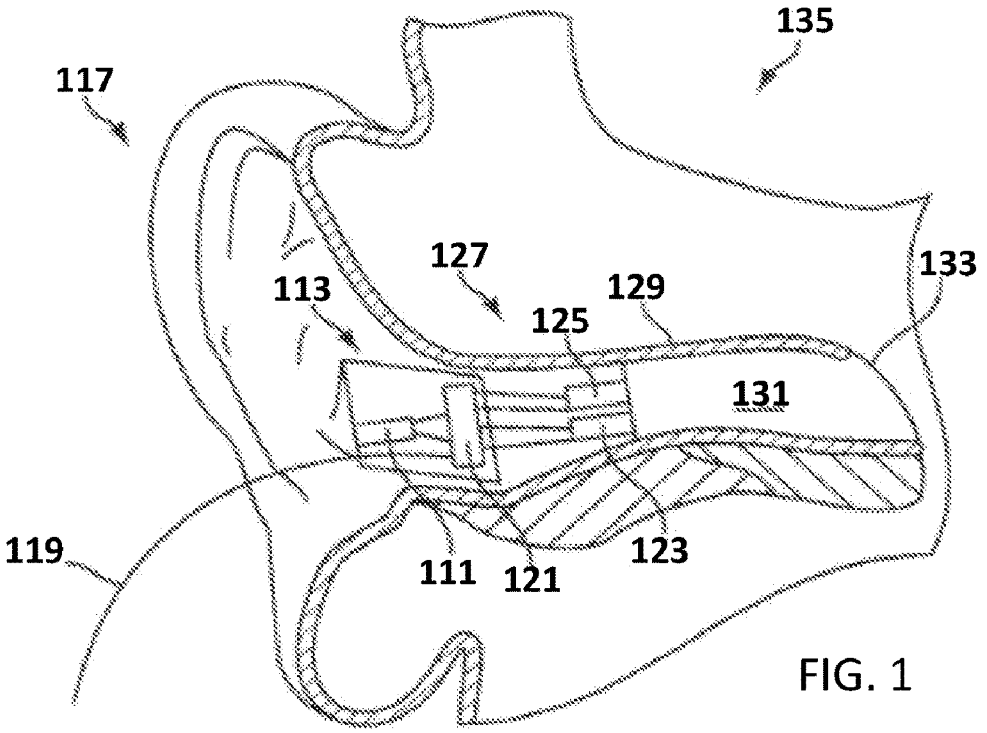
FIG. 1 is a pictorial diagram of an earpiece in accordance with an exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication and use of transducers. Additionally in at least one exemplary embodiment the sampling rate of the transducers can be varied to pick up pulses of sound, for example less than 50 milliseconds.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Note that herein when referring to correcting or preventing an error or damage (e.g., hearing damage), a reduction of the damage or error and/or a correction of the damage or error are intended.

At least one exemplary embodiment of the invention is directed to an earpiece for ambient sound monitoring and warning detection. Reference is made to FIG. 1 in which an earpiece device, generally indicated as earpiece 100, is constructed in accordance with at least one exemplary embodiment of the invention. As illustrated, earpiece 100 depicts an electro-acoustical assembly 113 for an in-the-ear acoustic assembly, as it would typically be placed in the ear canal 131 of a user 135. The earpiece 100 can be an in the ear earpiece, behind the ear earpiece, receiver in the ear, open-fit device, or any other suitable earpiece type. The earpiece 100 can be partially or fully occluded in the ear canal, and is suitable for use with users having healthy or abnormal auditory functioning.

Earpiece 100 includes an Ambient Sound Microphone (ASM) 111 to capture ambient sound, an Ear Canal Receiver (ECR) 125 to deliver audio to an ear canal 131, and an Ear Canal Microphone (ECM) 123 to assess a sound exposure level within the ear canal. The earpiece 100 can partially or fully occlude the ear canal 131 to provide various degrees of acoustic isolation. The assembly is designed to be inserted into the user's ear canal 131, and to form an acoustic seal with the walls 129 of the ear canal at a location 127 between the entrance 117 to the ear canal and the tympanic membrane (or ear drum) 133. Such a seal is typically achieved by means of a soft and compliant housing of assembly 113. Such a seal is pertinent to the performance of the system in that it creates a closed cavity 131 of approximately 5 cc between the in-ear assembly 113 and the tympanic membrane 133. As a result of this seal, the ECR (speaker) 125 is able to generate a full range bass response when reproducing sounds for the user. This seal also serves to significantly reduce the sound pressure level at the user's eardrum 133 resulting from the sound field at the entrance to the ear canal. This seal is also the basis for the sound isolating performance of the electro-acoustic assembly 113.

Located adjacent to the ECR 125, is the ECM 123, which is acoustically coupled to the (closed) ear canal cavity 131. One of its functions is that of measuring the sound pressure level in the ear canal cavity 131 as a part of testing the hearing acuity of the user as well as confirming the integrity of the acoustic seal and the working condition of itself and the ECR. The ASM 111 is housed in an assembly 113 and monitors sound pressure at the entrance to the occluded or partially occluded ear canal. All transducers shown can receive or transmit audio signals to a processor 121 that undertakes audio signal processing and provides a transceiver for audio via the wired or wireless communication path 119.

Figure 2:
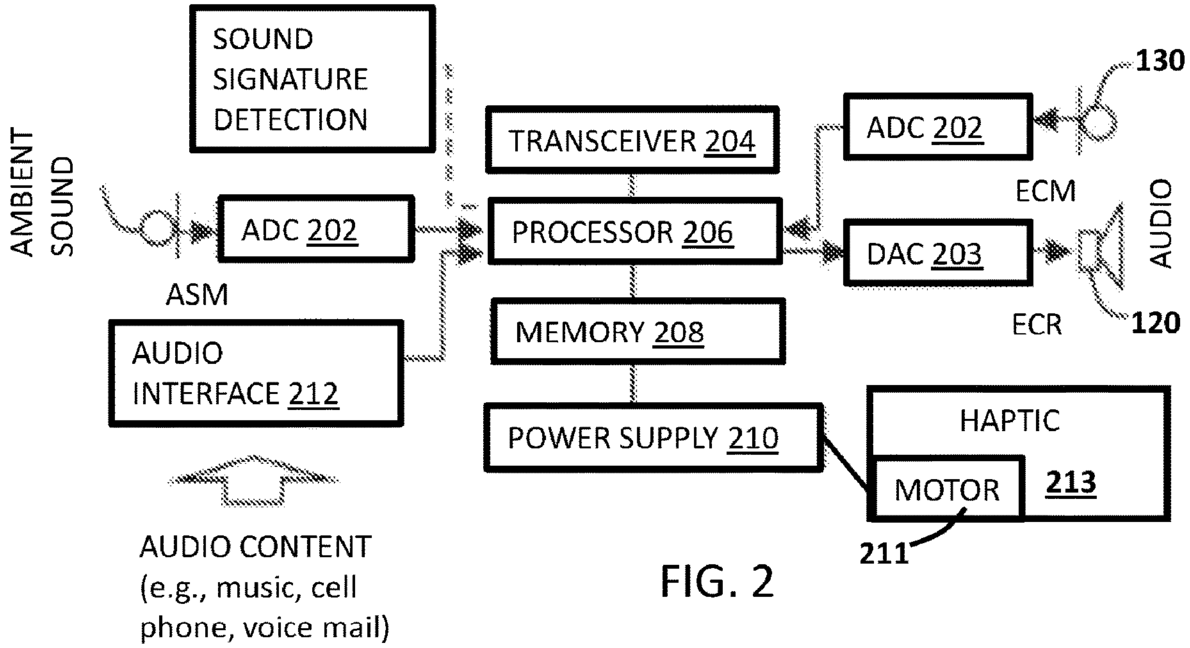
FIG. 2 is a block diagram of the earpiece in accordance with an exemplary embodiment.

Referring to FIG. 2, a block diagram of the earpiece 100 in accordance with an exemplary embodiment is shown. As illustrated, the earpiece 100 can include a processor 206 operatively coupled to the ASM 111, ECR 125, and ECM 123 via one or more Analog to Digital Converters (ADC) 202 and Digital to Analog Converters (DAC) 203. The processor 206 can monitor the ambient sound captured by the ASM 111 for acute sounds in the environment, such as an abrupt high energy sound corresponding to the on-set of a warning sound (e.g., bell, emergency vehicle, security system, etc.), siren (e.g., police car, ambulance, etc.), voice (e.g., "help", "stop", "police", etc.), or specific noise type (e.g., breaking glass, gunshot, etc.). The processor 206 can utilize computing technologies such as a microprocessor, Application Specific Integrated Chip (ASIC), and/or digital signal processor (DSP) with associated storage memory 208 such as Flash, ROM, RAM, SRAM, DRAM or other like technologies for controlling operations of the earpiece device 100. The memory 208 can store program instructions for execution on the processor 206 as well as captured audio processing data.

The earpiece 100 can include an audio interface 212 operatively coupled to the processor 206 to receive audio content, for example from a media player or cell phone, and deliver the audio content to the processor 206. The processor 206 responsive to detecting acute sounds can adjust the audio content and pass the acute sounds directly to the ear canal. For instance, the processor can lower a volume of the audio content responsive to detecting an acute sound for transmitting the acute sound to the ear canal. The processor 206 can also actively monitor the sound exposure level inside the ear canal and adjust the audio to within a safe and subjectively optimized listening level range.

The earpiece 100 can further include a transceiver 204 that can support singly or in combination any number of wireless access technologies including without limitation Bluetooth™, Wireless Fidelity (WiFi), Worldwide Interoperability for Microwave Access (WiMAX), and/or other short or long range communication protocols. The transceiver 204 can also provide support for dynamic downloading over-the-air to the earpiece 100. It should be noted also that next generation access technologies can also be applied to the present disclosure.

The power supply 210 can utilize common power management technologies such as replaceable batteries, supply regulation technologies, and charging system technologies for supplying energy to the components of the earpiece 100 and to facilitate portable applications. A motor 211 can be a single supply motor driver coupled to the power supply 210 to improve sensory input via haptic 213 vibration. As an example, the processor 206 can direct the motor to vibrate responsive to an action, such as a detection of a warning sound or an incoming voice call.

The earpiece 100 can further represent a single operational device or a family of devices configured in a master-slave arrangement, for example, a mobile device and an earpiece. In the latter embodiment, the components of the earpiece 100 can be reused in different form factors for the master and slave devices.

Figure 3:
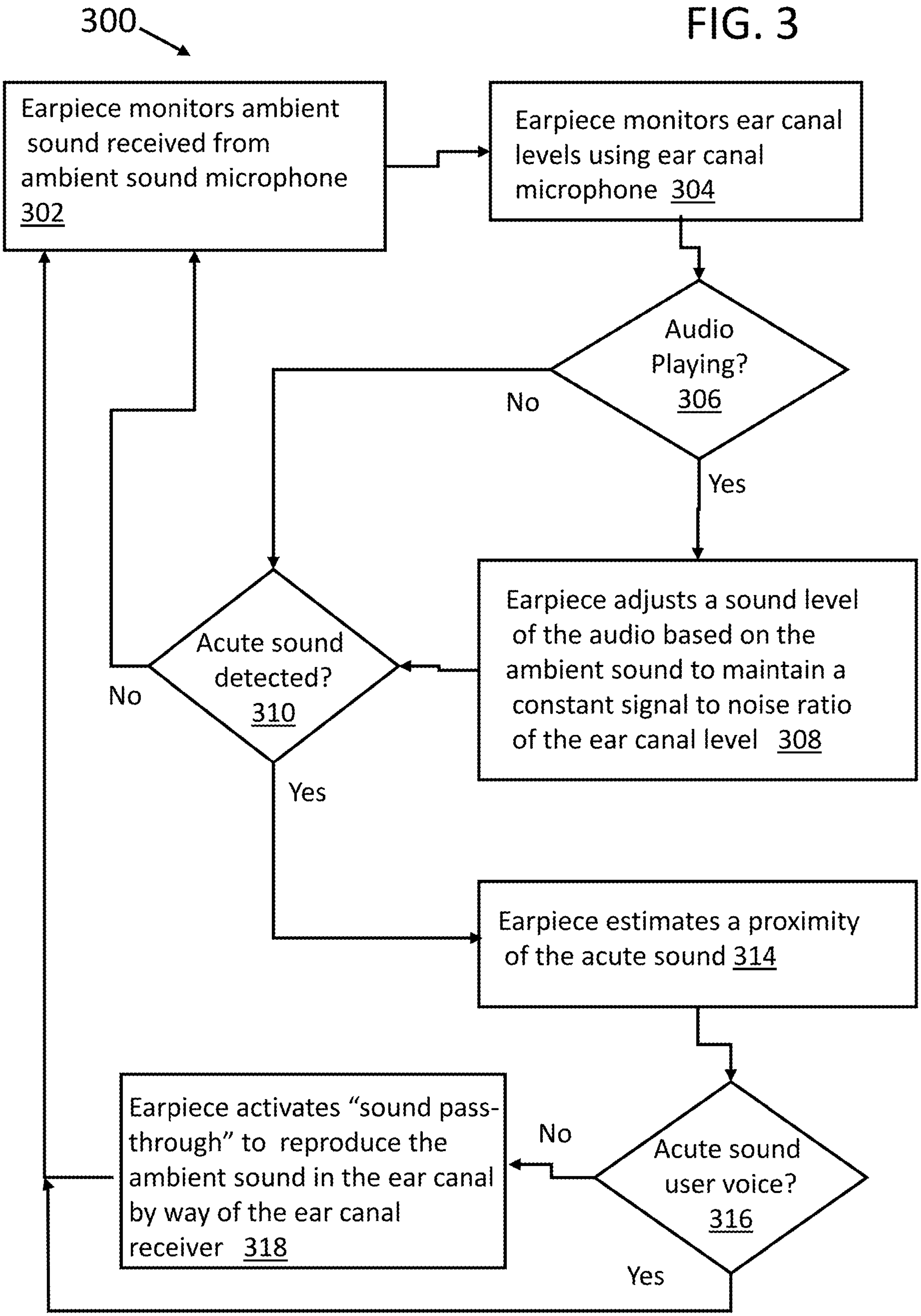
FIG. 3 is a flowchart of a method for acute sound detection in accordance with an exemplary embodiment.

FIG. 3 is a flowchart of a method 300 for acute sound detection and reproduction in accordance with an exemplary embodiment. The method 300 can be practiced with more or less than the number of steps shown and is not limited to the order shown. To describe the method 300, reference will be made to components of FIG. 2, although it is understood that the method 300 can be implemented in any other manner using other suitable components. The method 300 can be implemented in a single earpiece, a pair of earpieces, headphones, or other suitable headset audio delivery devices.

The method 300 can start in a state wherein the earpiece 100 has been inserted and powered on. As shown in step 302, the earpiece 100 can monitor the environment for ambient sounds received at the ASM 111. Ambient sounds correspond to sounds within the environment such as the sound of traffic noise, street noise, conversation babble, or any other acoustic sound. Ambient sounds can also correspond to industrial sounds present in an industrial setting, such as factory noise, lifting vehicles, automobiles, and robots to name a few.

Although the earpiece 100 when inserted in the ear can partially occlude the ear canal, the earpiece 100 may not completely attenuate the ambient sound. During the monitoring of ambient sounds in the environment, the earpiece 100 also monitors ear canal levels via the ECM 123 as shown in step 304. The passive aspect of the physical earpiece 100, due to the mechanical and sealing properties, can provide upwards of a 22-26 dB noise reduction. However, portions of ambient sounds higher than 26 dB can still pass through the earpiece 100 into the ear canal. For instance, high energy low frequency sounds are not completely attenuated. Accordingly, residual sound may be resident in the ear canal and heard by the user.

Sound within the ear canal 131 can also be provided via the audio interface 212. The audio interface 212 can receive the audio content from at least one among a portable music player, a cell phone, and a portable communication device.

The audio interface 212 responsive to user input can direct sound to the ECR 125. For instance, a user can elect to play music through the earpiece 100 which can be audibly presented to the ear canal 131 for listening. The user can also elect to receive voice communications (e.g., cell phone, voice mail, messaging) via the earpiece 100. For instance, the user can receive audio content for voice mail or a phone call directed to the ear canal via the ECR 125. As shown in step 304, the earpiece 100 can monitor ear canal levels due to ambient sound and user selected sound via the ECM 123.

If at step 306, audio is playing (e.g., music, cell phone, etc.), the earpiece 100 adjusts a sound level of the audio based on the ambient sound to maintain a constant signal to noise ratio with respect to the ear canal level at step 308. For instance, the processor 206 can selectively amplify or attenuate audio content received from the audio interface 212 before it is delivered to the ECR 125. The processor 206 estimates a background noise level from the ambient sound received at the ASM 111, and adjusts the audio level of delivered audio content (e.g., music, cell phone audio) to maintain a constant signal (e.g., audio content) to noise level (e.g., ambient sound). By way of example, if the background noise level increases due to traffic sounds, the earpiece 100 automatically increases the volume of the audio content. Similarly, if the background noise level decreases, the earpiece 100 automatically decreases the volume of the audio content. The processor 206 can track variations on the ambient sound level to adjust the audio content level.

If at step 310, an acute sound is detected within the ambient sound, the earpiece 100 activates "sound pass-through" to reproduce the ambient sound in the ear canal by way of the ECR 125. The processor 206 permits the ambient sound to pass through the ECR 125 to the ear canal 131 directly for example by replicating the ambient sound external to the ear canal within the ear canal. This is important if the acute sound corresponds to an on-set for a warning sound such as a bell, a car, or an object. In such regard, the ambient sound containing the acute sound is presented directly to the ear canal in an original form. Although, the earpiece 100 inherently provides attenuation due to the physical and mechanical aspects of the earpiece and its sealing properties, the processor 206 can reproduce the ambient sound within the ear canal 131 at an original amplitude level and frequency content to provide "transparency". For instance, the processor 206 measures and applies a transfer function of the ear canal to the passed ambient sound signal to provide an accurate reproduction of the ambient sound within the ear canal.

In one embodiment, the earpiece 100 looks for temporal and spectral characteristics in the ambient sound for detecting acute sounds. For instance, as will be explained ahead, the processor 206 looks for an abrupt change in the Sound Pressure Level (SPL) of an ambient sound across a small time period. The processor 206 can also detect abrupt magnitude changes across frequency sub-bands (e.g. filter-bank, FFT, etc.). Notably, the processor 206 can search for on-sets (e.g., fast rising amplitude wave-front) of an acute sound or other abrupt feature characteristics without initially attempting to initially identify or recognize the sound source. That is, the processor 206 is actively listening for a presence of acute sounds before identifying the type of sound source.

Even though the earplug inherently provides a certain attenuation level (e.g., noise reduction rating), the processor 206 in view of the ear canal level (ECL) and ambient sound level (ASL) can reproduce the ambient sound within the ear canal to allow the user to make an informed decision with regard to the acute sound. The ECL corresponds to all sounds within the ear canal and includes the internal ambient sound level (iASL) resulting from residual ambient sounds through the earpiece and the audio content level (ACL) resulting from the audio delivered via the audio interface 212. Briefly, xASL is the external ambient sound external to the ear canal and the earpiece (e.g., ambient sound outside the ear canal). iASL is the residual ambient sound that remains internal in the ear canal. The following equations describe the relationship among terms:

$$iASL = xASL - NRR \quad \text{(EQ 1)}$$

$$iASL = ECL - ACL \quad \text{(EQ 2)}$$

As EQ 1 shows, the iASL is the difference between the external ambient sound (xASL) and the attenuation of the earpiece (Noise Reduction Rating) due to the physical and sealing properties of the earpiece. The processor 206 can measure an external ambient sound level (xASL) of the ambient sound with the ASM 111 and subtracts an attenuation level of the earpiece (NRR) from the xASL to estimate the internal ambient sound level (iASL) within the ear canal.

EQ 2 is an alternate, or supplemental, method for calculating the iASL as the difference between the ECL and the Audio Content Level (ACL). By way of the ECM 123, the processor 206 can estimate an internal ambient sound level (iASL) within the ear canal by subtracting the estimated audio content sound level (ACL) from the ECL. The processor 206 measures a voltage level of the audio content sent to the ECR 125, and applies a transfer function of the ECR 125 to convert the voltage level to the ACL.

The processor 206 evaluates the equations above to pass sound from the ASM 111 directly to the ECR 125 to produce sound within the ear canal at a same sound pressure level (SPL) and frequency representation as the acute sound measured at an entrance to the ear canal. Further, the processor 206 can maintain an approximately constant ratio between an audio content level (ACL) and an internal ambient sound level (iASL) measured within the ear canal.

At step 314, the earpiece 100 can estimate a proximity of the acute sound. For instance, as will be shown ahead, the processor 206 can perform a correlation analysis on at least two microphones to determine whether the sound source is internal (e.g., the user) or external (e.g., an object other than the user). At step 316, the earpiece 100 determines whether it is the user's voice that generates the acute sound when the user speaks, or whether it is an external sound such as a vehicle approaching the user. If at step 316, the processor 206 determines that the acute sound is a result of the user speaking, the processor 206 does not activate a pass-through mode, since this is not considered an external warning sound. The pass-through mode permits ambient sound detected at the ASM 111 to be transmitted directly to the ear canal. If however, the acute sound corresponds to an external sound source, such as an on-set of a warning sound, the earpiece at step 318 activates "sound pass-through" to reproduce the ambient sound in the ear canal by way of the ECR 125. The earpiece 100 can also present an audible notification to the user indicating that an external sound source generating the acute sound has been detected. The method 300 can proceed back to step 302 to continually monitor for acute sounds in the environment.

Figure 4:
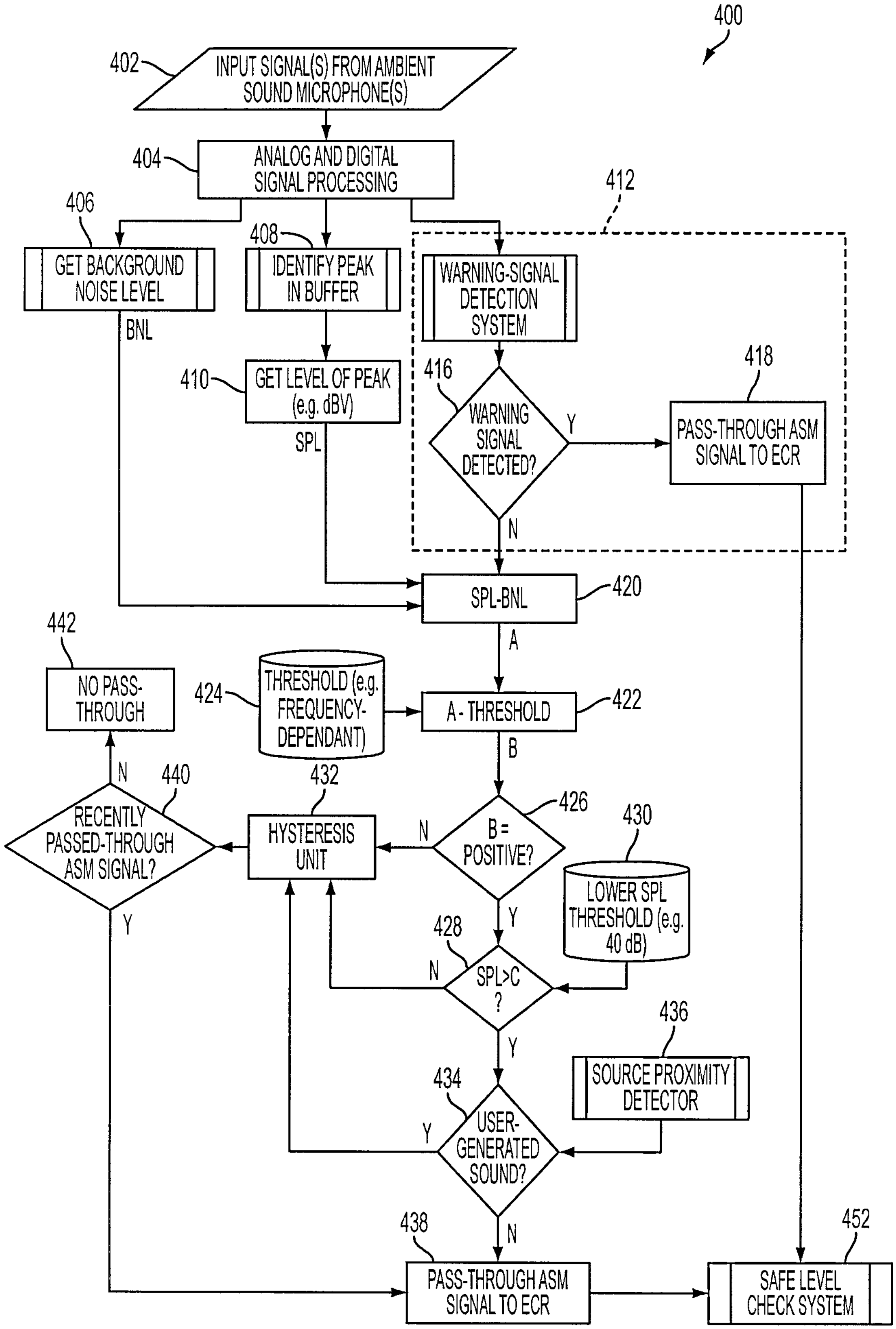
FIG. 4 is a more detailed approach to the method of FIG. 3 in accordance with an exemplary embodiment.

FIG. 4 is a detailed approach to the method 400 of FIG. 3 for an Acute-Sound Pass-Through System (ACPTS) in accordance with an exemplary embodiment. The method 400 can be practiced with more or less than the number of steps shown and is not limited to the order shown. To describe the method 400, reference will be made to components of FIG. 2, although it is understood that the method 400 can be implemented in any other manner using other suitable components. The method 400 can be implemented in a single earpiece, a pair of earpieces, headphones, or other suitable headset audio delivery devices.

At step 402, the earpiece 100 captures ambient sound signals from the ASM 111. At step 404, the processor 206 applies analog and discrete time signal processing to condition and compensate the ambient sound signal for the ASM 111 transducer. At step 406, the processor 206 estimates a background noise level (BNL) as will be discussed ahead. At step 408, the processor 206 identifies at least one peak in a data buffer storing a portion of the ambient sound signal. The processor 206 at step 410 gets a level of the peak (e.g., dBV). Block 412 presents a method for warning signal detection (e.g. car horns, klaxons). When a warning signal is detected at step 416, the processor 206 invokes at step 418 a pass-through mode whereby the ASM signal is reproduced with the ECR 125. Upon activating pass-through mode, the processor 206 can perform a safe level check at step 452. If a warning signal is not detected, the method 400 proceeds to step 420.

At step 420, the processor 206 subtracts the estimated BNL from an SPL of the ambient sound signal to produce signal "A". A high energy level transient signal is indicative of an acute sound. At step 422, a frequency dependent threshold is retrieved at step 424, and subtracted from signal "A", as shown in step 422 to produce signal "B". At step 426, the processor 206 determines if signal "B" is positive. If not, the processor 206 performs a hysterisis to determine if the acute sound has already been detected. If not, the processor at step 428 determines if an SPL of the ambient sound is greater than a signal "C" (e.g. threshold). If the SPL is greater than signal "C", the earpiece generates a user generated sound at step 434. The signal "C" is used to ensure that the SPL between the signal and background noise is positive and greater than a predetermined amount. For instance, a low SPL threshold (e.g., "C" 40 dB) can be used as shown in step 430, although it can adapt to different environmental conditions. The low SPL threshold provides an absolute measure to the SPL difference. At step 436, a proximity of a sound source generating the acute sound can be estimated as will be discussed ahead. The method 400 can continue to step 432.

Briefly, if a transient, high-level sound (or acute sound) is detected in the ambient sound signal (ASM input signal), then it is converted to a level, and its magnitude compared with the BNL is calculated. The magnitude of this resulting difference (signal "A") is compared with the threshold (see step 422). If the value is positive, and the level of the transient is greater than a predefined threshold (see step 428), the processor 206 invokes the optional Source Proximity Detector at step 436, which determines if the acute sound was created by the User's voice (i.e., a user generated sound). If a user-generated sound is NOT detected, then Pass-through operation at step 438 is invoked, whereby the ambient sound signal is reproduced with the ECR 125. If the difference signal at step 428 is not positive, or the level of the identified transient is too low, then the hysteresis is invoked at step 432. The processor 206 decides if the pass-through was recently used at step 440 (e.g. in the last 10 ms). If pass-through mode was recently activated, then processor 206 invokes the pass-through system at step 438; otherwise there is no pass-through of the ASM signal to the ECR as shown at step 442. Upon activating pass-through mode, the processor 206 can perform a safe level check at step 452.

Figure 5:
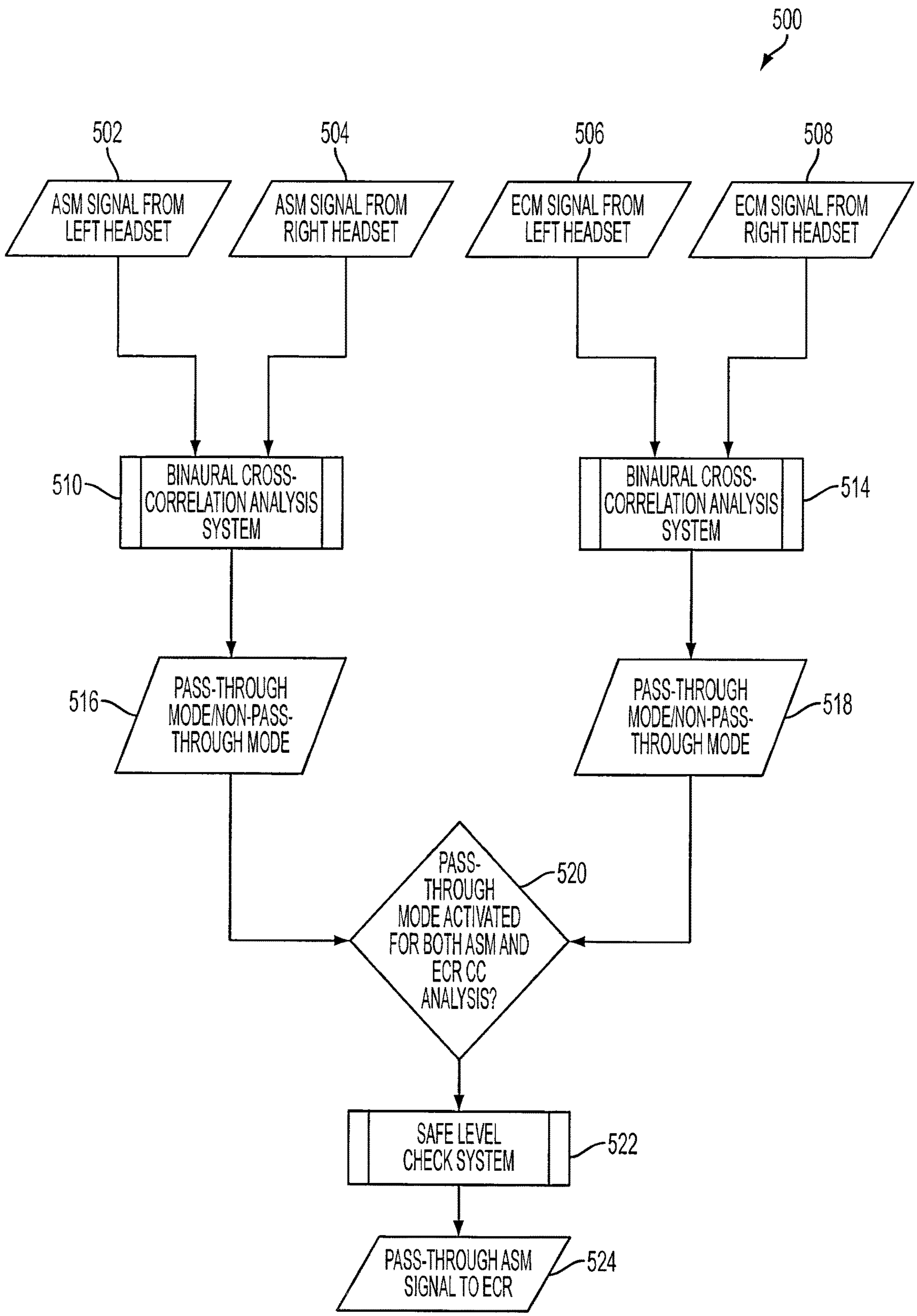
FIG. 5 is a flowchart of a method for acute sound source proximity in accordance with an exemplary embodiment.

FIG. 5 is a flowchart of a method 500 for acute sound source proximity. The method 500 can be practiced with more or less than the number of steps shown and is not limited to the order shown. To describe the method 500, reference will be made to components of FIG. 2, although it is understood that the method 500 can be implemented in any other manner using other suitable components. The method 500 can be implemented in a single earpiece, a pair of earpieces, headphones, or other suitable headset audio delivery device.

Briefly, FIG. 5 describes a method 500 for Source Proximity Detection (SPD) to determine if the Acute sound detected was created by the User's voice operating the earpiece 100. The SPD method 500 uses as its inputs the external ambient sound signals from left and right electro-acoustic earpiece 100 assemblies (e.g., a headphone). In some embodiments the SPD method 500 employs Ear Canal Microphone (ECM) signals from left and right earpiece 100 assemblies placed on left and right ears respectively. The processor 206 performs an electronic cross-correlation between the external ambient sound signals to determine a Pass-through or Non Pass-through operating mode. In the described embodiment whereby the cross-correlation of both the ASM and ECM signals is involved, a pass-through mode is invoked when the cross-correlation analysis for both the left and right earpiece 100 assemblies return a "Pass-through" operating mode, as determined by a logical AND unit.

For instance, at step 502 a left ASM signal from a left headset incorporating the earpiece 100 assembles is received. Simultaneously, at step 504 a right ASM signal from a right headset is received. At step 510, the processor 206 performs a binaural cross correlation on the left ASM signal and the right ASM signal to evaluate a pass through mode 516. At step 506 a left ECM signal from the left headset is received. At step 508, a right ECM signal from the right headset is received. At step 514, the processor 206 performs a binaural cross correlation on the left ECM signal and the right ECM signal to evaluate a pass through mode 518. A pass through mode 524 is invoked if both the ASM and ECM cross correlation analysis are the same as determined in step 520. A safe level check can be performed by processor 206 at step 522.

Figure 6:
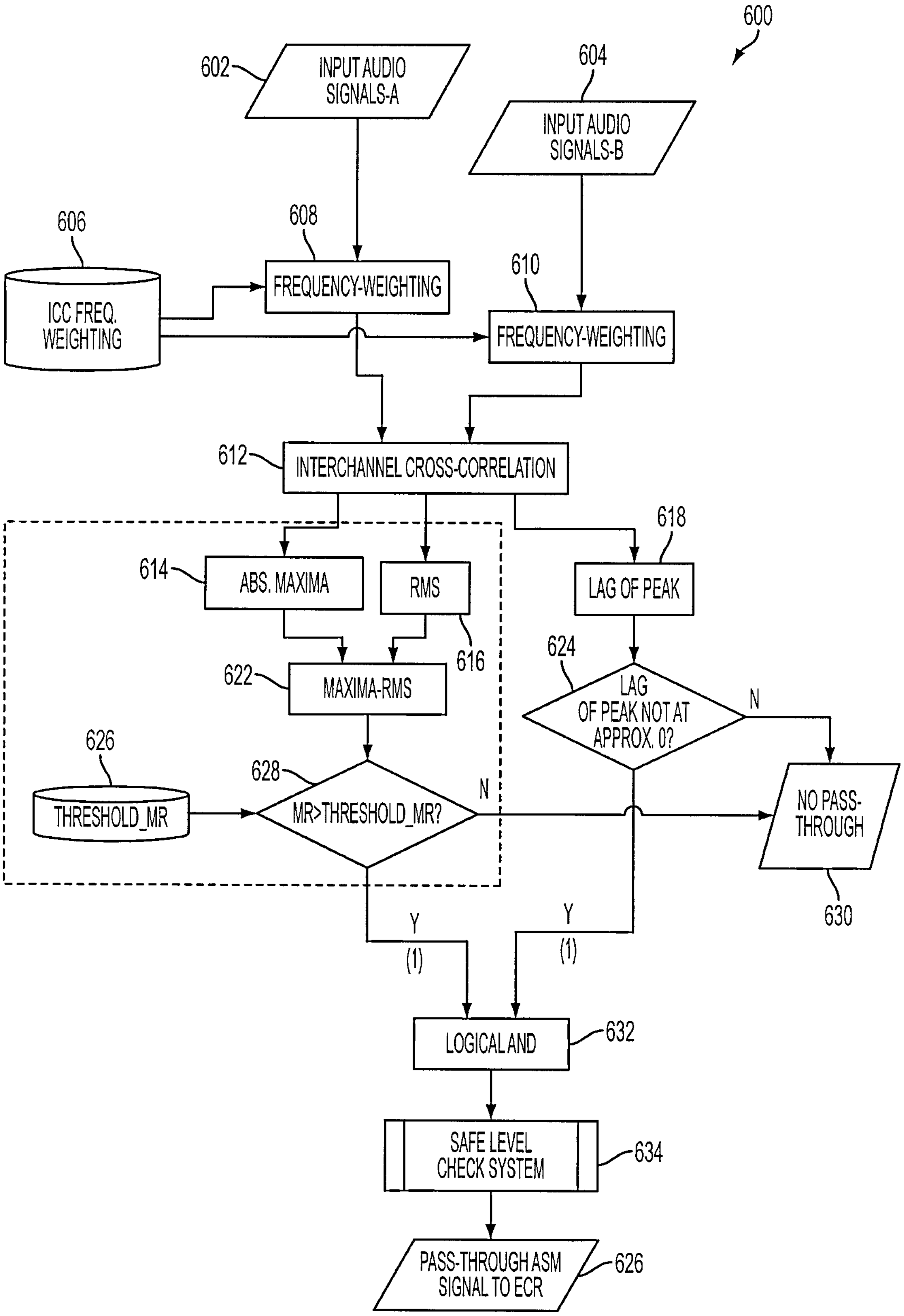
FIG. 6 is a flowchart of a method for binaural analysis in accordance with an exemplary embodiment.

FIG. 6 is a flowchart of a method 600 for binaural analysis. The method 600 can be practiced with more or less than the number of steps shown and is not limited to the order shown. To describe the method 600, reference will be made to components of FIG. 2, although it is understood that the method 600 can be implemented in any other manner using other suitable components. The method 600 can be implemented in a single earpiece, a pair of earpieces, headphones, or other suitable headset audio delivery devices.

Briefly, FIG. 6 describes a component of the SPD method 500 wherein a cross-correlation of two input audio signals 602 and 604 (e.g., left and right ASM signals) is calculated. The input signals may first be weighted using a frequency-dependent filter (e.g. an FIR-type filter) using filter coefficients 606 and filtering networks 608 and 610. Alternatively, an interchannel cross-correlation calculated with function 612 can return a frequency-dependent correlation such as a coherence function. The absolute maximum peak of a calculated cross-correlation 614 can be subtracted from a mean (or RMS) 616 correlation, with subtractor 622, and compared 628 with a predefined threshold 626, to determine if the peak is significantly greater than the average correlation (i.e. a test for peakedness). Alternatively, the maxima of the peak may simply be compared with the threshold 628 without the subtraction process 622. If the lag-time of the peak 618 is at approximately lag-sample 0, then the sound source is determined, at step 624, as being on the interaural axis-indicative of User-generated speech, and a no-pass through mode is returned 630 (a further function described in FIG. 7 may be used to confirm that the sound source originates in the User-head, rather than external to the user- and further confirming that the acute sound is a User-generated voice sound). The logical AND unit 632 activates the pass-through mode 636 if both criteria in the decision units 628 and 624 confirm that the absolute maxima of the peak is above a predefined threshold 626, AND the lag of the peak is NOT at approximately lag sample zero. A safe level check may be performed by processor 206 at step 634.

Figure 7:
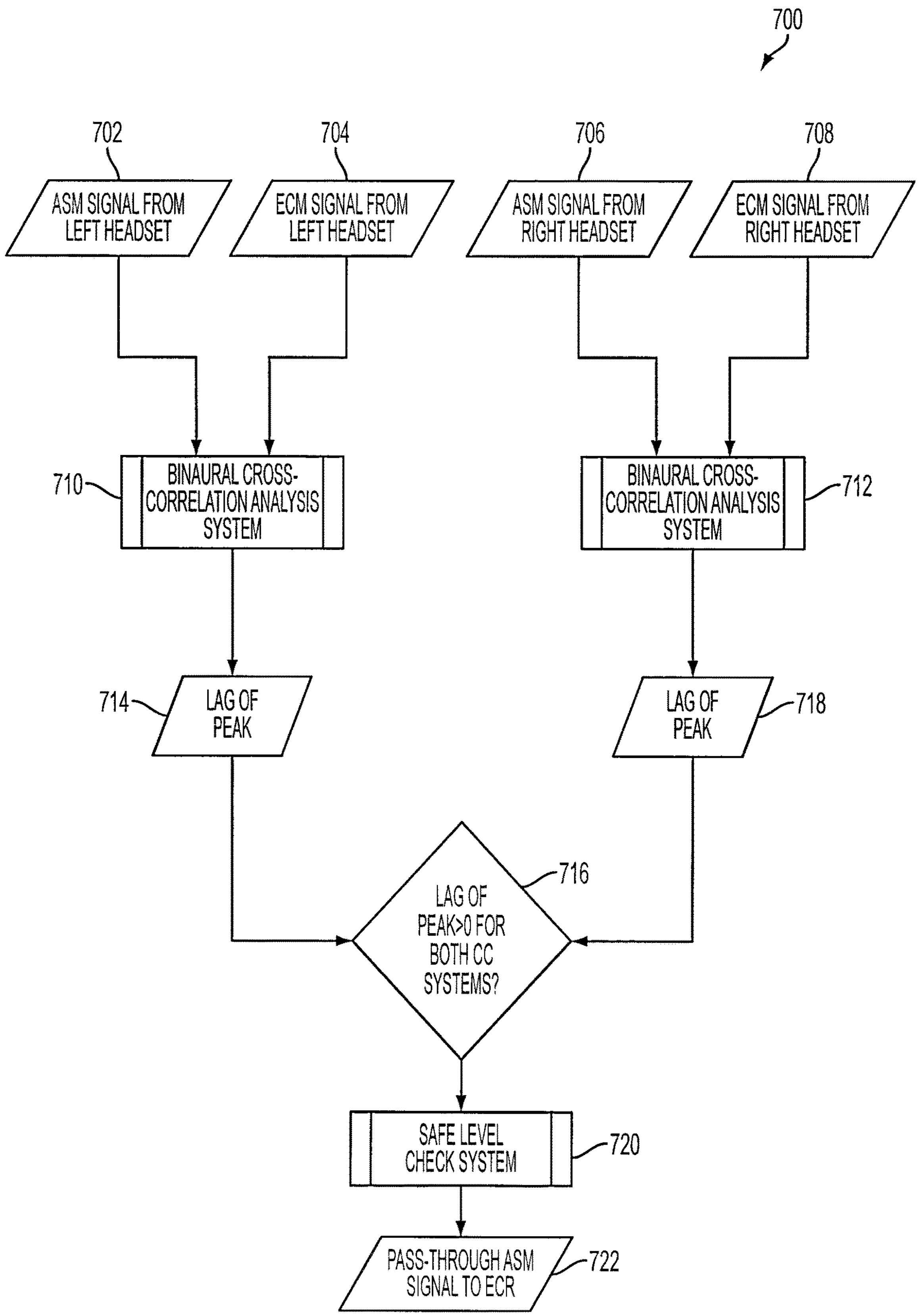
FIG. 7 is a flowchart of a method for logic control in accordance with an exemplary embodiment.

FIG. 7 is a flowchart of a method 700 for logic control. The method 700 can be practiced with more or less than the number of steps shown and is not limited to the order shown. To describe the method 700, reference will be made to components of FIG. 2, although it is understood that the method 700 can be implemented in any other manner using other suitable components. The method 700 can be implemented in a single earpiece, a pair of earpieces, headphones, or other suitable headset audio delivery devices.

Briefly, FIG. 7 describes a further component of the SPD method 500, which is optional to confirm that the acute sound source is from a location indicative of user-generated speech; i.e. inside the head. Method steps 702-712 are similar to Method steps 502-514 of FIG. 5. The cross-correlations of step 710 and 712 provide a time-lag of the maximum absolute peak for a pair of input signals; the ASM and ECM signals for the same headset (e.g. the ASM and ECM for the left headset). At step 714 a left lag of a peak of the left cross correlation is determined, and simultaneously, a right lag of a peak of the right cross correlation is determined at step 718. If a lag of a respective peak is greater than zero—this indicates that the sound arrived at the ECM signal before the ASM signal. Decision step 716 determines if the lag is greater than zero for both the left and right headsets- and activates the pass-through mode 722 if so. A safe level check may be performed by processor 206 at step 720.

Figure 8:
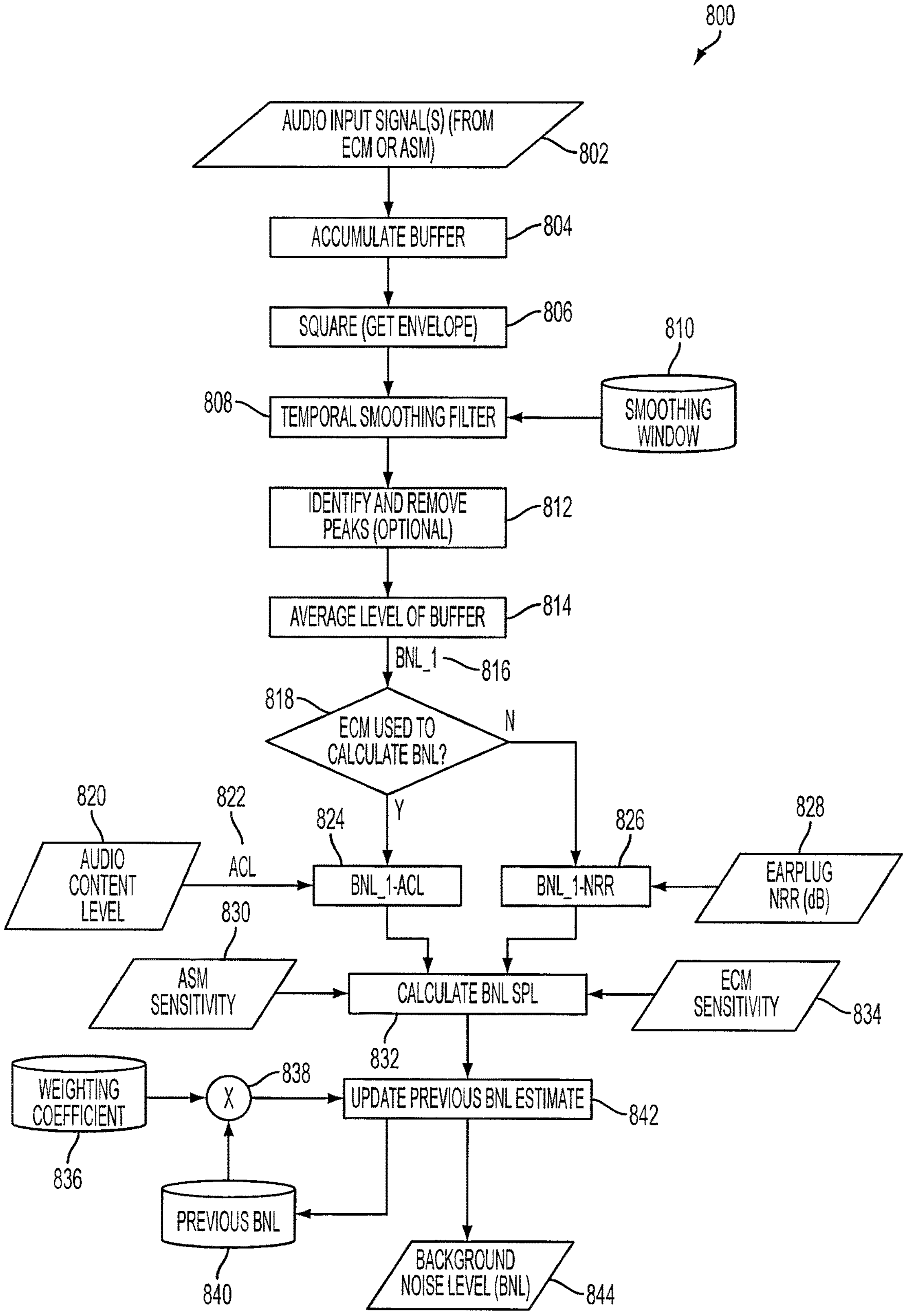
FIG. 8 is a flowchart of a method for estimating background noise level in accordance with an exemplary embodiment.

FIG. 8 is a flowchart of a method 800 for estimating background sound level. The method 800 can be practiced with more or less than the number of steps shown and is not limited to the order shown. To describe the method 800, reference will be made to components of FIG. 2, although it is understood that the method 800 can be implemented in any other manner using other suitable components. The method 800 can be implemented in a single earpiece, a pair of earpieces, headphones, or other suitable headset audio delivery devices.

Briefly, method 800 receives as its input 802 either or both the ASM signal from ASM 111 and a signal from the ECM 123. An audio buffer 804 of the input audio signal is accumulated (e.g. 10 ms of data), which is then processed by squaring step 806 to obtain the temporal envelope. The envelope is smoothed (e.g. an FIR-type low-pass digital filter) at step 808 using a smoothing window 810 stored in data memory (e.g. a Hanning or Hamming shaped window). At step 812, transient peaks in the input buffer can be identified and removed to determine a "steady-state" Background Noise Level (BNL). At step 814 an average BNL 816 can be obtained (similar to, or the same as, the RMS) that is frequency dependent or a single value averaged over all frequencies. If the ECM 123 is used to determine the BNL, then decision step 818 adjusts the ambient BNL estimation to provide an equivalent ear-canal BNL SPL, by deducting an Earpiece Noise Reduction Rating 828 from the BNL estimate 826. Alternatively, if the ECM 123 is used, then the Audio Content SPL level (ACL) 822 of any reproduced Audio Content 820 is deducted from the ECM level at step 824. The updated BNL estimate is then converted to a Sound Pressure Level (SPL) equivalent 832 (i.e. substantially equal to the SPL at the ear-drum in which the earphone device is inserted) by taking into account the sensitivity (e.g. measured in V per dB) of either the ASM 111 or ECM 123 at steps 830 and 834 respectively. The resulting BNL SPL is then combined at step 842 with the previous BNL estimate 840, by averaging 838 a weighted previous BNL (weighted with coefficient 836), to give a new ear-canal BNL 844.

Figure 9:
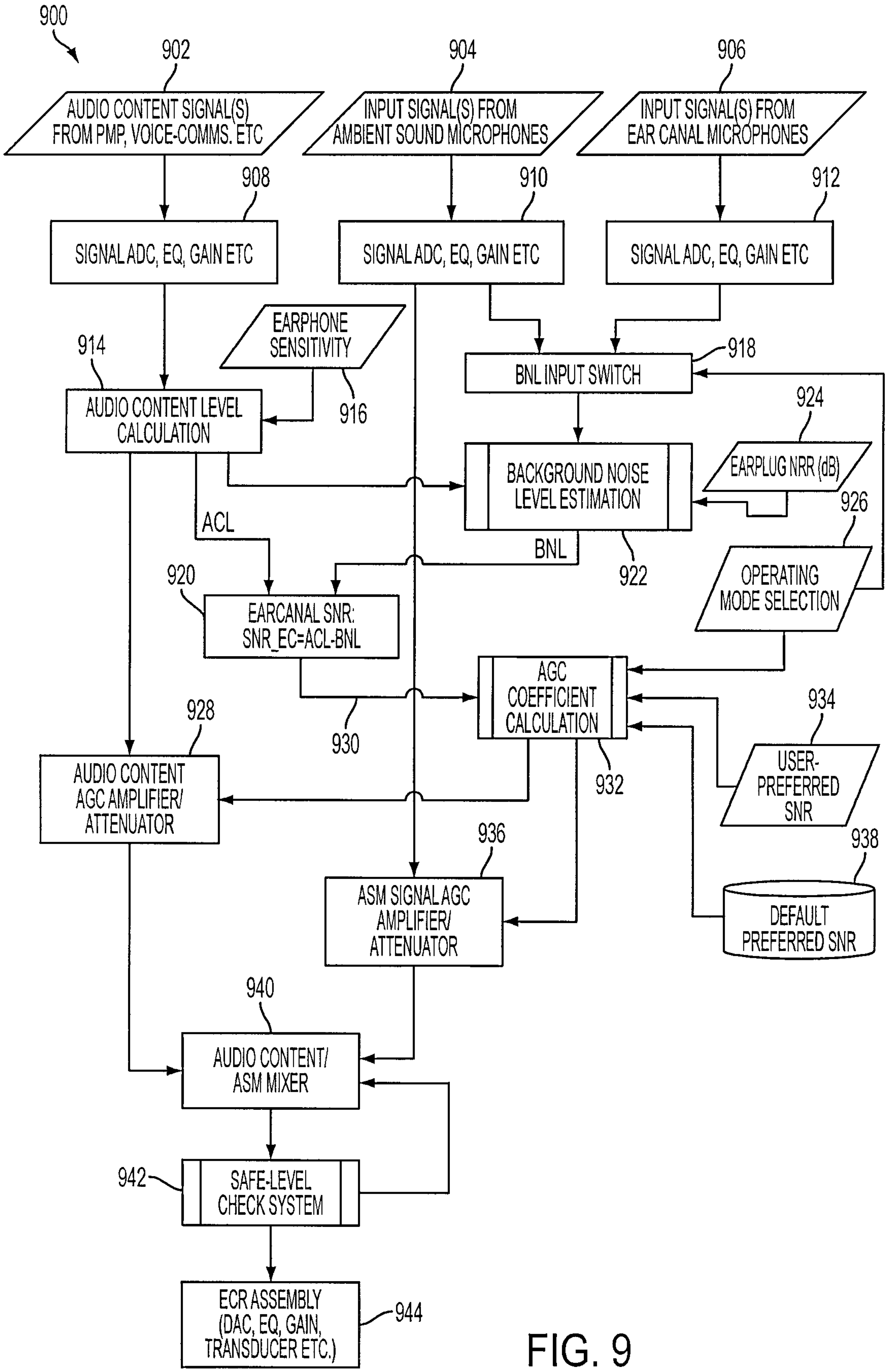
FIG. 9 is a flowchart of a method for maintaining constant audio content level (ACL) to internal ambient sound level (iASL) in accordance with an exemplary embodiment.

FIG. 9 is a flowchart of a method 900 for maintaining constant audio content level (ACL) to internal ambient sound level (iASL). The method 900 can be practiced with more or less than the number of steps shown and is not limited to the order shown. To describe the method 900, reference will be made to components of FIG. 2, although it is understood that the method 900 can be implemented in any other manner using other suitable components. The method 900 can be implemented in a single earpiece, a pair of earpieces, headphones, or other suitable headset audio delivery devices.

Briefly, FIG. 9 describes a method 900 for Constant Signal-to-Noise Ratio (CSNRS). At step 904 an input signal is captured from the ASM 111 and processed at step 910 (e.g. ADC, EQ, gain). Similarly, at step 906 an input signal from the ECM 123 is captured and processed at step 912. The method 900 also receives as input an Audio Content signal 902, e.g. a music audio signal from a portable Media Player or mobile-phone, which is processed with an analog and digital signal processing system as shown in step 908. An Audio Content Level (ACL) is determined at step 914 based on an earpiece sensitivity from step 916, and returns a dBV value.

In one exemplary embodiment, method 900 calculates a RMS value over a window (e.g. the last 100 ms). The RMS value can then be first weighted with a first weighting coefficient and then averaged with a weighted previous level estimate. The ACL is converted to an equivalent SPL value (ACL), which may use either a look-up-table or algorithm to calculate the ear-canal SPL of the signal if it was reproduced with the ECR 125. To calculate the equivalent ear canal SPL, the sensitivity of the ear canal receiver can be factored in during processing.

At step 922 the BNL is estimated using inputs from either or both the ASM signal at step 902, and/or the ECM signal at step 906. The BNL may be adjusted by the earpiece noise reduction rating 924. These signals are selected using the BNL input switch at step 918, which may be controlled automatically or with a specific user-generated manual operation at step 926. The Ear-Canal SNR is calculated at step 920 by differencing the ACL from step 914 and the BNL from step 922 and the resulting SNR 930 is passed to the method step 932 for AGC coefficient calculation. The AGC coefficient calculation 932 calculates gains for the Audio Content signal and ASM signal from the Automatic Gain Control steps 928 and 936 (for the Audio Content and ASM signals, respectively). AGC coefficient calculation 932 may use a default preferred SNR 938 or a user-preferred SNR 934 in its calculation. After the ASM signal and Audio content signal have been processed by the AGCs 928 and 936, the two signals are mixed at step 940.

At step 942, a safe-level check determines if the resulting mixed signal is too high, if it were reproduced with the ECR 125 as shown in block 944. The safe-level check can use information regarding the user's listening history to determine if the user's sound exposure is such that it may cause a temporary or a permanent hearing threshold shift. If such high levels are measured, then the safe-level check reduces the signal level of the mixed signals via a feedback path to step 940. The resulting audio signal generated after step 942 is then reproduced with the ECR 125.

Figure 10:
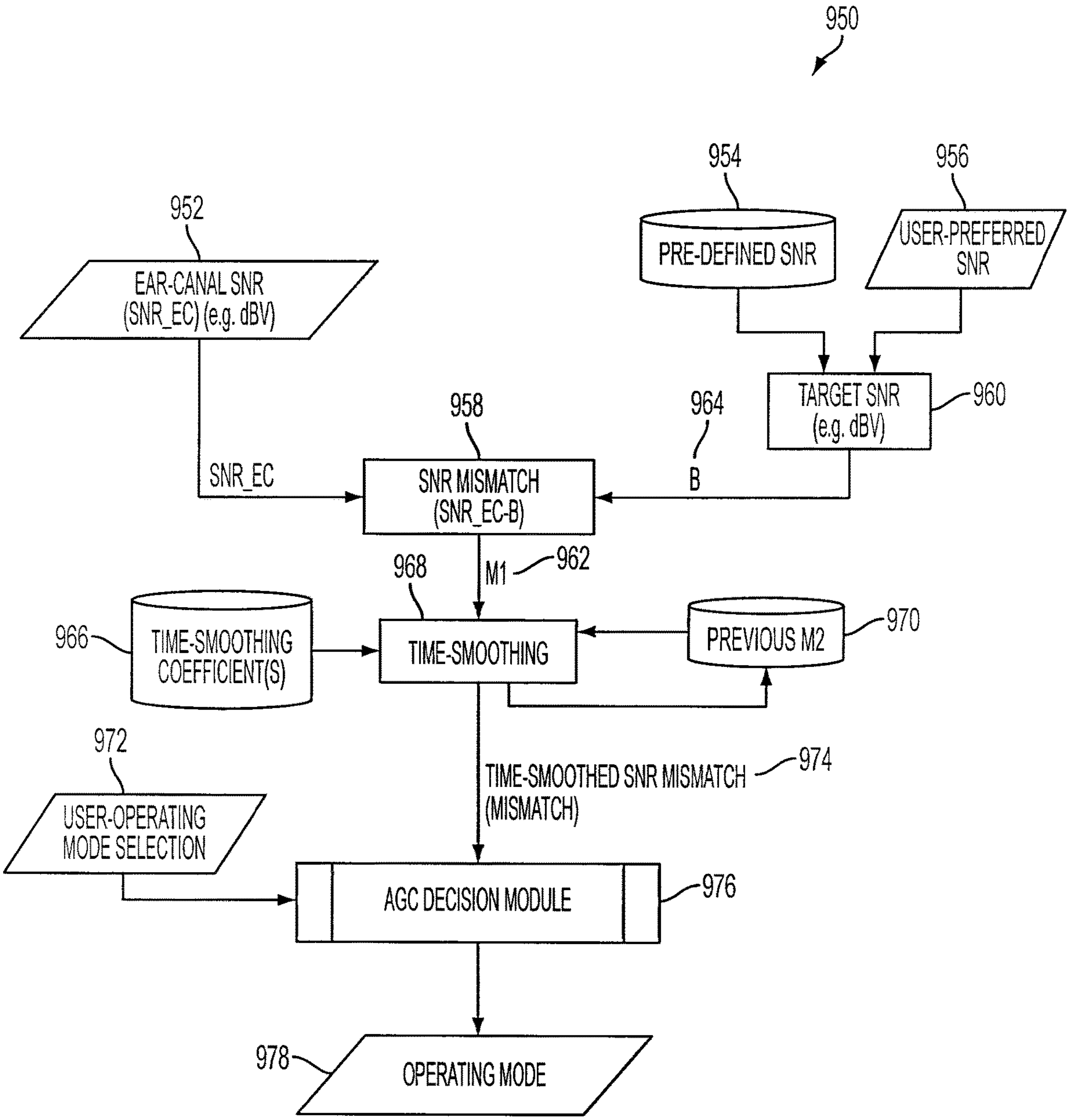
FIG. 10 is a flowchart of a method for adjusting audio content gain in accordance with an exemplary embodiment.

FIG. 10 is a flowchart of a method 950 for maintaining a constant signal to noise ratio based on automatic gain control (AGC). The method 950 can be practiced with more or less than the number of steps shown and is not limited to the order shown. To describe the method 950, reference will be made to components of FIG. 2, although it is understood that the method 950 can be implemented in any other manner using other suitable components. The method 950 can be implemented in a single earpiece, a pair of earpieces, headphones, or other suitable headset audio delivery devices.

Method 950 describes calculation of AGC coefficients. The method 950 receives as its inputs an Ear Canal SNR 952 and a target SNR 960 to provide a SNR mismatch 958. The target SNR 964 is chosen from a pre-defined SNR 954, sorted in computer memory or a manually defined SNR 956. At step 958, a difference is calculated between the actual ear-canal SNR and the target SNR to produce the mismatch 962. The mismatch level 962 is smoothed over time at step 968, which uses a previous mismatch 970 that is weighted using single or multiple weighting coefficients 966, to give a new time-smoothed SNR mismatch 974. Depending on the magnitude of this mismatch, various operating modes 972, 978 can be invoked, for example, as described by the AGC decision module 976 (step 932 in FIG. 9).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed is:

1. A device comprising:

a first microphone configured to generate a first microphone signal;

a speaker;

a memory that stores instructions;

a haptic vibration generator, wherein the haptic vibration generator includes a motor that can vibrate in response to receiving a call; and a processor that executes the instructions to perform operations, wherein the processor is configured to enable wireless voice communications with a second device, the operations comprising:

generating a microphone signal from the first microphone signal or a modified first microphone signal;

generating a modified sound signal by frequency-dependent filtering the microphone signal;

calculating the maximum sound pressure level of the maximum peak of the modified sound signal;

retrieving a threshold level set by a user of the device;

reducing a volume of the modified sound signal if the maximum sound pressure level is greater than the threshold level, wherein the volume is reduced before sending the modified sound signal to the speaker;

sending the modified sound signal to the speaker; and generating a haptic vibration from the haptic vibration generator when the call is received.

2. The device according to claim 1, wherein the device is an earpiece.

3. The device according to claim 1, wherein the device is at least one of a phone, or a watch, or a combination thereof.

4. The device according to claim 1, wherein the operations further comprise:

analyzing the modified sound signal to detect a user's voice.

5. The device according to claim 4 wherein the operations further comprise:

receiving an audio content signal.

6. The device according to claim 5, wherein the operations further comprise:

generating a mixed signal by mixing the audio content signal and the modified sound signal.

7. The device according to claim 6, wherein the amount of audio content signal that is mixed with the modified sound signal is reduced if the user's voice is detected.

8. The device according to claim 7, wherein the amount of modified sound signal that is mixed with the audio content signal is increased if the user's voice is detected.

9. The device according to claim 6, wherein the audio content signal includes a voice message from the user.

* * * * *